US012750733B2

(12) United States Patent
Zhu et al.

(10) Patent No.: US 12,750,733 B2
(45) Date of Patent: Sep. 29, 2026

(54) TRIGGER-BASED KEEP-ALIVE AND PROBING MECHANISM FOR MULTIACCESS MANAGEMENT SERVICES

(71) Applicant: Intel Corporation, Santa Clara, CA (US)

(72) Inventors: Jing Zhu, Portland, OR (US); Menglei Zhang, Portland, OR (US); Mustafa Akdeniz, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 18/565,212

(22) PCT Filed: Jun. 30, 2022

(86) PCT No.: PCT/US2022/035832
§ 371 (c)(1),
(2) Date: Nov. 29, 2023

(87) PCT Pub. No.: WO2023/043521
PCT Pub. Date: Mar. 23, 2023

(65) Prior Publication Data

US 2024/0276301 A1 Aug. 15, 2024

Related U.S. Application Data

(60) Provisional application No. 63/243,865, filed on Sep. 14, 2021.

(51) Int. Cl.

*H04W 28/10* (2009.01)
*H04L 47/34* (2022.01)
*H04W 40/02* (2009.01)

(52) U.S. Cl.
CPC ............ *H04W 28/10* (2013.01); *H04L 47/34* (2013.01); *H04W 40/02* (2013.01)

(58) Field of Classification Search
CPC ..... H04W 28/10; H04W 40/02; H04W 76/11; H04W 76/16; H04W 76/22; H04W 76/25;
(Continued)

(56) References Cited

U.S. PATENT DOCUMENTS

2015/0181459 A1 6/2015 Zhu
2015/0189551 A1* 7/2015 Ozturk .............. H04W 28/0273 370/235
(Continued)

FOREIGN PATENT DOCUMENTS

WO WO2020-232404 A1 11/2020

OTHER PUBLICATIONS

International Search Report and Written Opinion mailed Oct. 12, 2022 for International Patent Application No. PCT/US2022/035832, 14 pages.
(Continued)

*Primary Examiner* — Kibrom T Hailu
(74) *Attorney, Agent, or Firm* — Essential Patents Group, LLP; Christopher K. Gagne

(57) ABSTRACT

The present disclosure is related to Multi-Access Management Services (MAMS), which is a programmable framework that provides mechanisms for the flexible selection of network paths in a multi-access (MX) communication environment, based on an application's needs. Generic Multi-Access (GMA) functions are also integrated into the MAMS framework. The present disclosure discusses keep-alive and probing mechanisms, and traffic splitting update techniques. Other implementations may be disclosed and/or claimed.

18 Claims, 20 Drawing Sheets

(58) Field of Classification Search
CPC ......... H04L 47/34; H04L 69/14; H04L 69/18; H04L 43/08; H04L 43/50; H04L 43/16; H04L 61/2514; H04L 43/106; H04L 45/24; H04L 47/2483; H04L 61/2553; H04L 61/2578
See application file for complete search history.

(56) References Cited

U.S. PATENT DOCUMENTS

| | | | | |
|---|---|---|---|---|
| 2016/0338074 | A1 | 11/2016 | Chou et al. | |
| 2018/0295192 | A1 | 10/2018 | Dutta et al. | |
| 2019/0342800 | A1* | 11/2019 | Sirotkin | H04W 36/02 |
| 2020/0052765 | A1* | 2/2020 | Islam | H04L 5/0048 |
| 2020/0336258 | A1* | 10/2020 | Zhu | H04L 1/1642 |
| 2021/0007166 | A1 | 1/2021 | Liao et al. | |

OTHER PUBLICATIONS

S. Kanugovi et al., “Multi-Access Management Services (MAMS)”, RFC 8743, Mar. 2020x, 144 pages.

* cited by examiner

TRIGGER-BASED KEEP-ALIVE AND PROBING MECHANISM FOR MULTIACCESS MANAGEMENT SERVICES

RELATED APPLICATIONS

The present application is a national stage entry under U.S.C. § 371 of Int'l App. No. PCT/US2022/035832 filed Jun. 30, 2022 which claims priority under 35 U.S.C. § 119 (e) to U.S. Provisional App. No. 63/243,865 filed on Sep. 14, 2021 ("['865]"), the contents of each of which are hereby incorporated by reference in their entireties.

TECHNICAL FIELD

The present application is generally related to Edge computing, network communication, and communication system implementations, and in particular, to Multiple Access Management Services (MAMS) systems/networks and Generic Multi-Access (GMA) frameworks.

BACKGROUND

Multiple Access Management Services (MAMS) is a programmable framework that provides mechanisms for flexible selection of network paths in a multi-connection (access) communication environment based on application needs and/or requirements. The MAMS framework can be supported by an Edge computing system/network, such as ETSI MEC or the like. Additionally, the Third Generation Partnership Project (3GPP) Fifth Generation (5G) system architecture has been extended to support functionality similar to MAMS, which is referred to as Access Traffic Switching, Steering, and Splitting (ATSSS).

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

DETAILED DESCRIPTION

1. Multi-Access Management Services (MAMS) and Generic Multi-Access (GMA)

Today, a device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network is the segment in a network that delivers user data packets to a client via an access link such as a WiFi airlink, an cellular airlink, or DSL. The overall QoE perceived by the end users as well as utilization of the resources can be optimized with smart selection and combination of the paths used for the user plane (UP). In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and UP treatment for improving network utilization and efficiency and enhanced QoE for user applications (apps). With the MAMS framework, the optimal network paths can selected on UP level without any impact on the control plane signaling of the underlying access networks. Additional aspects of the MAMS framework are discussed in Kanugovi et al., *Multi-Access Management Services* (*MAMS*), INTERNET ENGINEERING TASK FORCE (IETF), Request for Comments (RFC) 8743 (March 2020) ("[RFC8743]"), the contents of which is hereby incorporated by reference in its entirety. An example multi-access (MA) network implementing the MAMS framework is shown by FIGS. 1 and 2.

Figure 1:
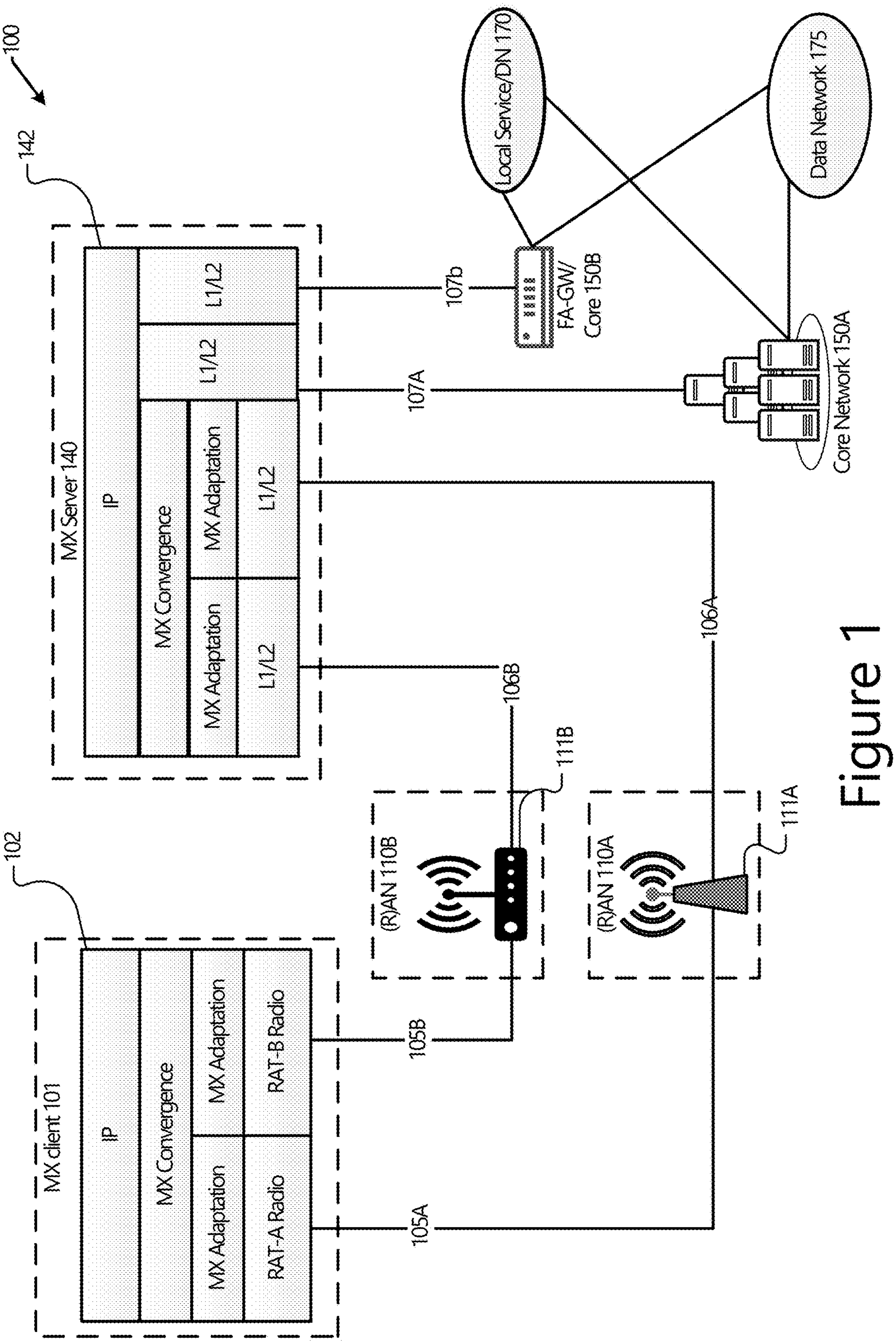
FIG. 1 depicts an example multi-access network utilizing Multiple Access Management Services (MAMS).
Figure 2:
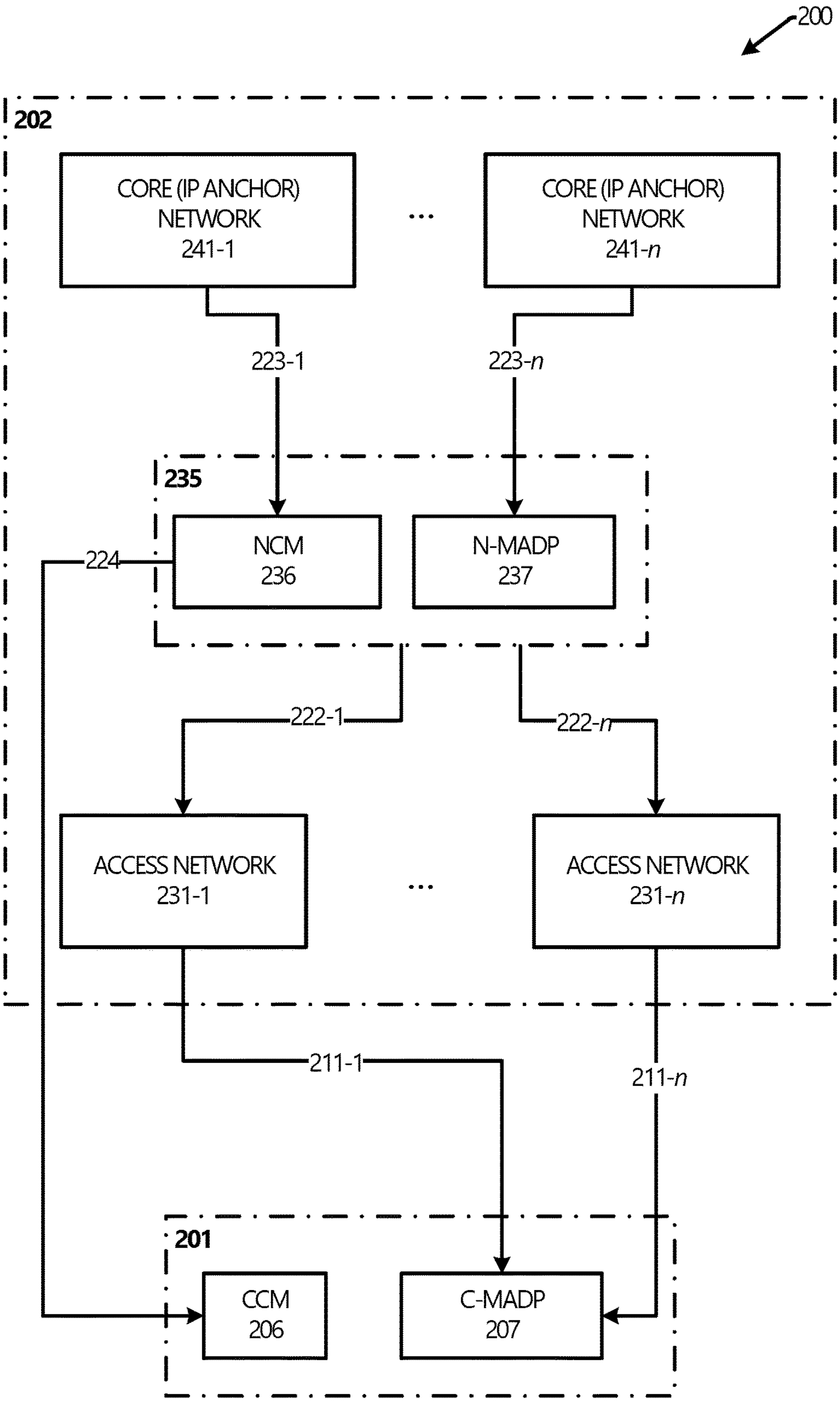
FIG. 2 illustrates a MAMS reference architecture.

FIG. 1 depicts an example multi-access ("MX" or "MA") network 100 utilizing MAMS technology. In particular, FIG. 1B shows a MAMS e2e UP protocol stack in the MX network 100, which includes both WiFi and 3GPP-based access. In this example, an MX client 101 includes a UP protocol stack 102 and a server 140 includes a UP protocol stack 142.

The MX client 101 is an end-user device that supports connections with one or more access nodes, possibly over different access technologies (or RATs), and is also referred to as a user station, user device, user equipment (UE), or multi-radio UE 101. The client 101 may be a multiconnectivity client 101 that has, or supports, multiple network connections.

The MX server 140 (or "MAMS server 140") provides MAMS-related user-plane (UP) functionalities and/or optimizations in the network 100. The MX server 140 handles aggregation of multiple network paths 105, 106, 107, and/or the forwarding of user data traffic across multiple network paths 105, 106, 107. The MX server 140 may also be referred to as an MX gateway and/or a Network Multi Access Data Proxy (N-MADP) (see e.g., N-MADP 237 in FIG. 2). Throughout the present disclosure, the MX server 140 may be referred to as server 140, a MAMS server 140, MA server 140, edge node 140, MEC host 140, MAMS-MEC system 140, or similar. When the client 101 transmits packets to the server 140, the client 101 may be referred to as a "MAMS transmitter," "MX transmitter," or the like, and the server 140 may be referred to as a "MAMS receiver," "MX receiver," or the like. When the client 101 receives packets from the server 140, the client 101 may be referred to as a "MAMS receiver," "MX receiver," or the like, and the server 140 may be referred to as a "MAMS transmitter," "MX transmitter," or the like.

In some implementations, the MAMS server 140 runs in an edge computing system/platform/network (see e.g., FIGS. 19-21) and/or a cloud computing system/service/platform, and can deliver traffic between client server over multiple connections or paths. In an example implementation, the edge compute nodes comprise(s) a MEC host (or MEC server). Additionally or alternatively, the MX server 140 may be one or more MEC applications (apps) operated by a MEC server/host (see e.g., [MEC]). Various aspects of MEC hosts and MAMS servers are discussed in more detail infra.

The MX UE 101 (or "multi-radio UE 101") accesses or otherwise communicates with a data network (DN) 175 or local service 170 (also referred to as a local DN 170) via one or more (radio) access networks ("(R)ANs") 110 and the server 140. Each (R)AN 110 is a segment in a network that delivers user data packets to the client 101 and/or server 140 via access link(s) 105, which may be a wired connection (e.g., Ethernet, DSL, Coax, USB, and/or the like) or a wireless (radio) connection (e.g., WiFi airlink, 5G/NR airlink, LTE airlink, and/or the like). Each of the (R)ANs 110 implement an access technology ("AT"), which is the underlying mechanism(s) used to access a corresponding network.

In some implementations, the AT is a fixed access (wired) technology such as Ethernet, digital subscriber line technologies (DSL or xDSL); G·hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 111 may be a broadband modem (e.g., cable modem, DSL modem, an Optical Network Terminal (ONT) or an Optical Network Unit (ONU), G·hn semiconductor device, etc.), which may be used in combination with customer premises equipment (e.g., home/enterprise router(s), residential/enterprise gateway(s), mesh network device(s), WiFi access point(s), etc.). The fixed AN node 111 connects the client 101 to the access network 110 via an access connection 105 that operates according to an access protocol (e.g., Ethernet, V.35, Universal Serial Bus (USB) and/or Ethernet over USB, Point-to-Point Protocol over Ethernet (PPPoE), Internet Protocol over Ethernet (IPoE), G·hn, DOCSIS, and/or the like). Here, the access connection 105 may include one or more wires (e.g., telephone wiring, coax, power lines, plastic and/or glass optical fibers, and/or the like), and the particular wires used may depend on the underlying AT and/or infrastructure.

In other implementations, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 110 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 110 includes one or more (R)AN nodes 111, which may be macro cell base stations, remote radio heads (RRHs), small and/or micro cell base stations, access points (APs), home gateways (HGs), and/or other like network elements. A collection of (R)AN nodes 111 may also be referred to as an "access level edge network" or "access level edge." The (R)AN nodes 111 are configurable or operable to perform setup of transport resources, (e.g., for CDN services and/or other application level services) as well as scheduling signaling resources for providing network service of the underlying access network/RAT. Here, the access connection 105 may include wireless or air interfaces based on the underlying RAT (e.g., Uu-interface for LTE or 5G/NR RATs, PC5 interface for LTE or 5G/NR RATs, WiFi air interface for WLAN RATs, millimeter wave (mmWave) interface, Visible Light Communication (VLC) interface, and/or the like).

Each (R)AN 110*a*, 110*b* includes one or more respective network access nodes (NANs) 111*a*, 111*b*, which is/are communicatively coupled with/to a respective back-end network. One way to implement this service model is to use a multi-path Layer-4 (transport) solution such as Multi-Path TCP (see e.g., Ford et al., *TCP Extensions for Multipath Operation with Multiple Addresses*, IETF RFC 6824 (January 2013) ("[RFC6824]")) or MultiPath QUIC (MPQUIC) (see e.g., De Coninck et al., *Multipath Extensions for QUIC (MP-QUIC)*, IETA, QUIC Working Group, draft-deconinck-quic-multipath-07, (3 May 2021) ("[MPQUIC]")). Such solution is usually OS dependent and only applicable to specific application/traffic. Moreover, it operates at the individual flow level and offer suffers from high complexity & low efficiency. A layer 3 (L3) solution (see e.g., Zhu et al., *User-Plane Protocols for Multiple Access Management Service*, IETA INTAREA, draft-zhu-intarea-mams-user-protocol-09 (4 Mar. 2020), the contents of which are hereby incorporated by reference in its entirety ("[UPMAMS]"), the contents of which is hereby incorporated by reference in its entirety) supports multi-path management without such limitations and drawback. In this implementation, the addition control information for multi-path management (e.g., sequence number, etc.) is appended as a trailer at the end of IP packet.

In the example of FIG. 1, the (R)AN 110A is a 3GPP-based access network such as an LTE E-UTRAN where the one or more (R)AN nodes 111A are evolved NodeBs (eNBs)

or a next generation RAN (NG-RAN) where the one or more (R)AN nodes 111 are Next Generation NodeBs (gNBs) and/or NG Evolved Node-Bs (NG-eNBs). Additionally, in the example of FIG. 1, the (R)AN 110A is a WiFi-based access network where the (R)AN nodes 111B are WiFi Access Points (APs). The APs may be, for example, wireless routers, roadside ITS stations or roadside units, gateway appliances, central hubs, or the like. The multi-radio UE 101 is capable of establishing a 3GPP access link 105A with the eNB/gNB 111A (e.g., Uu interface or the like), and capable of establishing a WiFi access link 105B with the AP 111B. The eNB/gNB 111A communicates with the server 140 via a 3GPP backhaul link 106A and the AP 111B communicates with the server 140 via a WiFi backhaul link 106B. The 3GPP backhaul link 106A and the WiFi backhaul link 106B may be a suitable wired connection such as Ethernet, USB, Data Highway Plus (DH+), PROFINET, or the like. Furthermore, the MX server 140 is also communicatively coupled with a core network 150A via backhaul interface 107A and communicatively coupled with a Fixed Access (FA) gateway (GW) and/or FA-Core network 150B via the backhaul link 107B. In this example, the core network 150A may be a 3GPP core network such as a 5G core network (5GC) or an LTE Evolved Packet Core (EPC). Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), and/or some other suitable element/entity.

For purposes of the present disclosure, individual links 105, 106, or 107 may be referred to as access network connections (ANCs) or access network paths (ANPs). For example, an ANC or ANP may comprise a radio link 105 between client 101 and (R)AN node 111 in one or both directions. Additionally or alternatively, an ANC or ANP may refer to a combination of a link 105 and link 106 between client 101 and MX server 140 in one or both directions. Additionally or alternatively, an ANC or ANP may refer to a combination of a of links/paths 105, 106 and 107 between client 101 and local service 170 or data network 175 in one or both directions. Unless stated otherwise, the terms ANC, ANP, “link,” “channel,” “path,” “connection,” and the like may be used interchangeably throughout the present disclosure.

Additionally, the client 101 is configured provide radio information to one or more NANs 111 and/or one or more other entities/elements (e.g., Edge server(s), (R)AN(s) 110, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 101). As examples, the measurements collected by the client 101 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/No), energy per bit to interference power density ratio ($E_c/I_0$), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v17.0.0 (2022 Mar. 31) (“[TS36214]”), 3GPP TS 38.215 v17.1.0 (2022 Apr. 1) (“[TS38215]”), *IEEE Standard for Information Technology—Telecommunications and Information Exchange between Systems—Local and Metropolitan Area Networks—Specific Requirements—Part* 11*: Wireless LANMedium Access Control* (*MAC*) *and Physical Layer* (*PHY*) *Specifications*, IEEE Std 802.11-2020 (2021 Feb. 26) (“[IEEE80211]”), and/or the like. Additionally or alternatively, any of the aforementioned measurements (or combination of measurements) may be collected by one or more NANs 111.

Additionally or alternatively, any of the aforementioned measurements (or combination of measurements) may be collected by one or more NANs 111 and provided to a suitable entity/element (e.g., Edge server(s), (R)AN(s) 110, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 111 at low or high periodicity, or the NANs 111 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 100, based on the application needs and/or requirements, as well as adapt to dynamic network conditions when multiple network connections serve a client device 101. The MAMS framework leverages network intelligence and policies to dynamically adapt traffic distribution across selected paths and UP treatments (e.g., encryption needed for transport over WiFi, or tunneling needed to overcome a network address translation (NAT) between client 101 and a multi-path proxy) to changing network/link conditions. Network path selection and configuration messages are carried as UP data between the functional elements in the MX network 100B and the client 101, and thus, with little or no impact on the control plane (CP) signaling schemes of the underlying access networks (e.g., WiFi and 3GPP access networks in FIGS. 1A-1B). For example, in MX network 100B with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v17.0.0 (2022 Apr. 5) ("[TS24312]"), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

FIG. 1 also depicts a MAMS Data Plane Protocol Stack (DPPS) for transporting user payloads, for example, an IP Protocol Data Unit (PDU) carried via the IP layer and/or the like. The DPPS 102 and 142 includes the client-side MAMS DPPS 102 implemented by the client 101 and the server-side MAMS DPPS 142 implemented by the server 140. For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 102, 142 includes the following two (sub)layers: the convergence (sub)layer and the adaptation (sub)layer. The MX adaptation (sub)layer is added to (or on top of) each RAT circuitry, and the MX convergence (sub)layer connects the IP and MX adaptation (sub)layers.

The MX convergence layer is configurable or operable to perform MX-specific tasks in the UP. The MX convergence layer performs multi-access specific tasks/functions such as, for example, access (path) selection, multi-link (path) aggregation, splitting/reordering, lossless switching, keep-alive, probing, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). In some implementations, the MX convergence supports GMA, MPTCP Proxy, GRE Aggregation Proxy, and MPQUIC. As discussed in more detail infra, the GMA protocol may be used to encode additional control information (e.g., Key, Sequence Number, Timestamp, etc.) at this (sub)layer.

The MX adaptation layer is configurable or operable to address and/or handle transport-network-related aspects such as, for example, tunneling, network-layer reachability and/or security, and NAT. The MX Adaptation Layer can be implemented using existing protocols (e.g. TCP, UDP, IPSec, QUIC, etc.). Additionally or alternatively, the MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS]"), or a Client NAT (e.g., a source NAT at the client with inverse mapping at the server 140 and/or Network Multi Access Data Proxy (N-MADP) 237 of FIG. 2). Additionally or alternatively, the adaptation method of the MX Adaptation Layer is UDP without DTLS, UDP with DTLS, IPsec (see e.g., Huttunen et al., *UDP Encapsulation of IPsec ESP Packets*, IETF RFC 3948 (January 2005) ("[RFC3948]")), or Client NAT.

The MX Adaptation Layer can be independently configured for each of the access links 105A and 105B. In particular, UP packets of the anchor connection can be encapsulated in a UDP tunnel of a delivery connection between the N-MADP and C-MADP (see e.g., N-MADP 237 and C-MADP 207 in FIG. 2), an IPsec tunnel can be established between the N-MADP and C-MADP (see e.g., N-MADP 237 and C-MADP 207 in FIG. 2) on the network path that is considered untrusted, and/or DTLS can be used if UDP tunneling is used on the network path that is considered "untrusted". For example, in FIG. 1 including 3GPP (R)AN 110A (assumed secure) and WiFi (R)AN 1101B (assumed to not be secure), the MX adaptation layer can be omitted for the 3GPP link 105A, but is configured with IPsec to secure the WiFi link 105B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 110 are combined into a single IP connection. If the NCM (see e.g., NCM 236 of FIG. 2) determines that N-MADP (see e.g., N-MADP 237 of FIG. 2) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 236 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 236 determines that N-MADP is to be instantiated with GRE as the MX Convergence Protocol, it exchanges the support of GRE capability in the discovery and capability exchange procedures.

The MAMS framework can be supported by an Edge computing system/network, such as ETSI Multi-access Edge Computing (MEC) (see e.g., [MEC]), which defines the technical requirements for the implementation of MEC platforms. MEC is a technology that allows applications to be instantiated at the Edge of an access network, and provides a low-latency and a close proximity environment to user equipment (UEs). As a result, vertical industries are expected to significantly benefit from the deployment of MEC infrastructure together with the deployment of (R)ANs 110. These RANs 110 may be operated by different mobile network operations (MNOs) and/or operate different RATs. MEC systems are access agnostic, and thus, can support MAMS.

In some implementations, MAMS can be a MEC service which provides services to MEC applications over the Mp1 interface. Meanwhile, the MEC platform can consume services provided by NFs in 3GPP network via an NEF or PCF if the AF is in the trust domain. Moreover, the 3GPP 5G system architecture has been extended to support functionality similar to MAMS, which is referred to as ATSSS.

FIG. 2 illustrates an example MAMS reference architecture 200 for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network/access types (e.g., LTE, WLAN, MuLTEfire, DSL, 5G/NR, etc.) and deployment architectures (e.g., with UP gateway function at the access Edge, and/or the like).

FIG. 2 illustrates a scenario of a client 201 served by multiple (1 to n) core networks 241-1 to **241-*n* (where n is a number). The MAMS architecture 200 includes the following functional elements: a client 201 including a Client Connection Manager (CCM) 206 and a Client Multi Access Data Proxy (C-MADP) 207; multiple (1 to n) access networks (ANs) 231 (including AN 231-1 to AN 231-*n*); a MAMS system 235 including a Network Connection Manager (NCM) 236 and a Network Multi Access Data Proxy (N-MADP) 237; and the multiple (1 to n) core networks 241-1 to 241-*n*. The CCM 206 and NCM 236 handle CP aspects, and the C-MADP 207 and N-MADP 237 handle UP aspects. The core networks (or simply "cores") 241-1 to 241-*n* are elements that anchor the client's 201 network address (e.g., IP address or the like) used for communication with applications via the network. One or more of the cores 241-1 to 241-*n*** may correspond to cloud computing service(s), 5G core network(s) (5GCs), LTE core network(s) (e.g., evolved packet core (EPC)), a DSL/FIXED core, WLAN core, data center(s), and/or other like back-end system.

The client 201 is an end-user device supporting connections with multiple access networks 231-1 to **231-*n* (which may be the same or similar to (R)ANs 110 and/or (R)AN nodes 111 in FIG. 1), possibly over different access technologies. When the client 201 is capable of handling multiple network connections, the client 201 may be referred to as a "multiconnectivity client" or the like. The client 201 may be the same or similar as client 101 depicted by FIG. 1**.

The ANs 231 are network elements in the network that deliver user data packets to the client 201 via respective point-to-point access links 211-1 to **211-*n*, which may include, for example, WiFi links, LTE cellular links, 5G/NR cellular links, DSL (fixed access) connections, and/or the like. In some implementations, the point-to-point access links 211-1 to 211-*n* may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 231 may correspond to (R)ANs 110 and/or (R)AN nodes 111 of FIG. 1**.

A server manager (e.g., NCM 236) is a functional entity in a network 202 (e.g., network element, network appliance, gateway, Edge node(s), cloud node(s), etc.) that handles control messages from a client manager (e.g., CCM 206) and configures multi-access operations on the server side 202. Additionally or alternatively, the NCM 236 is a functional element in the network that handles MAMS control messages from the client 201 and configures the distribution of data packets over the available access and core network paths, and manages the UP treatment (e.g., tunneling, encryption, etc.) of the traffic flows. Additionally or alternatively, the NCM 236 provides the intelligence in the network to configure network paths and UP protocols based on client negotiation. The NCM 236 also acts as a common MA gateway for network policy input and interface to application platforms. One or more NCM 236 instances can be hosted at the access Edge (e.g., in one or more access networks 110, at individual access network nodes 111, and/or in one or more Edge compute nodes) and/or core network gateways.

The NCM 236 configures the network (N-MADP 237) and client (C-MADP 207) UP functions, such as negotiating with the client 201 for the use of available AN paths 221-1 to **221-*n*, protocols, and rules for processing the UP traffic, as well as link-monitoring procedures. The CP messages between the NCM 236 and the CCM 206 are transported as an overlay on the UP, without any impact on the underlying access networks. The NCM 236 handles MAMS CP messages from the client 201 and configures distribution of data packets over the multiple available access paths 221-1 to 221-*n*, delivery paths 222-1 to 222-*n*, and/or core network paths 223-1 to 223-*n*, as well as UP treatment of traffic flows. The CP messages exchanged between the NCM 236 and CCM 206 are transported as an overlay on the UP, without any impact to the underlying ANs 231**.

The CP path 224 may be overlaid over any access UP path. A "path" may be a flow (e.g., an IP flow, UDP flow, etc.) between two hosts. An IP flow or UDP flow may be denoted by a 4-tuple (e.g., IP source address, IP destination address, source port, destination port). Additionally or alternatively, WebSocket is used for transporting management and control messages between the NCM 236 and CCM 206, wherein MX Control Message are carried over (or encapsulated in) a WebSocket, and the WebSocket is carried over (or encapsulated in) TCP/TLS.

A client manager (e.g., CCM 206) is a functional entity in the client device 201 (e.g. desktop, workstation, laptop, smartphone, smart appliance, IoT device, etc.) that exchanges control messages with a server manager (e.g., NCM 236) to configure multi-access operations on the client side 201. Additionally or alternatively, the CCM 206 is a functional entity in the client 201 that exchanges MAMS signaling messages with the NCM 236, and which configures the network paths at the client 201 for the transport of user data.

The CCM 206 is a peer functional element in the client 201 for handling MAMS CP procedures. The CCM 206 manages multiple network connections 221-1 to **221-*n* at the client 201, and configures the multiple network paths 221-1 to 221-*n* at the client 201 for transport of user data. The CCM 206 exchanges MAMS signaling with the NCM 236 to support such functions as the configuration of the UL and DL user network path for transporting user data packets and the adaptive selection of network path by the NCM 236 by reporting on the results of link probing. Link probing and reporting may be used to support adaptive network path selection by the NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224**.

The C-MADP 207 is a functional entity in the client 201 that handles user data traffic forwarding across multiple network paths. The C-MADP 207 is responsible for MAMS-specific UP functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to **222-*n* and the UP protocols to be used for UL user data traffic based on the signaling exchanged with the NCM 236**.

The N-MADP 237 is a functional entity in the network 202 that handles the forwarding of user data traffic across multiple network paths. The N-MADP 237 is responsible for MAMS-related UP functionalities in the network 202. Such as encapsulation, fragmentation, concatenation, reordering, retransmission, etc. The N-MADP 237 is the distribution node that routes the UL UP traffic to the appropriate anchor connection 223-1 to **223-*n* towards a respective core network 241-1 to 241-*n*, and the DL user traffic to the client 201 over the appropriate delivery connection(s) 222-1 to 222-*n*. The anchor connections 223-1 to 223-*n* are network paths from the N-MADP 237 to the UP gateway (IP anchor) that has assigned an network address to the client 201, and the delivery connections 222-1 to 222-*n* are network paths from the N-MADP 237 to the client 201. One or more The N-MADP 237 instances can be hosted at the Access Edge (e.g., in one or more access networks 110 and/or at individual access network nodes 111) and/or Core Gateways. The N-MADP 237 instances may be hosted with or separate from the NCM 236** instances.

In the DL, the NCM 236 configures the use of delivery connections 222-1 to **222-*n*, and UP protocols at the N-MADP 237 for transporting user data traffic. The N-MADP 237 may implement Equal-Cost Multi-Path routing (ECMP) support for the down link traffic. Additionally or alternatively, the N-MADP 237 may be connected to a router or other like network element (e.g., AP XE136 of Figure XE1) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237** can be configured with appropriate UP protocols to support both per-flow and per-packet traffic distribution across the delivery connections.

In the UL, the N-MADP 237 selects the appropriate anchor connection 223-1 to **223-*n* over which to forward the user data traffic, received from the client 201 via one or more delivery connections 222-1 to 222-*n*. The forwarding rules in the UL at the N-MADP 237 are configured by the NCM 236 based on application requirements (e.g., enterprise hosted application flows via a LAN or WLAN anchor 241 (e.g., WiFi, cloud, and/or Edge network), Mobile Operator hosted applications via a cellular core network 241**, and/or the like).

The NCM 236 and the N-MADP 237 can be either collocated with one another or instantiated on different network nodes. The NCM 236 can setup multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the UP node at the access Edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 231-1, **231-*n* may be used to manage traffic distribution across LTE and WiFi traffic. Furthermore, a single client 201 can be configured to use multiple N-MADP 237 instances, which may be used for addressing different application requirements. For example, individual N-MADP 237** instances may be used to handle TCP and UDP transport based traffic.

The CCM 206 and NCM 236 exchange signaling messages to configure the UP functions, C-MADP 207 and N-MADP 237, at the client and network respectively. The CCM 206 may obtain the CCM 236 credentials (FQDN or network address) for sending the initial discovery messages. As an example, the client 201 can obtain the NCM 236 credentials using methods like provisioning, DNS query. Once the discovery process is successful, the (initial) NCM

236 can update and assign additional NCM 236 addresses, for example, based on MCC/MNC tuple information received in the MX Discovery Message, for sending subsequent CP messages.

The CCM 206 discovers and exchanges capabilities with the NCM 236. The NCM 236 provides the credentials of the N-MADP 237 end-point and negotiates the parameters for UP with the CCM 206. CCM 206 configures C-MADP 207 to setup the UP path (e.g., MPTCP/UDP Proxy Connection) with the N-MADP 237 based on the credentials (e.g., (MPTCP/UDP) Proxy network address (e.g., IP address and port), Associated Core Network Path), and the parameters exchanged with the NCM 236. Further, NCM 236 and CCM 206 exchange link status information to adapt traffic steering and UP treatment with dynamic network conditions. The key procedures are described in details in the following subsections.

A UDP (or QUIC) connection may be configured between the C-MADP 207 and the N-MADP 237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 237 end-point network address (e.g., IP address or the like) and port number (e.g., UDP port number of the UDP connection) is used to identify MX control PDUs.

The various elements depicted in the example of FIG. 2 may be implemented using a variety of different physical and/or virtualized components. For example, the elements within MAMS network 202 may be implemented using one or more components of an edge node, such as one or more LTE or 5G RANs (or RAN nodes), a MEC host (see e.g., [MEC]), O-RAN RIC (see e.g., [O-RAN]), 3GPP Edge nodes (see e.g., [SA6Edge]), and/or the like. Additionally or alternatively, the MAMS system 235 may be implemented in or by an individual RAN node, such as one or more of the RAN nodes 111 in FIGS. 1A-1C. In one example, the MAMS system 235 is implemented as part of the layer 3 (L3) protocol stack (e.g., the RRC layer or the like). In another example, the MAMS system 235 is implemented as part of a layer above L3 such as the network layer (e.g., IP, UDP, QUIC, GTP-U, etc.) data plane protocol stack of the RAN nodes. In another example, the MAMS system 235 may be is implemented as a separate layer between the L3 and upper layers. In another example, the MAMS system 235 may be implemented in or by a gNB-CU of a CU/DU split architecture. In another example, the MAMS system 235 may be implemented in or by a vBBU pool, or a cloud RAN (C-RAN). Additionally or alternatively, the functional elements within MAMS network 202 may be implemented by one or more network functions (or as a VNF) of CN 150A in FIG. 1. For example, the N-MADP 237 may run on an S-GW or P-GW when CN 150A is an EPC, or the N-MADP 237 may run on a User Plane Function (UPF) when CN 150A is a 5GC.

In MEC-based implementations (see e.g., [MEC]), the MAMS system 235 may be implemented in or by a MEC host/server that is located in, or co-located with, a RAN 110 or RAN node 111. The functions that are located in the network side (e.g., the NCM 236 and N-MADP 237) can be hosted either at a centralized location or at an edge cloud. They can be deployed either as MEC application or co-located with other functions such as a MEC platform (see e.g., [MEC]). Additionally or alternatively, up-to-date information from the access networks may be provided to the NCM 236 for intelligent network path selection over APIs by the MEC platform (see e.g., [MEC]) the same way as it exposes RNI over RNI API, TMS over a TMS API, and/or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

In additional or alternative MEC-based implementations (see e.g., [MEC]), the NCM 236 can be hosted on a MEC cloud server that is located in the UP path at the Edge of the multi-technology access network. The NCM 236 and CCM 206 can negotiate the network path combinations based on an application's needs and the necessary UP protocols to be used across the multiple paths. The network conditions reported by the CCM 206 to the NCM 236 can be complemented by a Radio Analytics application residing at the MEC cloud server to configure the UL and DL access paths according to changing radio and congestion conditions. Additionally or alternatively, the UP functional element (e.g., the N-MADP 237) can either be collocated with the NCM 236 at the MEC cloud server (e.g., MEC-hosted applications, etc.) or placed at a separate network element like a common UP gateway across the multiple networks. Also, even in scenarios where an N-MADP 237 is not deployed, the NCM 206 can be used to augment the traffic steering decisions at the client 201. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 237 instance or C-MADP 207 instance (see e.g., FIG. 2) instantiated with GMA as the convergence protocol that receives packets encapsulated or otherwise generated according to GMA procedures, and processes the received packets per the procedures discussed in Zhu et al., *Generic Multi-Access* (*GMA*) *Convergence Encapsulation Protocols*, IETF RFC 9188 (February 2022), https://datatracker.ietf.org/doc/rfc9188/("[RFC9188]"), the contents of which is hereby incorporated by reference in its entirety. Additionally, as used herein a "GMA transmitter" may be an N-MADP 237 instance or C-MADP 207 instance instantiated with GMA as the convergence protocol that processes and/or encapsulates or otherwise generates packets/PDUs according to GMA procedures discussed in [RFC9188].

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an Edge computing platform/service (e.g., ETSI MEC, and/or the like), and/or using suitable Virtual Machines (VMs)

and/or containers provided by such a cloud computing service/platform and/or Edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the Edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 3:
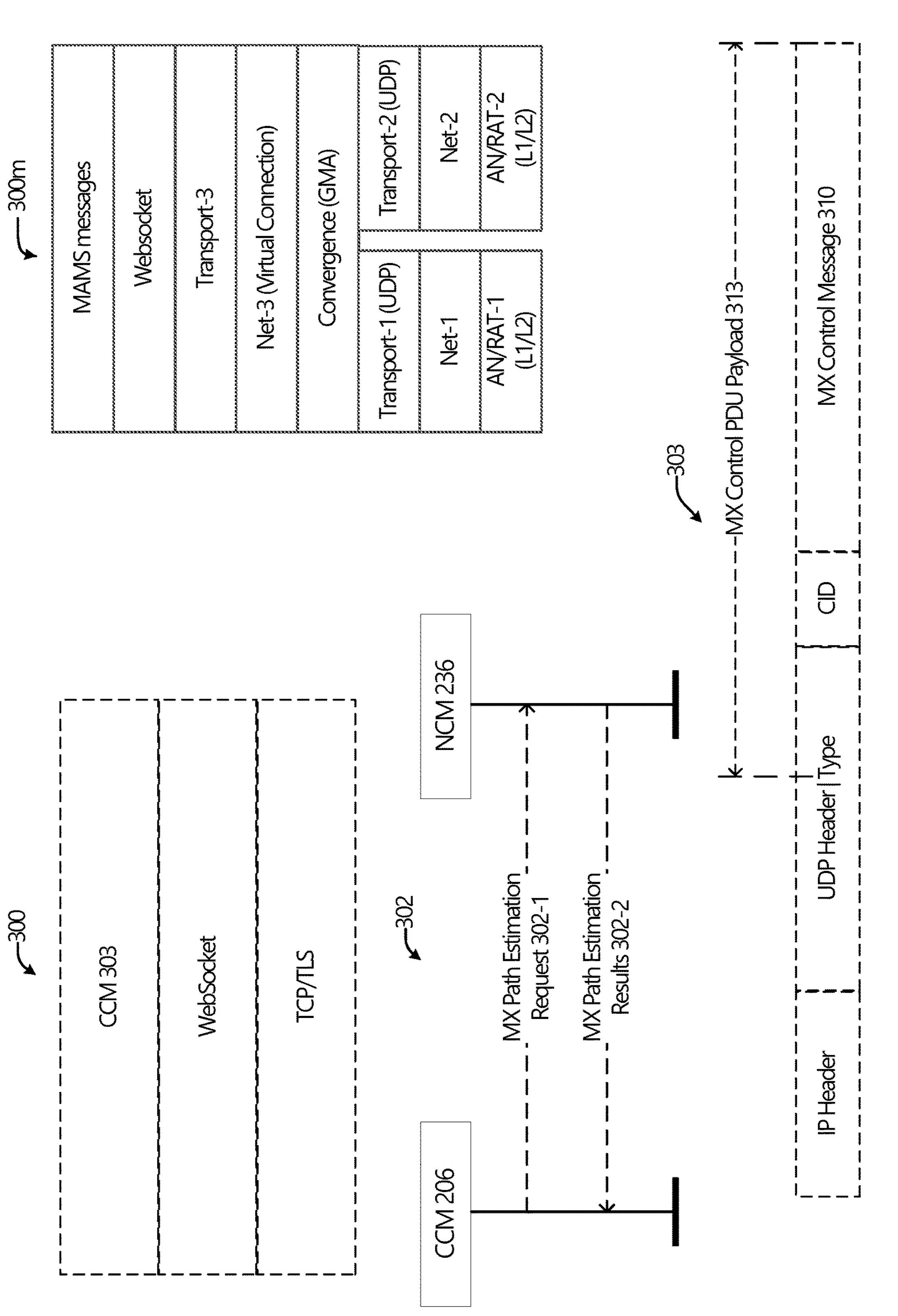
FIG. 3 illustrates an example multi-access (MX) control plane protocol and MX control messages.

FIG. 3 depicts an example MAMS Control-Plane Protocol Stack (CPPS) 300. The CPPS 300 includes an Multi-Access (MX) Control Message layer 303, a WebSocket layer, and a Transport Control Protocol (TCP)/Transport Layer Security (TLS) layer. Here, WebSocket (see e.g., Fette et al., *The WebSocket Protocol*, IETF RFC 6455 (December 2011) and McManus et al., *Bootstrapping WebSockets with HTTP* 2, IETF RFC 8441 (September 2018)) is used for transporting management and control messages (e.g., MX Control Messages 303) between the NCM 236 and the CCM 206. Each MAMS control message 3003 may include one or more of the following fields: Version (indicates the version of the MAMS control protocol); Message Type (indicates the type of the message, e.g., MX Discover, MX Capability Request (REQ)/Response (RSP)); and Sequence Number (SN) (Auto-incremented integer to uniquely identify a particular message exchange (e.g., MX Capability Request/Response).

FIG. 3 shows a MAMS management protocol stack 300*m*. Here, a secure websocket is established over a third transport layer (e.g., TCP, UDP, IP Security Protocol (IPSec), etc.) tunnel that is established over a virtual network layer (anchor) connection (e.g., IP or some other suitable network layer protocol) for sending MAMS management messages between the CCM 206 and the NCM 236. The virtual (anchor) connection is on top of a convergence layer that implements a convergence protocol (e.g., GMA or the like), which encapsulates the MAMS management messages in the virtual (anchor) connection packet(s) (e.g., IP packets). The convergence (GMA) layer resides on top of respective transport (e.g., UDP or IPSec) tunneling layers for respective access networks (ANs) 1 and 2, which is on top of respective network layers (e.g., IP or the like), which are on top of layer 2 (L2) and Layer 1 (L1) of the respective access networks/RATs 1 and 2.

In some implementations, when the virtual connection has not been set up, the CCM 206 can only establish the secure websocket over one of the delivery IP connections first (e.g., RAT-1). After the virtual IP connection is up, the CCM 206 will close it and establish a new one over the (anchor) virtual IP connection, and the corresponding (virtual) IP packets (carrying one or more MAMS messages) are encapsulated in a same or similar way as data packets (see e.g., FIG. 17).

FIG. 3 also shows a MAMS Control-Plane (CP) Procedure 302 for Path Quality Estimation. Path quality estimations can be done either passively or actively. Traffic measurements in the network can be performed passively by comparing real-time data throughput of the client 201 with the capacity available in the network. In special deployments where the NCM 236 has interfaces 222 with access nodes 231, 111, the direct interfaces can be used to gather information regarding path quality. For example, the utilization of an LTE access node (eNB), to which the client 201 is attached, could be used as data for the estimation of path quality without creating any extra traffic overhead. Active measurements by the client 201 provide an alternative way to estimate path quality.

Procedure 302 begins at operation 302-1 where the NCM 236 sends an MX Path Estimation Request to the CCM 206. At operation 302-2, the CCM 206 sends an MX Path Estimation Results message to the NCM 236. The NCM 236 may send one or more of the following configuration parameters in the MX Path Estimation Request (operation 302-1) to the CCM 206: Connection ID (of the delivery connection 222 whose path quality needs to be estimated); Init Probe Test Duration (ms); Init Probe Test Rate (Mbps); Init Probe Size (bytes); Init Probe-ACK Required (0→No/1→Yes); Active Probe Frequency (ms); Active Probe Size (bytes); Active Probe Test Duration (ms); and Active Probe-ACK Required (0→No/1→Yes).

The CCM 226 configures the C-MADP 207 for probe receipt based on these parameters and for collection of the statistics according to the following configuration: Unique Session ID (session identifier provided to the client in an MX Capability Response); Init Probe Results Configuration (e.g., including Lost Probes (percent), and/or Probe Receiving Rate (packets per second)); Active Probe Results Configuration (e.g., including Average Throughput in the last Probe Duration).

The UP probing is divided into two phases: the Initialization phase and the Active phase. For the Initialization Phase, a network path that is not included by the N-MADP 237 for transmission of user data is deemed to be in the Initialization phase. The user data may be transmitted over other available network paths. For the Active Phase, a network path that is included by the N-MADP 237 for transmission of user data is deemed to be in the Active phase.

During the Initialization phase, the NCM 236 configures the N-MADP 237 to send an Init Probe-REQ message. The CCM 206 collects the Init Probe statistics from the C-MADP 207 and sends the MX Path Estimation Results message (operation 302-2) to the NCM 236 per the Initialization Probe Results configuration.

During the Active phase, the NCM 236 configures the N-MADP 237 to send an Active Probe-REQ message. The C-MADP 207 calculates the metrics as specified by the Active Probe Results configuration. The CCM 206 collects the Active Probe statistics from the C-MADP 207 and sends the MX Path Estimation Results message to the NCM 236 (operation 302-2) per the Active Probe Results configuration.

FIG. 3 also shows an MX Control message format 303. As shown, the MX Control message 303 includes an IP header, a UDP header, and an MX Control PDU Payload 313. The MX Control PDU Payload 313 includes a type field, a CID field, and an MX Control Message 310. The MX Control PDU 313 may include one or more of the following fields:

Type (1 byte) to indicate the type of the MX Control message (a value of "0" indicates a Keep-Alive type, and a value of "1" indicates a Probe-REQ/ACK type; Others: Reserved); CID (1 byte) to indicate a connection ID of the delivery connection for sending the MX Control message 303; and an MX Control Message 310 (variable size/length) including the payload of the MX Control message 310. The MX Control message 303/PDU 310 is sent as a normal UP packet over the desired delivery connection whose quality and reachability need to be determined.

The control message 303/PDU 310 may be encoded as a Keep-Alive and/or Probe-REQ/ACK messages to support path quality estimation. The "Type" field is set to "0" for Keep-Alive messages. The C-MADP 207 may periodically send a Keep-Alive message over one or multiple delivery connections 222-1 to **222-*n* (e.g., ANCs 105, 106, and/or 107), especially if UDP tunneling is used as the adaptation method for the delivery connection 222 with a NAT function on the path. A Keep-Alive message is 2 bytes long and includes a Keep-Alive Sequence Number field (2 bytes) to indicate the sequence number (SN) of the Keep-Alive message. The "Type" field is set to "1" for Probe-REQ/ACK messages. The N-MADP 237 may send a probe request (Probe-REQ) message for path quality estimation. In response, the C-MADP 207** may return a probe acknowledgement (Probe-ACK) message.

A Probe-REQ message may include one or more of the following fields: Probing Sequence Number (2 bytes) to indicate an SN of the Probe REQ message; Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the Reverse Connection ID (R-CID) field, and Bits 3-7 are Reserved; Reverse Connection ID (R-CID) (1 byte) to indicate the connection ID of the delivery connection for sending the Probe-ACK message on the reverse path; and Padding (variable). The "Padding" field is used to control the length of the Probe-REQ message. The "R-CID" field is only present if both Bit 0 and Bit 2 of the "Probing Flag" field are set to "1". Moreover, Bit 2 of the "Probing Flag" field should be set to "0" if Bit 0 is "0", indicating that the Probe-ACK message is not expected. If the "R-CID" field is not present, but Bit 0 of the "Probing Flag" field is set to "1", the Probe-ACK message should be sent over the same delivery connection as the Probe-REQ message.

The C-MADP 207 should send the Probe-ACK message in response to a Probe-REQ message with the Probe-ACK flag set to "1". A Probe-ACK message is 3 bytes long and includes a Probing Acknowledgment Number field (2 bytes) to indicate/include a sequence number of the corresponding Probe-REQ message.

The CCM 206 and NCM 236 exchange signaling messages to configure the UP functions via the C-MADP 207 and the N-MADP 237 at the client and the network, respectively. The means for the CCM 206 to obtain the NCM 236 credentials (e.g., Fully Qualified Domain Name (FQDN) or network address (e.g., IP address, or the like)) for sending the initial discovery messages are out of scope for this document. As an example, the client can obtain the NCM 236 credentials by using such methods as provisioning or DNS queries. Once the discovery process is successful, the (initial) NCM 236 can update and assign additional NCM 236 addresses (e.g., based on Mobile Country Code (MCC)/Mobile Network Code (MNC) tuple information received in the MX Discover message) for sending subsequent CP messages.

The CCM 206 discovers and exchanges capabilities with the NCM 236. The NCM 236 provides the credentials of the N-MADP 237 endpoint and negotiates the parameters for the user plane with the CCM. The CCM 206 configures the C-MADP 207 to set up the UP path (e.g., MPTCP/UDP Proxy connection) with the N-MADP, based on the credentials (e.g., (MPTCP/UDP) Proxy network address (e.g., IP address or the like) and port, associated core network path), and the parameters exchanged with the NCM 236. Further, the NCM 236 and CCM 206 exchange link status information to adapt traffic steering and UP treatment to dynamic network conditions.

After sending a MAMS control message, the MAMS CP peer (NCM 236 or CCM 206) waits for a duration of MAMS_TIMEOUT ms before timing out in cases where a response was expected. The sender of the message will retransmit the message for MAMS_RETRY times before declaring failure if no response is received. A failure implies that the MAMS peer is dead or unreachable, and the sender reverts to native non-multi-access/single-path mode. The CCM 206 may initiate the MAMS discovery procedure for re-establishing the MAMS session.

MAMS CP peers execute the keep-alive procedures to ensure that the other peers are reachable and to recover from dead-peer scenarios. Each MAMS CP endpoint maintains a Keep-Alive timer that is set for a duration of MAMS_KEEP_ALIVE_TIMEOUT. The Keep-Alive timer is reset whenever the peer receives a MAMS control message. When the Keep-Alive timer expires, an MX Keep-Alive Request is sent.

The values for MAMS_RETRY and MAMS_KEEP_ALIVE_TIMEOUT parameters used in keep-alive procedures are deployment dependent. As an example, the client 201 and network can obtain the values using provisioning. On receipt of an MX Keep-Alive Request, the receiver responds with an MX Keep-Alive Response. If the sender does not receive a MAMS control message in response to MAMS_RETRY retries of the MX Keep-Alive Request, the MAMS peer declares that the peer is dead or unreachable. The CCM 206 may initiate the MAMS discovery procedure for re-establishing the MAMS session.

Additionally, the CCM 206 immediately sends an MX Keep-Alive Request to the NCM whenever it detects a handover from one (R)AN node 111 to another (R)AN node 111. During this time, the client 201 stops using MAMS UP functionality in the UL direction until it receives an MX Keep-Alive Response from the NCM 236.

The MX Keep-Alive Request includes the following information: Reason (e.g., can be timeout or handover. Handover shall be used by the CCM 206 only on detection of a handover); Unique Session ID (Unique session identifier for the CCM 206 that set up the connection. If the session already exists, then the existing unique session identifier is returned. An NCM ID is a unique identity of the NCM 236 in the operator network, and the session ID is a unique identity assigned to the CCM 206 instance by this NCM 236 instance); Connection ID (if the reason is handover, the inclusion of this field may be mandatory); and Delivery Node ID (identity of the node to which the client is attached. In the case of LTE, this is an E-UTRAN Cell Global Identifier (ECGI). In the case of WiFi, this is an AP ID or a Media Access Control (MAC) address. If the reason is “Handover”, the inclusion of this field may be mandatory).

The present disclosure provides new mechanisms to support dynamic traffic splitting/steering at the convergence (sub)layer in MAMS. Existing solutions include various are e2e protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

[RFC9188] specifies how to dynamically split user data traffic over multiple links at the MX convergence sublayer. The present disclosure provides dynamic traffic splitting for different optimization targets such as reducing e2e delay (e.g., “low delay”) or minimizing cellular (e.g., 5G/NR, LTE, etc.) usage (e.g., “low cost”). The present disclosure includes GMA-based traffic splitting that operates in the convergence layer of the MAMS framework (see e.g., FIGS. 1-3). The GMA-based traffic splitting mechanisms are transparent to lower layers and do not require any information from those layers. Two multi-path traffic splitting options are provided including a low delay and low cost options. Various Edge computing frameworks, such as the MEC framework discussed herein, may be used to operate/implement the GMA-based traffic splitting. One example implementation includes using the Smart-Edge/MEC platform provided by Intel®.

Figure 4:
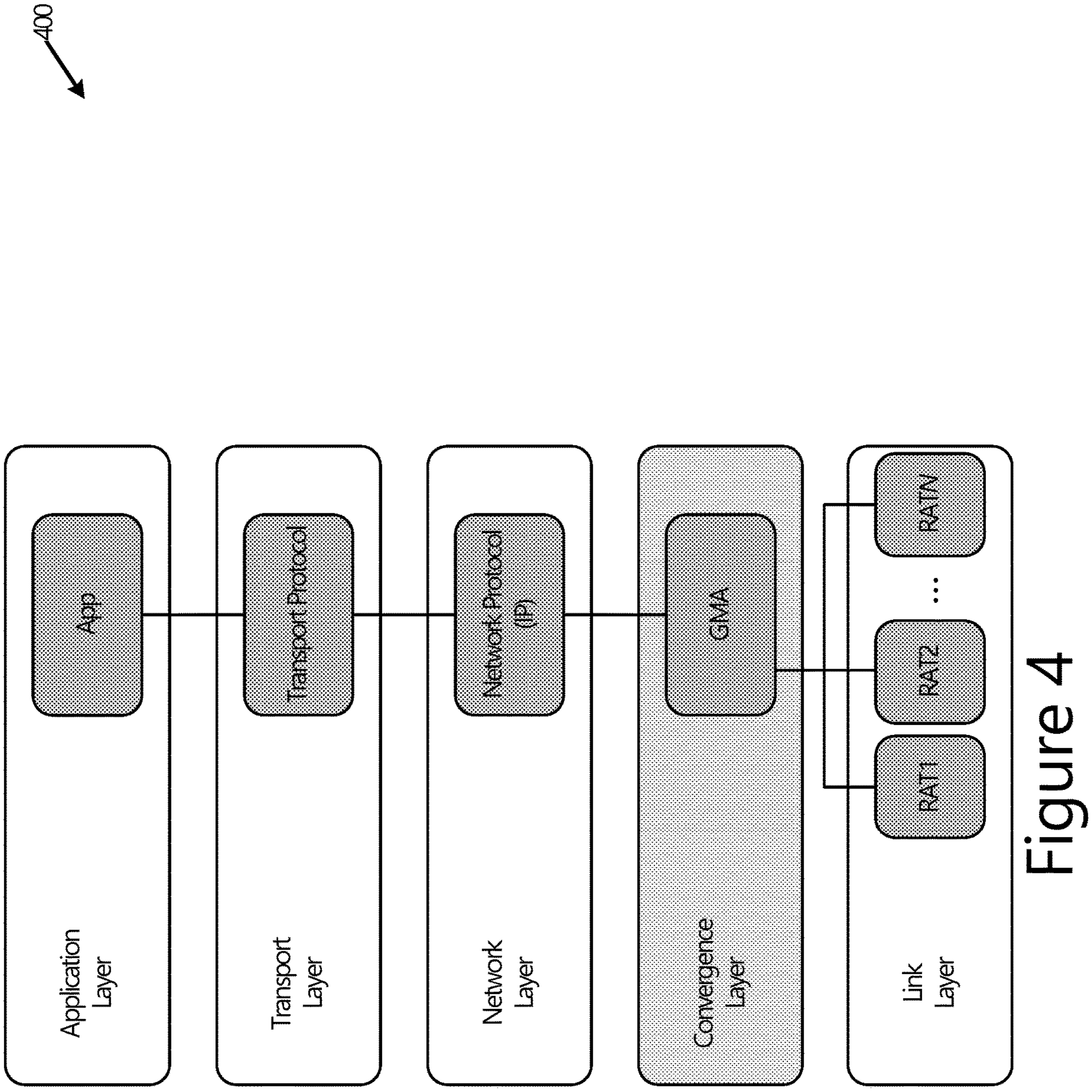
FIG. 4 depicts a network model with convergence layer.

FIG. 4 depicts a network model (protocol stack) 400 with a convergence layer. In FIG. 4, an application layer (including one or more apps) is on top of a transport layer (which includes at least one transport protocol), which is on top of a network layer (which includes at least one network protocol), which is on top of the convergence layer (which includes at least one convergence protocol, which is GMA in this example), which is on top of a link layer (which includes 1 to NRAT protocols (where Nis a number)). The transport layer protocol may implement one or more transport protocols such as, for example, TCP, UDP, QUIC, and/or any other suitable transport protocol such as those discussed herein. Additionally or alternatively, the network layer protocol may be IP and/or any other suitable network protocol such as those discussed herein.

Figure 5:
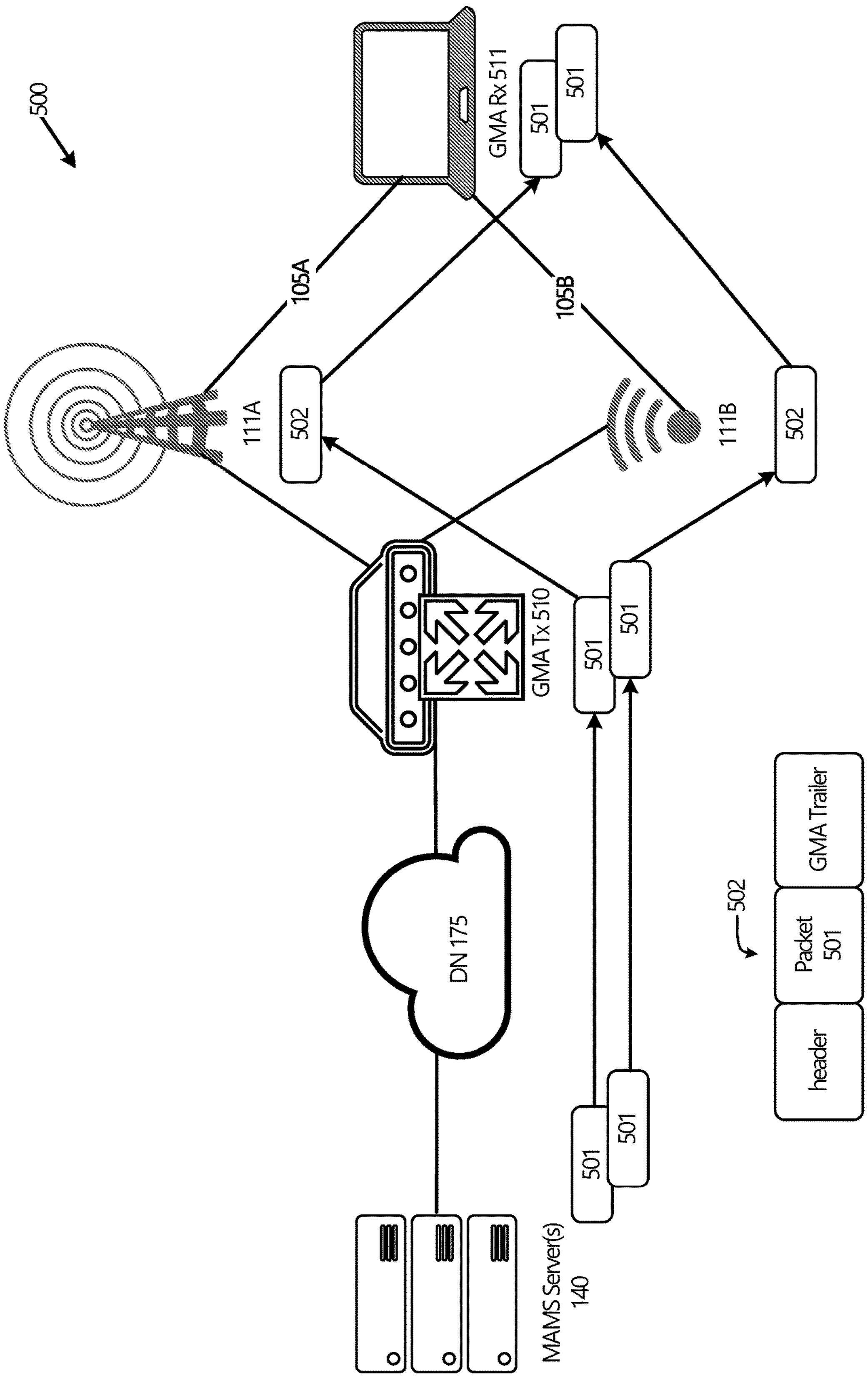
FIG. 5 depicts an example of GMA-based multi-access traffic splitting for downlink.

FIG. 5 shows a GMA multi-access traffic splitting example 500 for a downlink direction. In the example 500, data packets 501 are sent by the MAMS server(s) 140 to a GMA transmitter (Tx) 510 via the DN 175 (e.g., the Internet). The data packets 501 may have any suitable network protocol format; for example, the data packets 501 may be IP packets or the like. The GMA Tx 510 sends one or more packets to NAN 111A for delivery to a GMA receiver (Rx) 511 (e.g., client 101) and sends one or more packets to NAN 111B for delivery to the GMA Rx 511 (e.g., client 101). The NANs 111A, 111B generate encapsulated packets 502 from the packets 501 by adding a header (e.g., an IP header) and a GMA trailer (discussed in more detail infra) to each packet 501. The encapsulated packets 502 are then sent to the client 101 over the respective access network connections 105. The methods for encapsulating the packets 501 is discussed in [RFC9188].

The main responsibilities of the convergence protocol (see e.g., FIG. 4) is based on whether the entity is acting as a GMA Tx entity 510 or a GMA Rx entity 511. The GMA Tx entity 510 splits or duplicates traffic over multiple radio links 105 and retransmits packets over a different radio link 105 based on e2e measurements. The GMA Rx entity 511 reorders packets received over different radio links 105 and forwards those packets to higher layer entities, in sequence.

1.1. Trigger-Based Keep-Alive & Probing Mechanisms

As mentioned previously, MAMS is a programmable framework that provides mechanisms for flexible selection of network paths in a multi-connection (access) communication environment, based on application needs. MAMS leverages network intelligence and policies to dynamically adapt traffic distribution across selected paths and user plane treatment to changing network/link conditions. The network path selection and configuration messages are carried as user plane data between the functional elements in the network and the end-user device, and thus, without any impact to the control plane signaling schemes of the individual access network.

Figure 13:
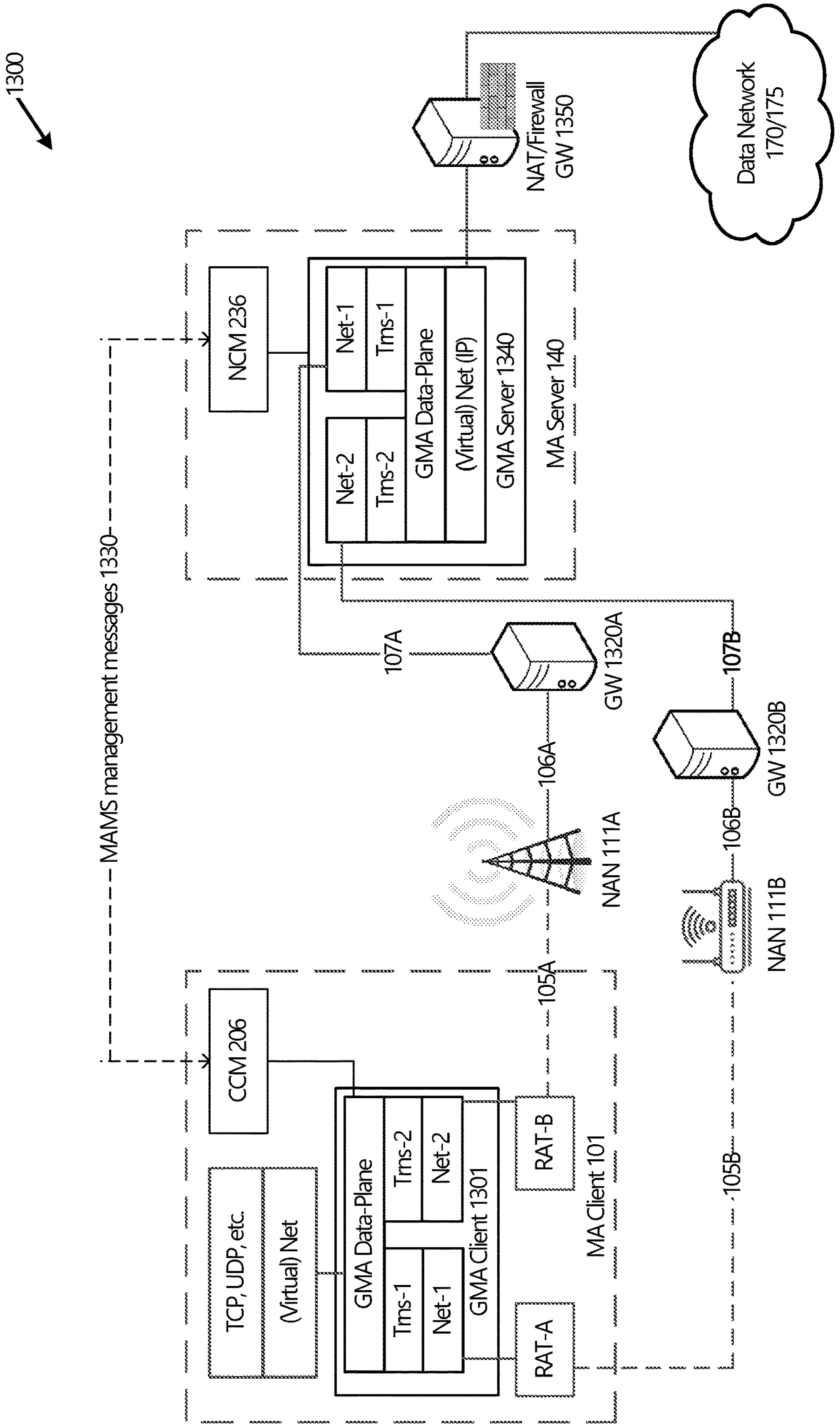
FIG. 13 depicts an OTT Generic Multi-Access (GMA) end-to-end (e2e) Network Reference Architecture.

Referring back to FIG. 1, the MX convergence (sub)layer operates on top of the MX adaptation (sub)layer in the protocol stacks 102 and 142. From the Transmitter (Tx) perspective, a User Payload (e.g. IP PDU) is processed by the convergence sublayer first, and then by the adaptation sublayer before being transported over a delivery access connection (e.g., connection 105A or connection 105B). From the Receiver (Rx) perspective, a packet (e.g., IP packet) received over a delivery connection is processed by the MX adaptation sublayer first, and then by the MX convergence sublayer (this is also shown by FIG. 13, which is discussed in more detail infra). The present disclosure provides mechanisms to support dynamic traffic splitting at the MX convergence (sub)layer.

FIG. 13 shows a MAMS network example 1300, where a virtual connection (established between an MA client 101 and MA server 140) operates as the anchor for applications, and RAT-A connection 105A & RAT-B connection 105B are used only for delivery. As a result, user data traffic can be seamlessly steered, switched, or split across RAT-A (e.g., 5G, LTE, etc.) and RAT-B (e.g., WiFi, etc.) without any impact to the application. The GMA protocol was specified in [RFC9188] to allow dynamically splitting user data traffic over multiple links at the MX convergence sublayer.

Figure 16:
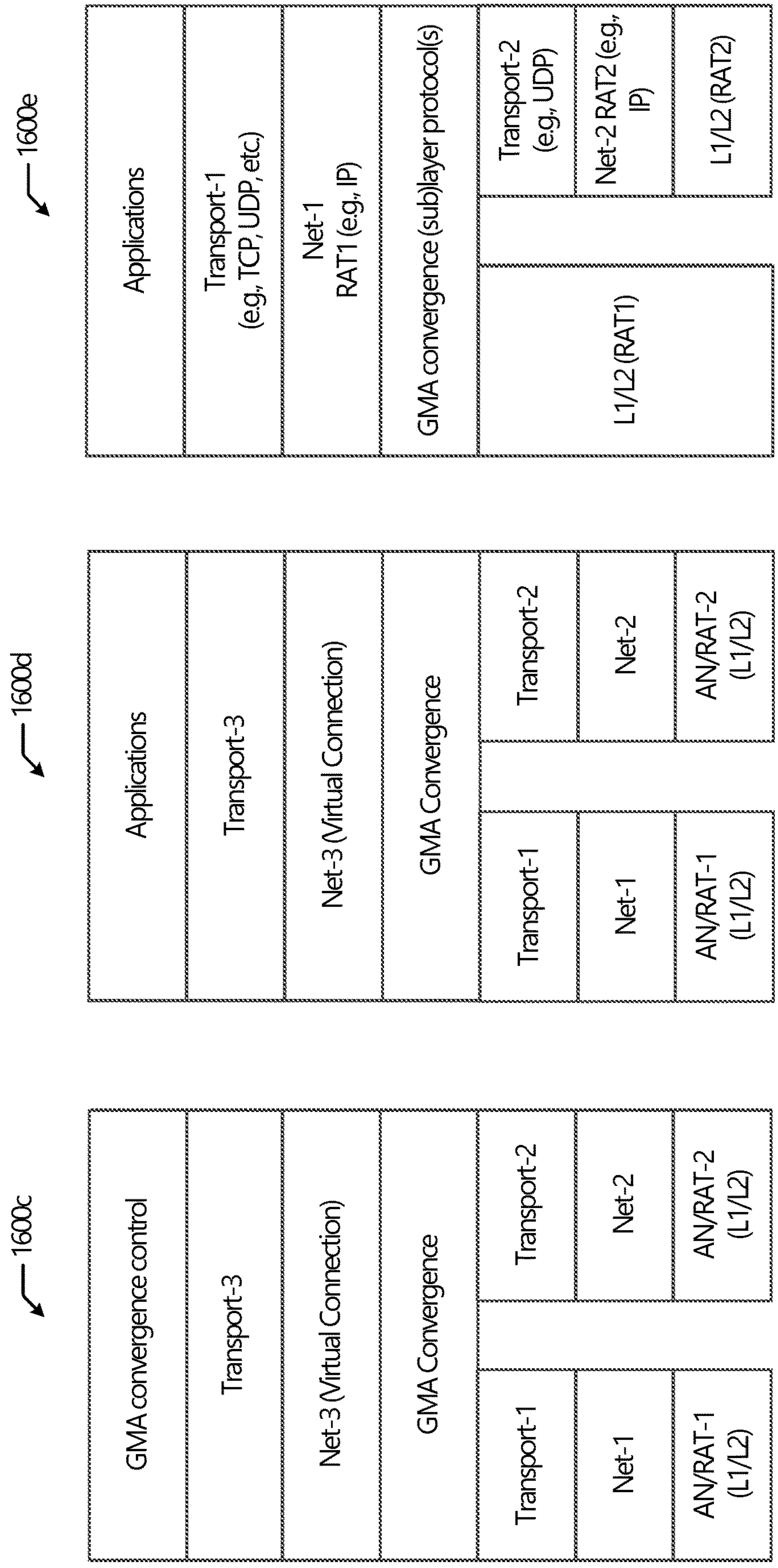
FIG. 16 depicts an example GMA-based data plane protocol stack for OTT MAMS deployments and a GMA-based MAMS data plane protocol stack.

FIG. 16 shows the (virtual-anchor) MAMS data-plane protocol stack 1600*d* (see e.g., Int'l App. No. PCT/US2021/038063 filed on 18 Jun. 2021 (“[AD0072-PCT]”), which is hereby incorporated by reference in its entirety), in which a transport protocol (e.g., UDP, MPUDP, TCP, MPTCP, QUIC, and/or the like) tunneling is used as the adaption protocol for transporting user network (e.g., IP, and/or the like) traffic over RAT-B (e.g., WiFi, and/or the like) or RAT-A (e.g., 5G, LTE, and/or the like). The GMA convergence sublayer (see e.g., FIGS. 1-5 and [RFC9188]) is responsible for multi-path operations (e.g., lossless switching, aggregation/splitting, etc.). It is also responsible for sending periodic keep-alive messages to prevent the network address translation (NAT) port mapping at RAT-B NAN 111B and/or GW 1320B (e.g., WiFi router, switch, hub, gateway appliance, and/or the like) and/or RAT-A NAN 111A and/or GW 1320A (e.g., Cellular Gateway, etc.) from expiring. However, the NAT timeout for UDP is quite short (e.g., 60 seconds). As a result, the periodic keep-alive interval at the convergence sublayer must be less than this period of time (e.g., 60 seconds), significantly impacting client battery life. The present disclosure provides a solution to address this problem.

Existing solutions, such as those as specified in [RFC8743] § 8.6.2, includes sending keep-alive messages periodically. However, this solution has high power consumption when the client device is idle.

Figure 15:
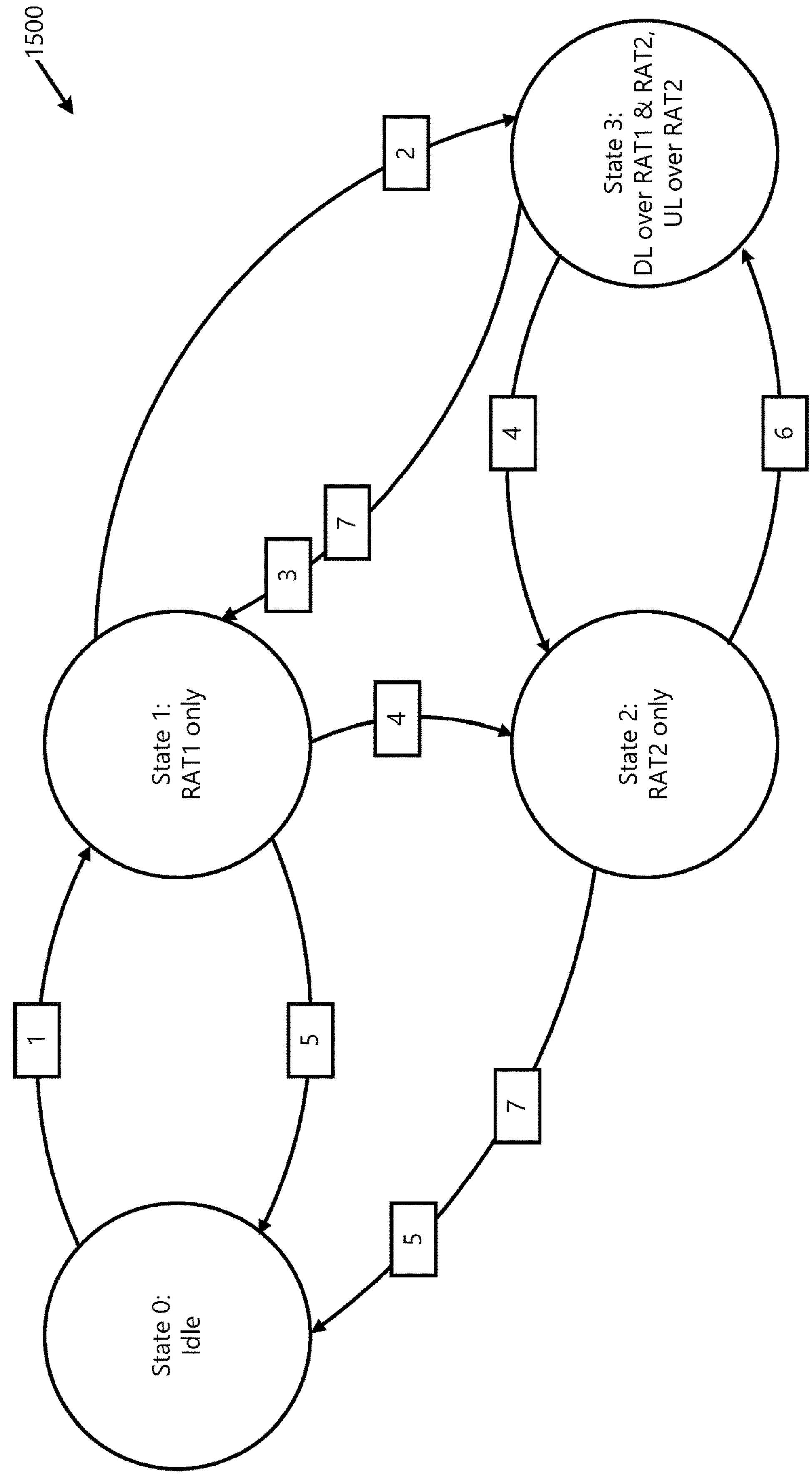
FIG. 15 illustrates a client-based GMA Data Traffic Control State Machine.

In the present disclosure, keep-alive messages are sent based on triggers, and control message transmissions are avoided when the MA client 101 (or Gc 1301) is in an idle state (see e.g., FIG. 15). In addition, the trigger message is sent over a suitable transport protocol, for example, TCP because the NAT timeout for an established TCP connection is much longer (e.g., 2 hours) (see e.g., Guha et al., *NAT Behavioral Requirements for TCP*, behavior, IETF RFC 5382 (October 2008) ("[RFC5382]") and/or Penno et al., *Updates to NetworkAddress Translation (NAT) Behavioral Requirements*, IETF RFC 7857 (April 2018) ("[RFC7857]")). In one example, the techniques discussed herein may be implemented using the Smart-Edge/MEC platform provided by Intel®.

Figure 6:
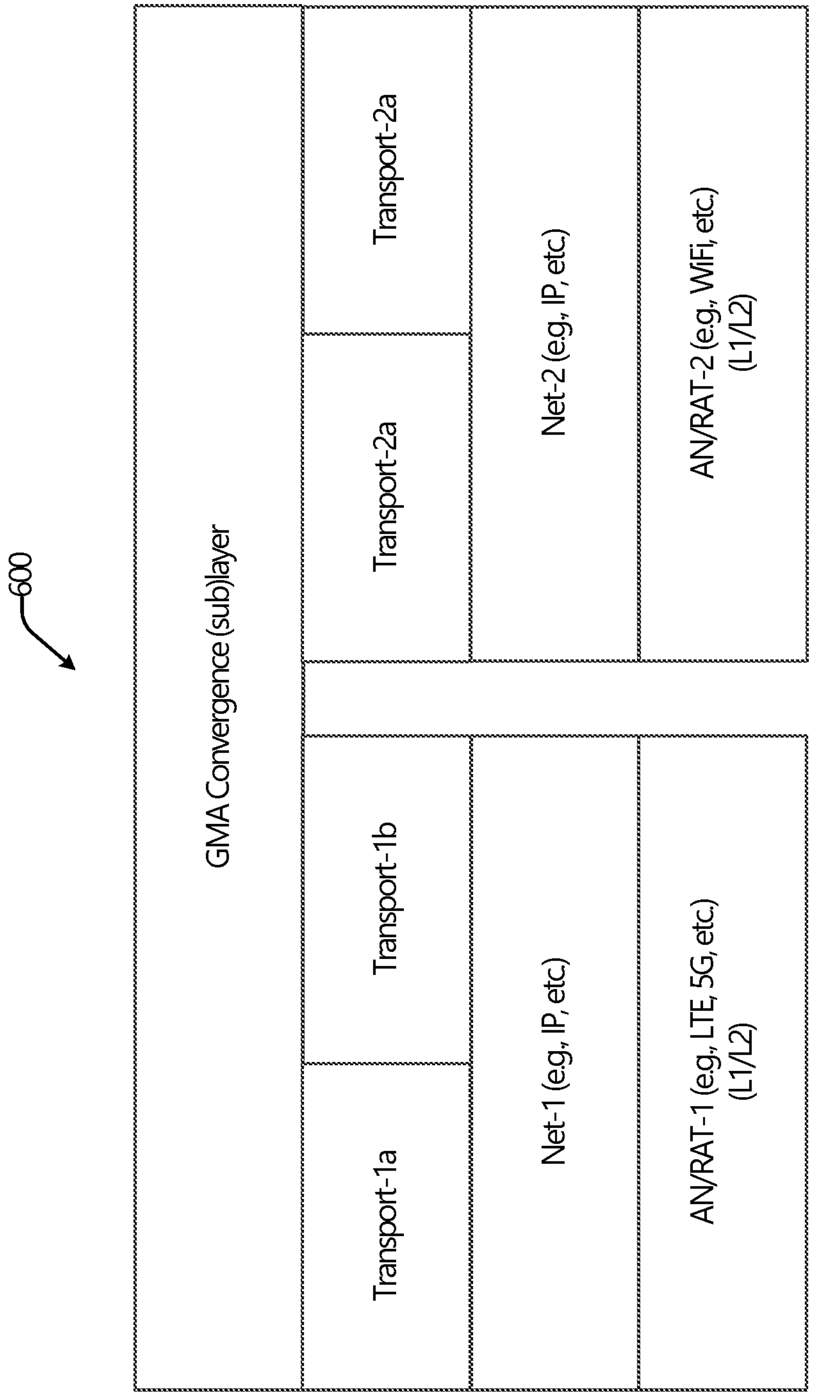
FIG. 6 depicts an MX data plane protocol stack.

FIG. 6 shows an enhanced Multi-Access data-plane protocol stack, in which a first transport protocol (including Transport-1a and Transport-1b for RAT-1 and Transport-2a and Transport-2b for RAT-2) are used at the adaptation sublayer. In one example, Transport-1a and Transport-2a are TCP, and Transport-1b and Transport-2b are UDP. Specifically, Transport-1b and Transport-2b (e.g., UDP and/or the like) is used for keep-alive messages and transporting user data packets as specified in [RFC8743] and [RFC9188]. TCP is used for sending out the new trigger message.

Figure 7A:
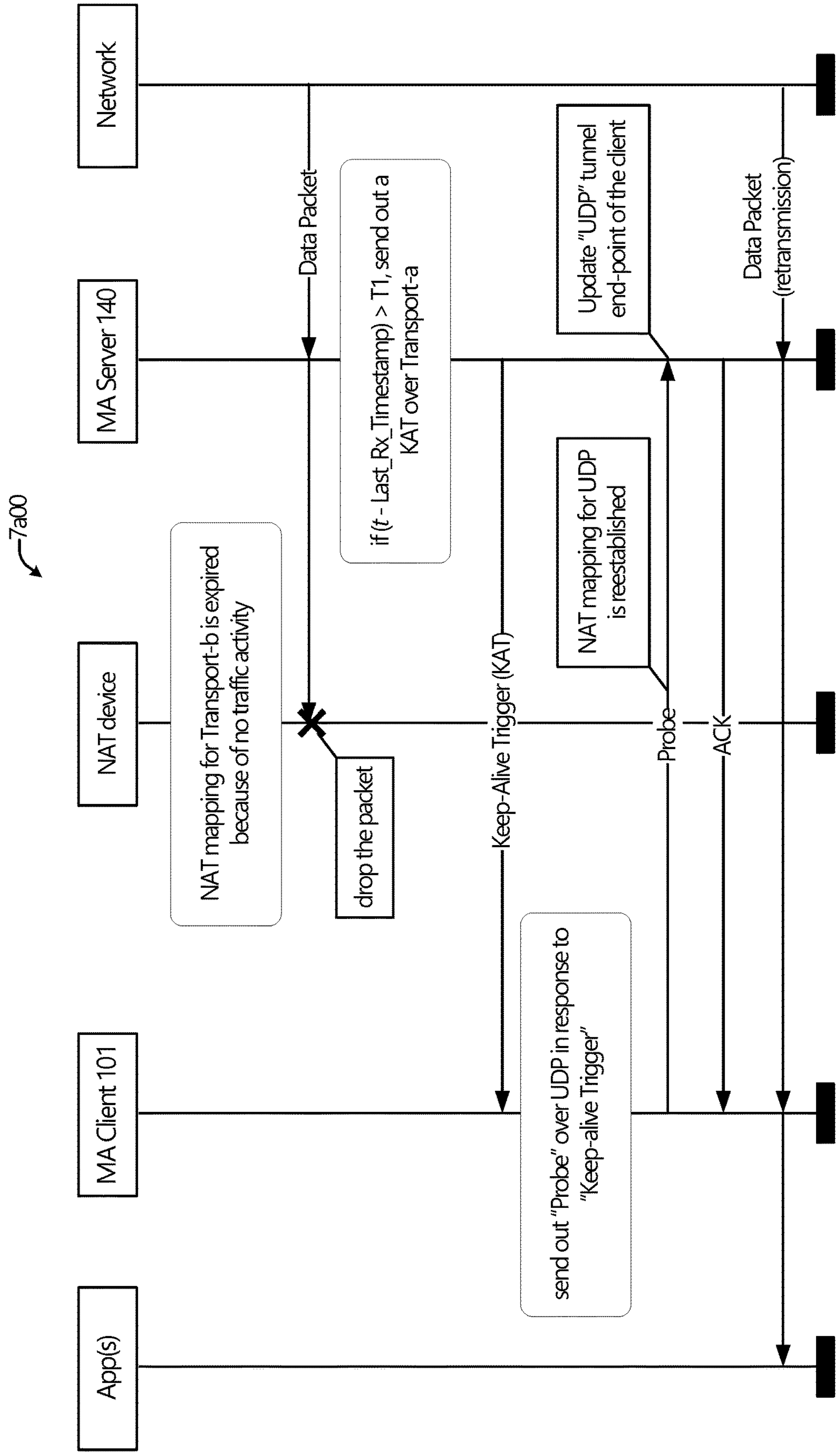
FIGS. 7*a* and 7*b* depict trigger-based keep-alive procedures.
Figure 7B:
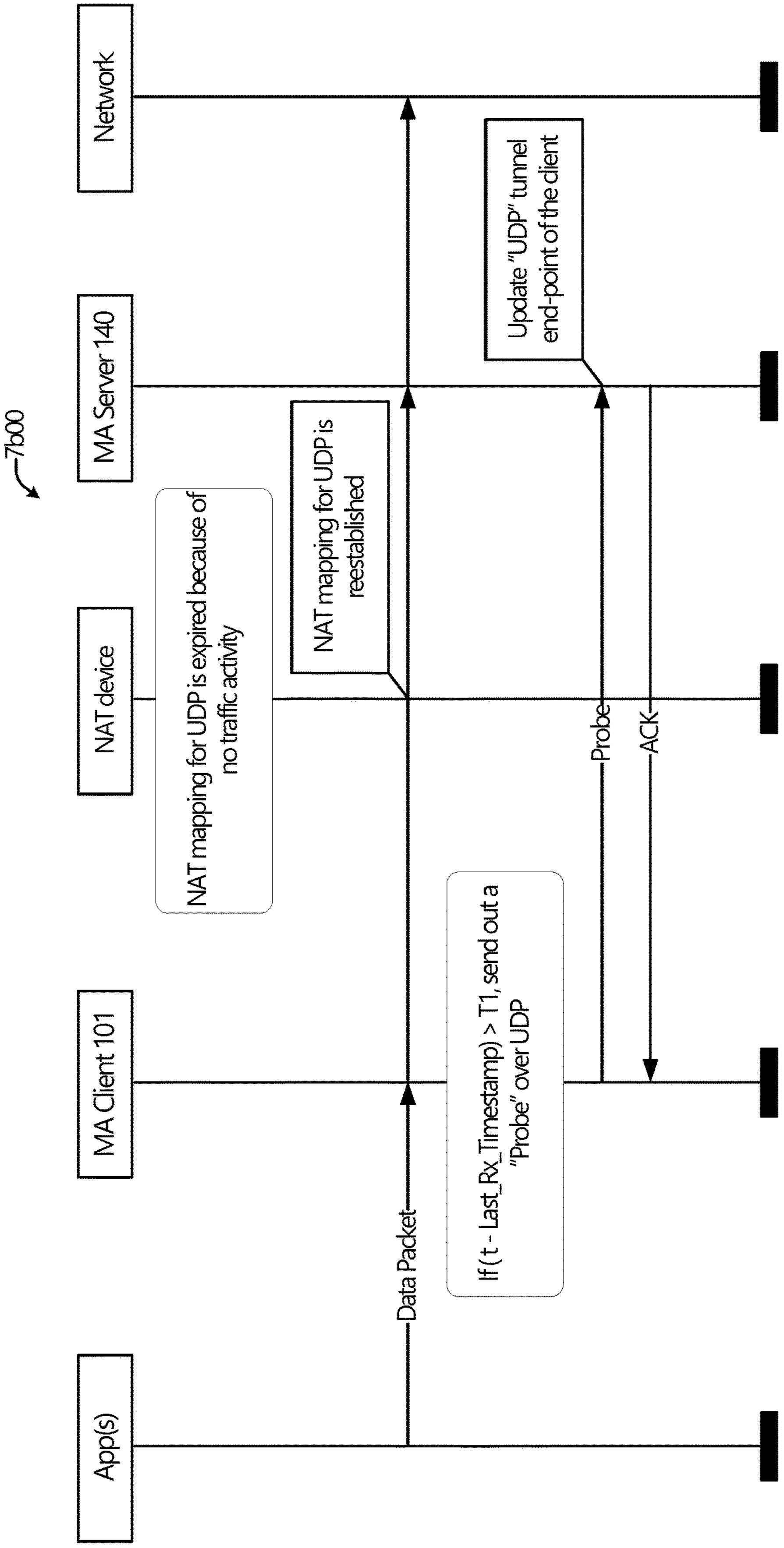

FIG. 7*a* illustrates an example downlink (DL) trigger-based keep-alive procedure 7*a*00 and an example uplink (UL) trigger-based keep-alive procedure 7*b*00. In FIGS. 7*a* and 7*b*, the NAT device may be RAT-B NAN 111B or RAT-B GW 1320B (e.g., WiFi router, switch, hub, gateway appliance, and/or the like) or RAT-A NAN 111A or GW 1320A (e.g., Cellular gateway, and/or the like).

At the beginning of procedure 7*a*00 in FIG. 7*a*, the MA client 101 (or Gc 1301) is in an idle state and has no traffic activity for quite long so that the NAT mapping for the Transport-1b or Transport-2b (referred to as "transport-b" in FIGS. 7*a* and 7*b*) (e.g., UDP) tunnel at the NAT device is expired. As a result, when a downlink data packet arrives, it will be dropped by the NAT device. For the downlink direction, the MA server 140 (or Gs 1340) maintains the parameters in Table 1.1-1 for each MA client 101 (or Gc 1301) to determine when to send out the trigger.

TABLE 1.1-1

| Parameter | Description |
|---|---|
| t | the current time |
| Last_Rx_Timestamp | the time receiving the last packet from the MA client 101 (or Gc 1301) |

The MA server 140 (or Gs 1340) may also maintain the parameters in Table 1.1-2 for each MA client 101 (or Gc 1301) to determine when to send out the trigger.

TABLE 1.1-2

| Parameter | Description |
|---|---|
| T1 | a predefined or configured threshold (e.g. 60 seconds), which may be set according to NAT timeout for Transport-1b or Transport-2b (referred to as "transport-b" in FIGS. 7a and 7b) (e.g., UDP) |

The MA server 140 (or Gs 1340) will send out a Keep-Alive Trigger (KAT) message over the Transport-1a or Transport-2a (referred to as "transport-a" in FIGS. 7*a* and 7*b*) (e.g., TCP) connection if the condition(s) of equation (1.1-1) is/are true.

$$t - \text{Last\_Rx\_Timestamp} > T1 \tag{1.1-1}$$

In some implementations, the KAT message does not need carry any control information, and therefore, has an empty payload. In some implementations, the KAT message includes a type indicator (e.g., type value) indicating that the MX control message is a KAT message.

Alternatively, the KAT message could carry some control information. In one example, the KAT message includes some or all of the content of an MX Keep Alive Request (mx_keep_alive_req) message (discussed infra) and/or some or all of the content of an MX Keep Alive Response (mx_keep_alive_rsp) message (discussed infra).

The MA client 101 (or Gc 1301) will send out a probe message (e.g., Probe-REQ/ACK messages; see e.g., [RFC8743] § 8.6.3) over transport-b (e.g., UDP) immediately after receiving the KAT message, and the NAT device will then update its NAT mapping accordingly. The MA server 140 (or Gs 1340) will also update the transport-b (e.g., UDP) tunnel end-pint (e.g., IP address, UDP port) of the MA client 101 (or Gc 1301) based on the received probe message and send out the ACK message to confirm the successful reception. Afterwards, downlink packet can be successfully delivered to the MA client 101 (or Gc 1301).

Referring to FIG. 7*b*, for the uplink direction, the MA client 101 (or Gc 1301) maintains the parameters of Table 1.1-3.

TABLE 1.1-3

| Parameter | Description |
|---|---|
| t | the current time |
| Last_Rx_Timestamp | the time receiving the last packet from the MA server 140 (or Gs 1340 |

The MA client 101 (or Gc 1301) may also maintain the parameters

TABLE 1.1-4

| Parameter | Description |
|---|---|
| T1 | a predefined or configured threshold (e.g. 60 seconds), which may be set according to NAT timeout for Transport-1b or Transport-2b (referred to as "transport-b" in FIGS. 7a and 7b) (e.g., UDP, QUIC, and/or the like) |
| T2 | another predefined or configured threshold, where T2 = K × d |
| d | average (e.g., downlink) packet inter-arrival time |
| K | a predefined or configured constant value (e.g., 5) |

The MA client 101 (or Gc 1301) triggers a keep-alive (KAT) message if the condition(s) of equation (1.1-2) is/are true, and sends out a probe message (over transport-b (e.g., UDP)), immediately or as soon as possible.

$$t - \text{Last\_Rx\_Timestamp} > T1 \tag{1.1-2}$$

As mentioned previously, the probe message may be the same or similar as the probe request (Probe-REQ) and/or the probe acknowledgement (Probe-ACK) messages discussed in [RFC8743] § 8.6.3. In these implementations, the probe message can include one or more of the parameters shown by Table 1.1-5. Additionally or alternatively, the probe message includes some or all of the MX probe parameters in an MX User-Plane Configuration Confirmation (mx_up_setup_conf_cnf) (discussed infra).

TABLE 1.1-5 probe message parameters

| Parameter | Size | Description |
|---|---|---|
| Probe sequence number | 2 bytes | The sequence number of the Probe REQ message. |
| Probing Flag | 1 byte | Bit 0: A Probe-ACK flag to indicate whether the Probe-ACK message is expected (1) or not (0).<br>Bit 1: A Probe Type flag to indicate whether the Probe-REQ/ACK message was sent during the Initialization phase (0) when the network path is not included for transmission of user data, or during the Active phase (1) when the network path is included for transmission of user data.<br>Bit 2: A bit flag to indicate the presence of the Reverse Connection ID (R-CID) field.<br>Bits 3-7: Reserved. |
| Reverse Connection ID (R-CID) | 1 byte | The connection ID of the delivery connection for sending the Probe-ACK message on the reverse path |
| Padding | variable | One or more padding bits/bytes, which is/are used to control the length of the probe message. In some implementations, these padding bits could be used to carry additional information |
| Probing Acknowledgment Number | 2 bytes | The sequence number of the corresponding Probe-REQ message |

The trigger-based keep-alive process **7*a*00 and/or 7*b*00 can also be used to detect sudden link drop or network failure. Here, the parameter n is measured at the MA client 101 (or Gc 1301**) periodically (e.g., every D seconds, where D=60 seconds), where n is the total number of received packets. The average (e.g., downlink) packet inter-arrival time d can be obtained using the equation (1.1-3).

$$d = \frac{n}{D} \tag{1.1-3}$$

The MA client 101 (or Gc 1301) triggers the keep-alive mechanism if the condition(s) of (1.1-4) is/are true, and sends out a Probe message (over transport-b (e.g., UDP)) immediately.

$$t - \text{Last\_Rx\_Timestamp} > T2 \quad \text{where } T2 = K \times d \tag{1.1-4}$$

For example, assuming d=50 ms and K=5, the MA client 101 (or Gc 1301) will send out a probe when no packet is received in 50 ms×5=250 ms. As a result, the MA client 101 (or Gc 1301) can quickly detect the failure of the currently used link (e.g., WiFi and/or the like) and switch its data traffic to another link (e.g., LTE, 5G, 6G, and so forth). Other timers and/or triggers may be used for the KAT and probe mechanisms in other implementations.

Figure 8:
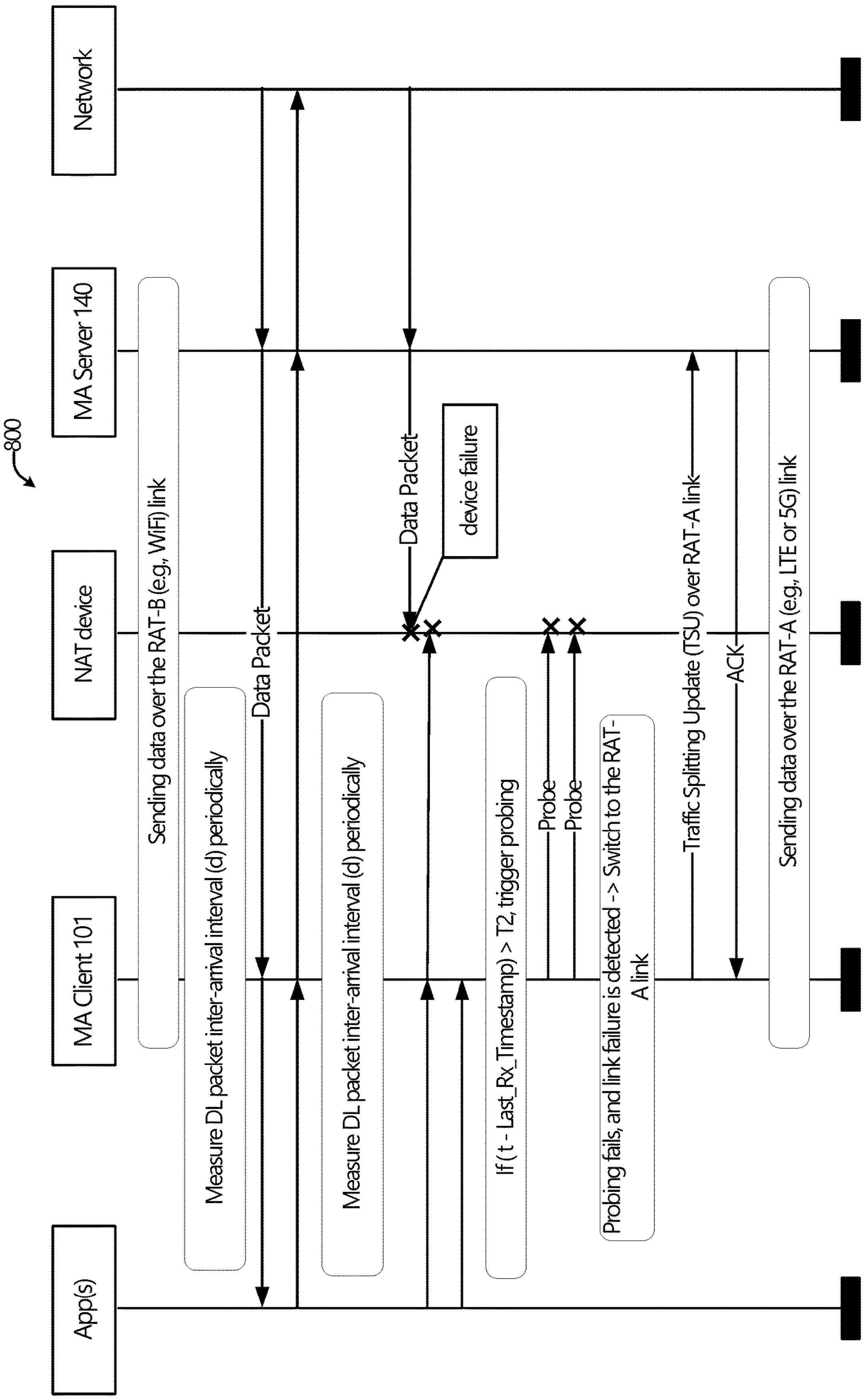
FIG. 8 depicts a trigger-based keep-alive procedure link/network failure detection.

FIG. 8 shows an example Trigger-based Keep-Alive procedure 800 for Link/Network Failure Detection. At the beginning of procedure 800, all data traffic are sent over the RAT-B (e.g., WiFi) link, and the MA client 101 (or Gc 1301) periodically measures DL packet interval arrival time d and update "last_Rx_Timestamp". When the RAT-B NAN 111 (e.g., WiFi router) fails, the MA client 101 (or Gc 1301) will not receive any downlink packet, and trigger probing accordingly. Then, the MA client 101 (or Gc 1301) will detect the link failure through probing, and switch its data traffic over to the RAT-A (e.g., cellular (e.g., 5G/NR, LTE,m WiMAX, etc.)) link.

1.2. Access-Specific Packet Loss Measurements for MAMS

As mentioned previously, MAMS is a programmable framework that provides mechanisms for flexible selection of network paths in a multi-access communication environment, based on application needs. MAMS leverages network intelligence and policies to dynamically adapt traffic distribution across selected paths and user plane treatment to changing network/link conditions. The network path selection and configuration messages are carried as user plane data between the functional elements in the network and the end-user devices, and thus, with little to no impact to the control plane signaling schemes of the individual access network. The MAMS framework offers the capabilities of smart selection and flexible combination of access paths and core network paths, as well as the user plane treatment when the traffic is distributed across the selected paths. In these ways, MAMS is a broad programmable framework providing functions beyond just sharing network policies. Further, it allows choosing and configuring user plane treatment for the traffic over the multiple paths, depending on needs of the application. However, one issue is how to measure end-to-end (e2e) packet loss of a wireless network when traffic is delivered over multiple networks and/or access network links/connections such as in a MAMS network.

Figure 9:
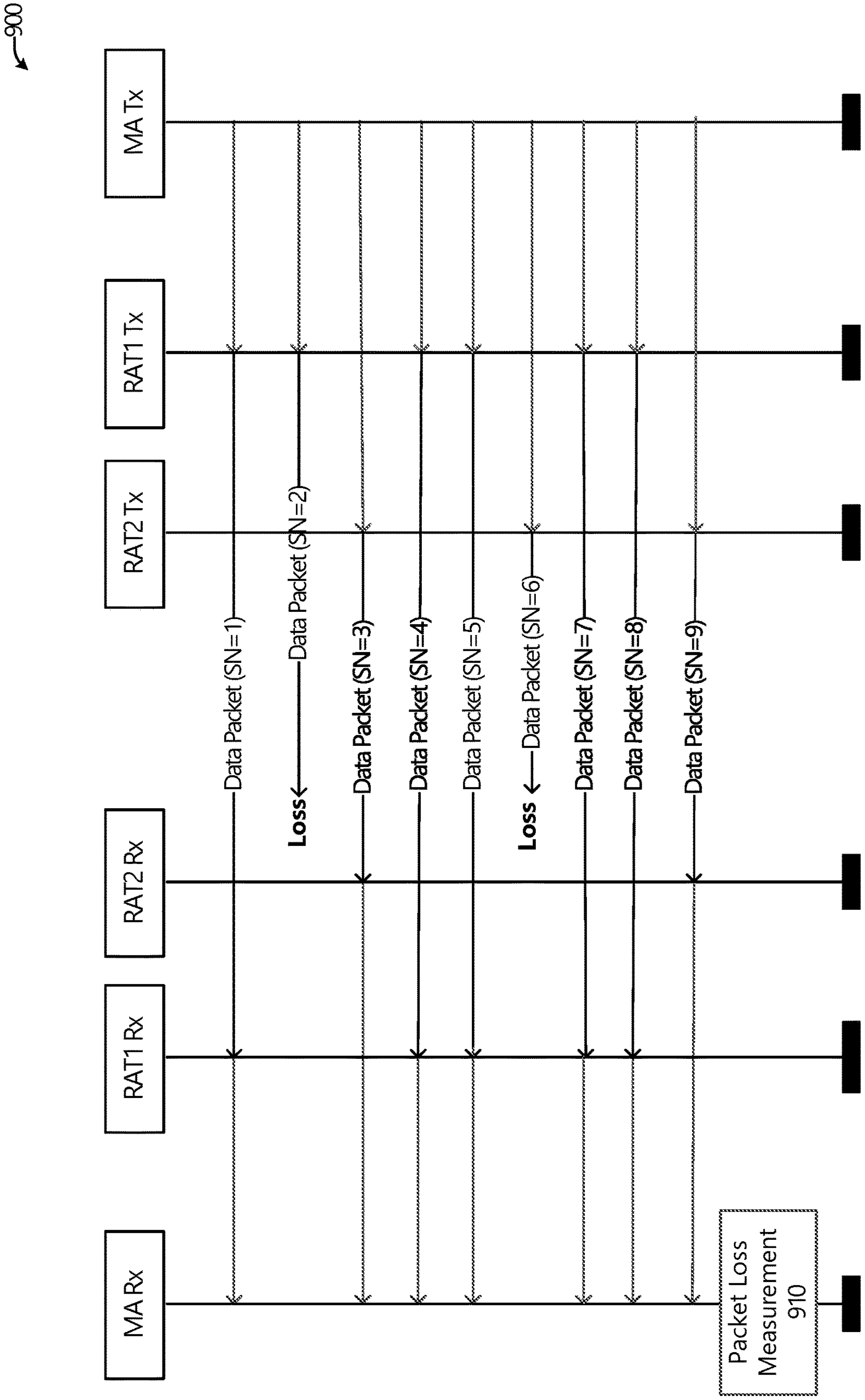
FIG. 9 depicts an example of packet loss measurement in an MX network.

FIG. 9 shows an example MX packet loss measurement procedure 900. In this example, traffic is sent to an MX Rx from an MX Tx via both a first RAT (RAT1) network and a second RAT (RAT2) network. The MX Tx may be the MX client 101 or Gc 1301, and the MX Rx may be the MX server 142 or Gs 1340. Alternatively, the MX Tx may be the MX server 142 or Gs 1340, and the MX Rx may be the MX client 101 or Gc 1301. Any suitable RATs may be used for either RAT1 and/or RAT2.

In a first example, RAT1 is a cellular RAT (e.g., 3GPP LTE, 5G/NR, and/or the like), and RAT2 is a WLAN RAT (e.g., WiFi/[IEEE80211], [IEEE802154], and/or the like). In this example, if the MX Rx is a client device and the MX Tx is a server, the RAT1 Rx is a 3GPP UE, the RAT2 Rx is a WiFi station (STA), the RAT1 Tx is a 3GPP RAN, and the RAT2 Tx is a WiFi AP. Alternatively, if the MX Rx is a server and the MX Tx is a client device, the RAT1 Rx is a 3GPP RAN, the RAT2 Rx is a WiFi AP, the RAT1 Tx is a 3GPP UE, and the RAT2 Tx is a WiFi STA.

In a second example, RAT1 is a WLAN RAT (e.g., WiFi/[IEEE80211], [IEEE802154], and/or the like) and RAT2 is a cellular RAT (e.g., 3GPP LTE, 5G/NR, and/or the like). In this example, if the MX Rx is a client device and the MX Tx is a server, the RAT2 Rx is a 3GPP UE, the RAT1 Rx is a WiFi STA, the RAT2 Tx is a 3GPP RAN, and the RAT1 Tx is a WiFi AP. Alternatively, if the MX Rx is a server and the MX Tx is a client device, the RAT2 Rx is a 3GPP RAN, the RAT1 Rx is a WiFi AP, the RAT2 Tx is a 3GPP UE, and the RAT1 Tx is a WiFi STA.

In third example, RAT1 is an enterprise cellular network RAT (e.g., 5G network slice and/or the like) and RAT2 is a cellular RAT (e.g., 3GPP LTE, 5G/NR, and/or the like). In this example, if the MX Rx is a client device and the MX Tx is a server, the RAT2 Rx is a 3GPP, the RAT1 Rx is a 3GPP UE with a subscriber identity associated with the enterprise network, the RAT2 Tx is a 3GPP RAN, and the RAT1 Tx is a enterprise-level 3GPP RAN (e.g., NG-RAN with one or more small cell gNBs and/or the like). Alternatively, if the MX Rx is a server and the MX Tx is a client device, the RAT2 Rx is a 3GPP RAN, the RAT1 Rx is the enterprise-level 3GPP RAN, the RAT2 Tx is a 3GPP UE, and the RAT1 Tx is the 3GPP UE associated with the enterprise.

In FIG. 9, the MX Tx transmits a data packet with a sequence number (SN) of 1 (SN=1) and data packet with SN=2 over RAT1. The data packet with SN=2 is lost, which causes the MX Tx to switch to conveying data packet SN=3 over RAT2. The MX Tx switches back to conveying data packets SN=4 and SN=5 over RAT1. A data packet SN=6 sent over RAT2 results in a loss. Data packets SN=7 and SN=8 are sent over RAT1, and a data packet SN=9 is sent over RAT2. After the data packets are sent to the MX Rx, the MX Rx performs a packet loss measurement 910.

A trailered-based multi-access (MX) convergence protocol is discussed in [UPMAMS] to support various operations (e.g., traffic splitting, packet reordering, fragmentation, retransmission, and network coding). Specifically, [UPMAMS] discusses an SN field that is included in the MX trailer at the end of each IP packet to uniquely identify the packet as well as its transmission order. For example, in FIG. 9, the MX Rx (e.g., a MAMS client) can detect that data packet SN=3 and SN=6 are lost, and measure the total packet loss rate 910, accordingly. However, to measure packet loss rate of an individual network (e.g. RAT1 or RAT2), the MX Rx (e.g., a MAMS client) needs to know which network a lost packet is transmitted over. In various implementations, the MX Tx (e.g., MAMS Tx) notifies an MX Rx (e.g., MAMS Rx) of its traffic splitting control parameters such that the MX Rx (e.g., MAMS Rx) can know which network is used to deliver individual packets based on its SN.

Referring back to FIG. 1, an MX adaptation (sub)layer is added to each radio link and/or RAT, and an MX convergence (sub)layer connects network (e.g., IP) and MX adaptation (sub)layers. The MX convergence (sub)layer operates on top of the MX adaptation (sub)layer in the protocol stacks 102 and 142. The MX convergence (sub)layer performs multi-access specific tasks, e.g., access (path) selection, multi-link (path) aggregation, splitting/reordering, lossless switching, fragmentation, concatenation, keep-alive, probing, and the like. The MX adaptation (sub)layer performs functions to handle tunneling, network layer security, and network address translation (NAT). From the Tx perspective, a user payload (e.g. IP PDU) is processed by the convergence (sub)layer first, and then by the adaptation (sub)layer before being transported over a delivery access connection (e.g., connection 105A or connection 105B). From the Rx perspective, a packet (e.g., IP packet) received over a delivery connection is processed by the MX adaptation (sub)layer first, and then by the MX convergence (sub)layer (this is also shown by FIG. 13, which is discussed in more detail infra).

A first example MX traffic splitting function is described as shown by equation (1.2-1), with the parameters shown by Table 1.2-1. A second example MX traffic splitting function is as shown by equation (1.2-2), with the parameters shown by Table 1.2-2

$$\text{If } K[i-1] \leq \text{mod}(x-Y, L) < K[i+1],\ s(x) = i (1 \leq i \leq N) \tag{1.2-1}$$

TABLE 1.2-1

| Parameter | Description |
|---|---|
| s(x) | the identification of the network that packet #x is transmitted over |
| x | the sequence number of the packet |
| y | the sequence number of the first packet using the configuration |
| L | the traffic splitting burst size |
| N | the number of networks |
| K[i] | the traffic splitting threshold of the network #i (K[0] = 0, K[N] = L) |
| i | the network ID |

$$s(x) = i, \text{ if } K[i-1] \leq \text{mod}(x-Y, L) < K[i], (1 \leq i \leq N) \tag{1.2-2}$$

TABLE 1.2-2

| Parameter | Description |
|---|---|
| Start SN (Y) | the sequence number of the first packet using the new configuration |
| s(x) | the identification of the network that packet #x is transmitted over |
| x | the sequence number of the packet |
| y | the sequence number of the first packet using the configuration |
| L | the traffic splitting burst size |
| N | the number of access networks that are used simultaneously to deliver traffic |
| K[i] | the traffic splitting threshold of the i-th network (where K[0] = 0, K[N] = L) |
| i | the network ID |

In equations (1.2-1) and (1.2-2), L, N, and K[i] are multi-access traffic splitting control parameters. In some implementations, a new bit flag (e.g., traffic splitting status) is included in the MX trailer (e.g., GMA trailer in encapsulated packet 502 and/or GMA trailer 1810) or an MX header (e.g., GMA header 501 and/or GMA header 1820), and the MA Tx (e.g., MAMS Tx) flips this bit flag (0 or 1) when updating the traffic splitting control parameters.

Figure 10:
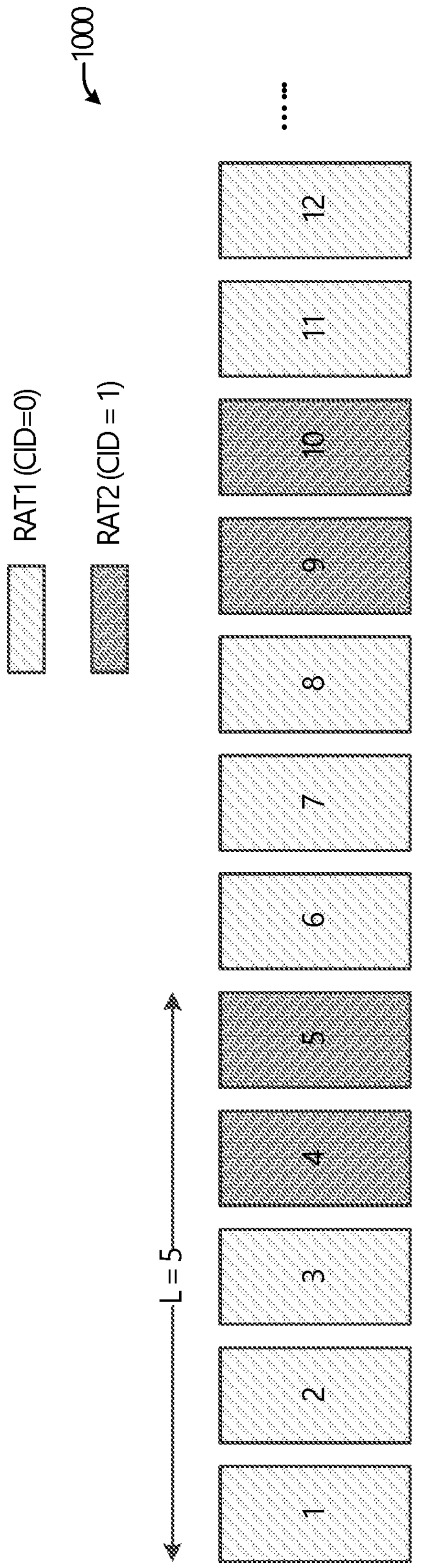
FIG. 10 depicts an example of generic MX traffic splitting.

FIG. 10 shows an example of generic MX traffic splitting 1000 where N=2, L=5, and K(1)=3. In this example, the traffic splitting burst size L includes three transmission slots allocated for a first RAT (RAT1) and two transmission slots/intervals allocated for a second RAT (RAT2), where the traffic splitting threshold of RAT1 (K(1)) is three transmission slots/intervals. Additionally, the traffic splitting threshold of RAT2 (K(2)) may be two transmission slots/intervals.

As alluded to previously, a (per-access) packet loss measurement is added to each packet at the MX convergence sublayer. A new trailer-based MX PDU format has been specified in [UPMAMS], in which an SN is added as part of the trailer (or header) of each of network packet (e.g., IP packet or the like) that are sent between the MX Rx and MX Tx. The SN of one or more packets is then used to detect packet loss in a way that does not require any changes to the existing MAMS protocol and/or other network protocols. As discussed in more detail infra, protocol enhancements are added to the MX convergence (sub)layer to support the (per-access) packet loss measurements.

Figure 11:
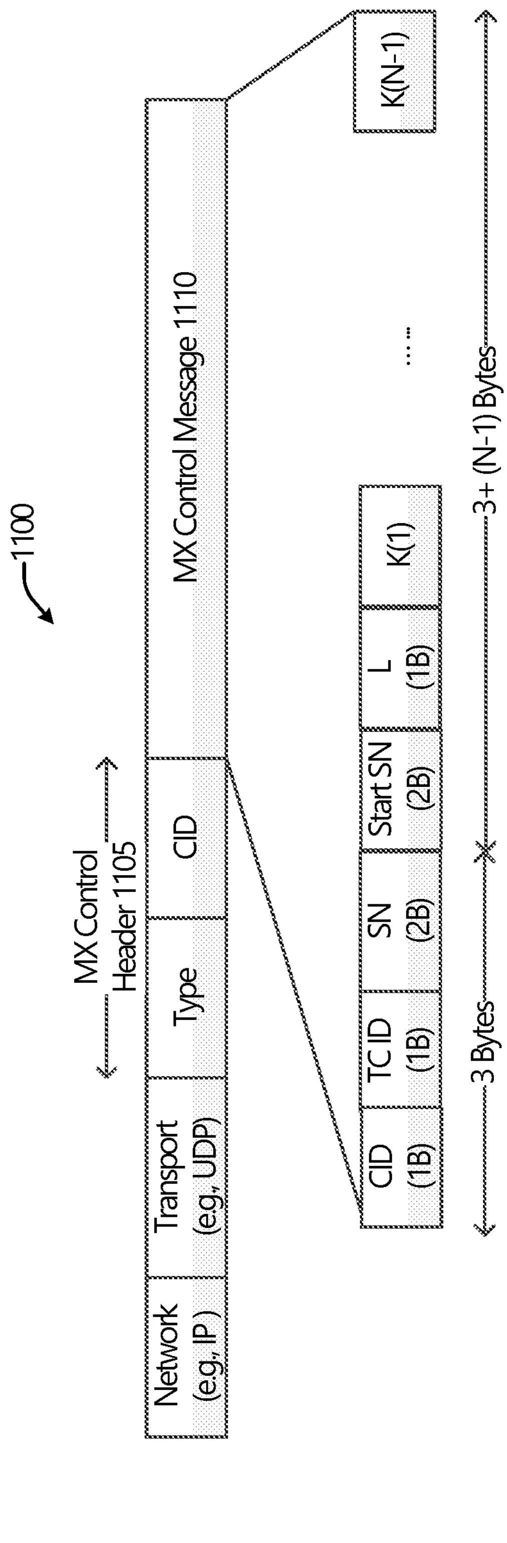
FIG. 11 depicts an MX convergence control message format including an example traffic splitting update MX control message format.

FIG. 11 depicts an MX convergence control message format 1100 including an example traffic splitting update MX control message format 1110. The MX convergence control message 1100 is transported with a transport protocol (e.g., UDP) and network protocol (e.g., IP or the like). The MX convergence control message format 1100 includes a network layer field that carries a network protocol address (e.g., IP address and/or any other network address, port, or ID such as those discussed herein) and related network protocol information (e.g., IP header and/or packet payload and/or any other network packet such as those discussed herein). The MX convergence control message format 1100 includes a transport layer field that carries a transport protocol address (e.g., UDP port and/or any other transport layer address, port, or ID such as those discussed herein) and related transport protocol information (e.g., UDP header and/or packet payload and/or any other transport layer packet such as those discussed herein). The MX convergence control message format 1100 may be the same or similar as the MX Control message format 303.

The MX control header 1105 includes two fields, a type field (e.g., 1 byte) and a connection ID (CID) field (e.g., 1 byte). The type field includes a type value that indicates the message type (e.g., the MX control message type), and the CID field includes a CID that identifies the connection for sending out the message (e.g., an unsigned integer to identify the anchor and delivery connection of the MX control message). The CID field may include an anchor connection ID (anchor-CID) and a delivery connection ID (delivery-CID). The anchor-CID (MSB 4 bits) is an unsigned integer to identify the anchor connection. The delivery-CID (LSB 4 bits) is an unsigned integer to identify the delivery connection.

The MX convergence control message format 1100 also includes an MX control message field/section 1110, which incudes a payload of the MX control message. The payload of the MX control message may correspond to the MX Control PDU Payload 313 of FIG. 3. In various implementations, two MX convergence control messages are provided, each of which can be included in a MX control message field/section 1110. These MX control messages include a a traffic splitting update (TSU) message and a traffic splitting acknowledgement (TSA) message. The TSU message is sent by the MX Tx to notify the MX Rx of updated traffic splitting configuration parameters, and the TSA message is sent by the MX Rx to the MX Tx to acknowledge (ACK) the receipt of the TSU message.

In this example, the MX control message field/section 1110 includes a TSU message, which is used to change the traffic splitting configuration of the reverse path. In some implementations, the type field in the MX control header 1105 is set to "7" to indicate that the MX control message is a TSU. The first three fields in the MX control message field/section 1110 include a CID field, a TC ID field, and an SN field. The SN field includes an SN, which is the sequence number to uniquely identify the TSU message. These fields share the same or similar definitions as in MX trailer (see e.g., Zhu et al., *User-Plane Protocols for Multiple Access Management Service*, IETF, draft-zhu-intarea-mams-user-protocol-05 (17 May 2018). In various implementations, the following fields are also present in the TSU message for delivering traffic splitting configuration parameters: the start SN, L, and K(i). Additionally, a TSA message can also carry some or all of these fields. In various implementations, the TSU message includes the fields of Table 1.2-3.

TABLE 1.2-3 example TSU control message fields

| Field | Field Size | Description |
|---|---|---|
| connection ID (CID) | 1 byte | an unsigned integer to identify the anchor connection of the network protocol packets (e.g., IP packets) in an MX PDU |
| traffic class ID (TC ID) | 1 byte | an unsigned integer to identify the traffic class of the network protocol packets (e.g., IP packets) in an MX PDU, for example, Data |
| sequence number (SN) | 2 bytes | an auto-incremented integer to indicate order of transmission of the MX SDU (e.g. IP packet), needed for lossless switching or multi-link (path) aggregation or fragmentation. The SN is generated on a per Connection and per Traffic Class (TC) basis |
| Start SN | 2 bytes | An SN of the first packet using a new traffic splitting configuration |
| L | 1 byte | A traffic splitting burst size (in the unit of packet) |
| K(i) | variable | A traffic splitting threshold of the i-th network (e.g., access networks are sorted based on their CID) |

Figure 12:
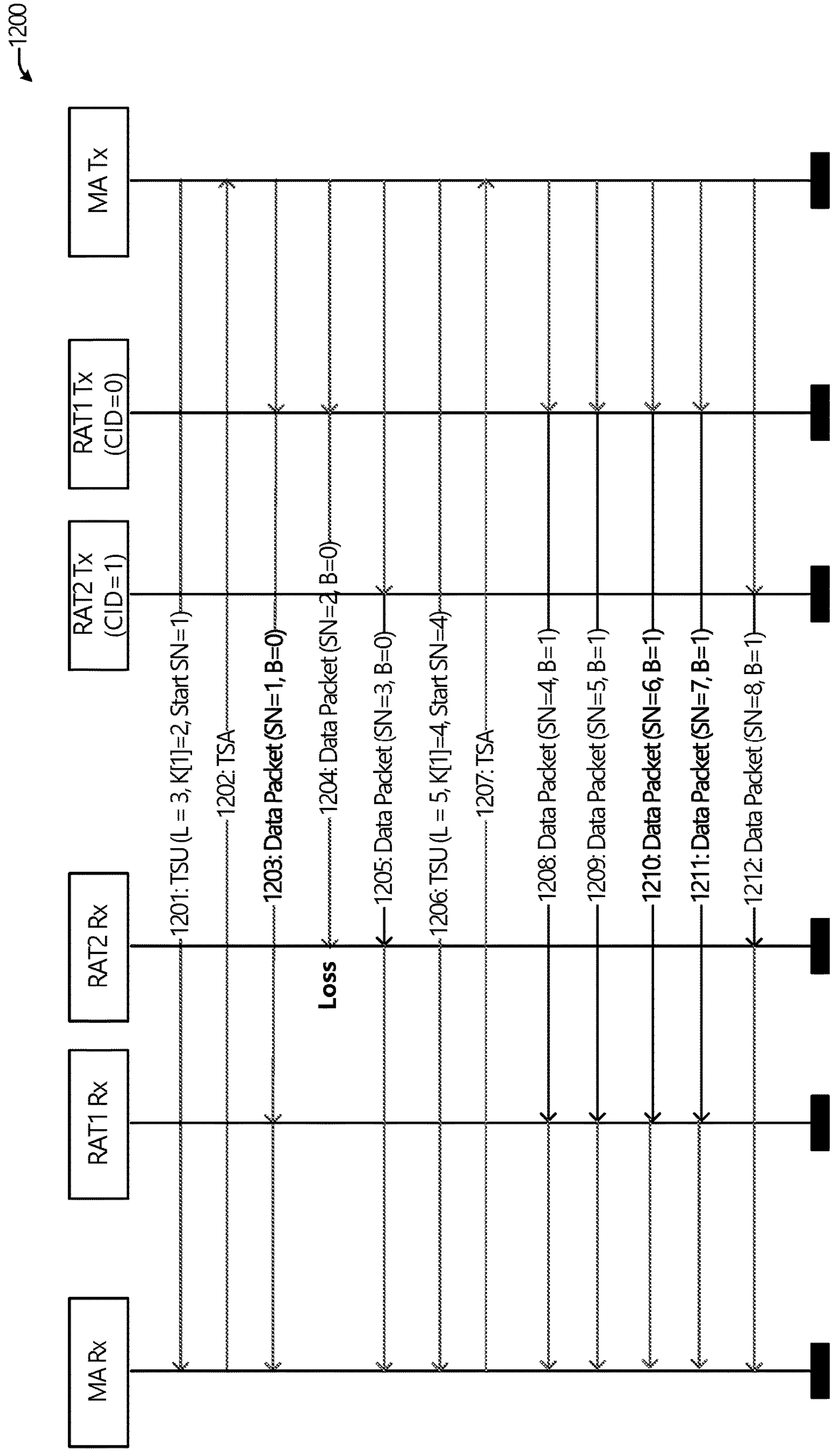
FIG. 12 depicts an example MAMS traffic splitting configuration update procedure (N=2)

FIG. 12 shows an example MX traffic splitting configuration update procedure 1200. In this example, whenever the MX Tx updates its traffic splitting configuration, it sends a TSU message to the MX Rx. The TSU message carries traffic splitting configuration parameters that the MX Rx can use to determine which network a packet is sent over based on the SN carried by the packet. In response to the TSU message, the MX Rx sends a TSA message to the MX Tx to indicate the successful (or unsuccessful) receipt of the TSU message. Moreover, whenever the MX Tx updates its configuration, it will also flip a traffic splitting status (B) bit field in the MX trailer (e.g., GMA trailer in encapsulated packet 502 and/or GMA trailer 1810) or an MX header (e.g., GMA header 501 and/or GMA header 1820).

In this example, at operation 1201 the MX Tx sends a TSU with L=3, K[1]=2, and Start SN=1 to the MX Rx, and at operation 1202 the MX Rx sends a TSA to the MX Tx. At operation 1203, the MX Tx sends Data Packet (SN=1, B=0) over RAT1. At operation 1204, the MX Tx sends Data Packet (SN=2, B=0) over RAT1, which results in a lost packet. At operation 1205, the MX Tx sends Data Packet (SN=3, B=0) over RAT2. At operation 1206, the MX Tx sends a TSU with L=5, K[1]=4, and Start SN=4, and at operation 1207, the MX Rx sends a TSA to the MX Tx. At operations 1208-1211, the MX Tx sends Data Packets (SN=4, B=1), through (SN=7, B=1) over RAT1. At operations 1212, the MX Tx sends Data Packets (SN=8, B=1) over RAT2. The MX Rx can then determine which network (connection) a lost packet is delivered over based on its SN.

1.3. MAMS Management Messages

The MAMS system 100, 200 and the GMA system 1300 (discussed infra) may use various MAMS management messages (e.g., message 1330 in FIG. 13) to configure data plane functions (e.g., Gc 1301 and Gs 1340 in FIG. 13), These MAMS management messages 1330 may include one or more of the following MAMS messages:

MX Discover Message (mx_discover): This message is the first message sent by the CCM 206 to discover the presence of NCM 236 in the network. It contains only the base information as described in Appendix C.2.1 of [RFC8743] with message_type set as mx_discover).

MX System Info Message (mx_system_info): This message is sent by the NCM 236 to the CCM 206 to inform the endpoints that the NCM 236 supports MAMS functionality. In addition to the base information described in Appendix C.2.1 of [RFC8743], it contains the following information:

NCM Connection described infra and in Appendix C.2.3 of [RFC8743].

MX Capability Request (mx_capability_req): This message is sent by the CCM 206 to the NCM 236 to indicate the capabilities of the CCM 206 instance available to the NCM 236 indicated in the System Info message earlier. In addition to the base information described in Appendix C.2.1 of [RFC8743], it contains the following information:

(a) Features and their activation status (see e.g., Appendix C.2.5 of [RFC8743]).

(b) Number of Anchor Connections: The number of anchor connections (toward the core) supported by the NCM 236.

(c) Anchor connections (see e.g., Appendix C.2.6 of [RFC8743]).

(d) Number of Delivery Connections: The number of delivery connections (toward the access) supported by the NCM 236.

(e) Delivery connections (see e.g., Appendix C.2.7 of [RFC8743]).

(f) Convergence methods (see e.g., Appendix C.2.9 of [RFC8743]).

(g) Adaptation methods (see e.g., Appendix C.2.10 of [RFC8743]).

The mx_capability_req message is enhanced to include the following new parameters:

last_ip_address to indicate the virtual network address (e.g., IP address or the like) used in the last MAMS session last_session_id to indicate the unique session id of the last MAMS session device_type to indicate the device type (e.g., 0: Android, 1: iOS, 2: Windows, 3: Linux, etc.).

Moreover, the following new messages are introduced in the GMA system 1300: mx_session_resume_req/rsp (discussed infra). The mx_session_resume_req/rsp messages is/are for notifying server that client has resumed the GMA operation, and for time synchronization. Both messages share the same format as mx_session_termination_req/rsp, and carry unique session_id.

MX Capability Response (mx_capability_resp or mx_capability_rsp): This message is sent by the NCM 236 to the CCM 206 to indicate the capabilities of the NCM 236 instance and unique session identifier for the CCM 206. In addition to the base information described in Appendix C.2.1 of [RFC8743], the mx_capability_resp contains the following information:

(a) Features and their activation status (see e.g., Appendix C.2.5 of [RFC8743]).

(b) Number of Anchor Connections: The number of anchor connections (toward the core) supported by the NCM 236.

(c) Anchor connections (see e.g., Appendix C.2.6 of [RFC8743]).

(d) Number of Delivery Connections: The number of delivery connections (toward the access) supported by the NCM 236.

(e) Delivery connections (see e.g., Appendix C.2.7 of [RFC8743]).

(f) Convergence methods (see e.g., Appendix C.2.9 of [RFC8743]).

(g) Adaptation methods (see e.g., Appendix C.2.10 of [RFC8743]).

(h) Unique Session ID: This uniquely identifies the session between the CCM 206 and the NCM 236 in a network (see e.g., Appendix C.2.2 of [RFC8743]).

If the "number of anchor connections" parameter in mx_capability_rsp message is set to "0", indicating the server has rejected the client's request, the client should stop the procedure immediately and wait for the next event (e.g., WiFi connect) to start again.

MX Capability Acknowledge (mx_capability_ack): This message is sent by the CCM 206 to the NCM 236 to indicate acceptance of capabilities advertised by the NCM 236 in an earlier MX Capability Response message. In addition to the base information described in Appendix C.2.1 of [RFC8743], it contains the following information:

(a) Unique Session ID: Same identifier as the identifier provided in the MX Capability Response (see e.g., Appendix C.2.2 of [RFC8743]).

(b) Capability Acknowledgment: Indicates either acceptance or rejection of the capabilities sent by the CCM 206. Can use either "MX_ACCEPT" or "MX_REJECT" as acceptable values.

MX User-Plane Configuration Request (mx_up_setup_conf_req): This message is sent by the NCM 236 the CCM 206 to configure the user plane for MAMS. In addition to the base information described in Appendix C.2.1 of [RFC8743], it contains the following information:

(a) Number of Anchor Connections: The number of anchor connections supported by the NCM 236.

(b) Setup of anchor connections (see e.g., Appendix C.2.11 of [RFC8743]).

The mx_up_setup_conf message is enhanced to configure a virtual IP interface on the client 101 (e.g., including the network address (e.g., IP address or the like), gateway, dns server, network mask, or the like).

MX User-Plane Configuration Confirmation (mx_up_setup_conf_cnf): This message is the confirmation of the UP setup message sent from the CCM 206 after successfully configuring the user plane on the client. This message contains the following information:

(a) Unique Session ID: Same identifier as the identifier provided in the MX Capability Response (see e.g., Appendix C.2.2 of [RFC8743]).

(b) MX probe parameters (included if probing is supported):

(1) Probe Port: UDP port for accepting probe message.

(2) Anchor connection ID: Identifier of the anchor connection to be used for probe function. Provided in the MX UP Setup Configuration Request.

(3) MX Configuration ID: This parameter is included only if the MX Configuration ID parameter is available from the UP setup configuration. It indicates the MX configuration ID of the anchor connection to be used for probe function.

(c) The following information is required for each delivery connection:

(1) Connection ID: Delivery connection ID supported by the client.

(2) Client Adaptation-Layer Parameters: If the UDP Adaptation Layer is in use, then the UDP port to be used on the C-MADP side.

As discussed herein, the mx_up_setup_cnf message is enhanced to configure a virtual IP interface on the client 101 (e.g., network address (e.g., IP address or the like), gateway, dns server, network mask, or the like), provide all the GMA client configuration parameters to the client 101, and provide a list of applications allowed to use GMA optimizations. It contains the following information: APP List (e.g., com.google.android.youtube, and/or the like).

MX Reconfiguration Request (mx_reconf_req): This message is sent by the NCM 236 to the CCM 206 to configure the user plane for MAMS. In addition to the base information described in Appendix C.2.1 of [RFC8743], it contains the following information:

(a) Unique Session ID: Identifier for the CCM 206-NCM 236 association (see e.g., Appendix C.2.2 of [RFC8743]).
(b) Reconfiguration Action: The reconfiguration action type can be one of "setup", "release", or "update".
(c) Connection ID: Connection ID for which the reconfiguration is taking place.
(d) Network address (e.g., IP address or the like): Included if Reconfiguration Action is either "setup" or "update".
(e) SSID: If the connection type is WiFi, then this parameter contains the SSID to which the client has attached.
(f) MTU of the connection: The MTU of the delivery path that is calculated at the client for use by the NCM 236 to configure fragmentation and concatenation procedures at the N-MADP.
(g) Connection Status: This parameter indicates whether the connection is currently "disabled", "enabled", or "connected". Default: "connected".
(h) Delivery Node ID: Identity of the node to which the client is attached. In the case of LTE, this is an ECGI. In the case of WiFi, this is an AP ID or a MAC address.

MX Reconfiguration Response (mx_reconf_rsp): This message is sent by the NCM 236 to the CCM 206 as a confirmation of the received MX Reconfiguration Request and contains only the base information in Appendix C.2.1 of [RFC8743].

MX Path Estimation Request (mx_path_est_req): This message is sent by the NCM 236 toward the CCM 206 to configure the CCM 206 to send MX Path Estimation Results. In addition to the base information described in Appendix C.2.1 of [RFC8743], it contains the following information:

(a) Connection ID: ID of the connection for which the path estimation report is required.
(b) Init Probe Test Duration: Duration of initial probe test, in milliseconds.
(c) Init Probe Test Rate: Initial testing rate, in megabits per second.
(d) Init Probe Size: Size of each packet for initial probe, in bytes.
(e) Init Probe-ACK: If an acknowledgment for probe is required. (Possible values: "yes", "no")
(f) Active Probe Frequency: Frequency, in milliseconds, at which the active probes shall be sent.
(g) Active Probe Size: Size of the active probe, in bytes.
(h) Active Probe Duration: Duration, in seconds, for which the active probe shall be performed.
(i) Active Probe-ACK: If an acknowledgment for probe is required. (Possible values: "yes", "no").

MX Path Estimation Results (mx_path_est_results): This message is sent by the CCM 206 to the NCM 236 to report on the probe estimation configured by the NCM 236. In addition to the base information described in Appendix C.2.1 of [RFC8743], it contains the following information:

(a) Connection ID: ID of the connection for which the path estimation report is required (see e.g., Appendix C.2.2 of [RFC8743]).
(b) Init Probe Test Duration: Duration of initial probe test, in milliseconds.
(c) Init Probe Test Rate: Initial testing rate, in megabits per second (see e.g., Appendix C.2.12 of [RFC8743]).
(d) Init Probe Size: Size of each packet for initial probe, in bytes (see e.g., Appendix C.2.13 of [RFC8743]).

MX Traffic Steering Request (mx_traffic_steering_req): This message is sent by the NCM 236 to the CCM 206 to enable traffic steering on the delivery side in UL and DL configurations. In addition to the base information described in Appendix C.2.1 of [RFC8743], it contains the following information:

(a) Connection ID: Anchor connection number for which the traffic steering is being defined.
(b) MX Configuration ID: MX configuration for which the traffic steering is being defined.
(c) DL Delivery (see e.g., Appendix C.2.14 of [RFC8743]).
(d) Default UL Delivery: The default delivery connection for the UL. All traffic should be delivered on this connection in the UL direction, and the Traffic Flow Template (TFT) filter should be applied only for the traffic mentioned in Uplink Delivery
(e) Uplink Delivery (see e.g., Appendix C.2.15 of [RFC8743]).
(f) Features and their activation status (see e.g., Appendix C.2.5 of [RFC8743]).

MX Traffic Steering Response (mx_traffic_steering_rsp): This message is a response to an MX Traffic Steering Request from the CCM 206 to the NCM 236. In addition to the base information described in Appendix C.2.1 of [RFC8743], it contains the following information:

(a) Unique Session ID: Same identifier as the identifier provided in the MX Capability Response (see e.g., Appendix C.2.2 of [RFC8743]).
(b) Features and their activation status (see e.g., Appendix C.2.5 of [RFC8743]).

MX SSID Indication (mx_ssid_indication): This message is sent by the NCM 236 to the CCM 206 to indicate the list of allowed SSIDs that are supported by the MAMS entity on the network side. It contains the list of SSIDs. Each SSID comprises the type of SSID (which can be one of the following: SSID, BSSID, or HESSID) and the SSID itself.

MX Keep Alive Request (mx_keep_alive_req): An MX Keep-Alive Request can be sent from either the NCM 236 or the CCM 206 on expiry of the Keep-Alive timer or a handover event. The peer shall respond to this request with an MX Keep-Alive Response. In the case of no response from the peer, the MAMS connection shall be assumed to be broken, and the CCM 206 shall establish a new connection by sending MX Discover messages. In addition to the base information described in Appendix C.2.1 of [RFC8743], it contains the following information:

(a) Keep-Alive Reason: Reason for sending this message (e.g., "Timeout", "Handover", or the like).
(b) Unique Session ID: Identifier for the CCM 206-NCM 236 association (see e.g., Appendix C.2.2 of [RFC8743]).
(c) Connection ID: Connection ID for which handover is detected, if the reason is "Handover".
(d) Delivery Node ID: The target delivery node ID (e.g., NCGI, ECGI, WiFi AP ID/MAC address, etc.) to which the handover is executed.

MX Keep Alive Response (mx_keep_alive_rsp): On receiving an MX Keep-Alive Request from a peer, the NCM 236/CCM 206 shall immediately respond with an MX Keep-Alive Response on the same delivery path from where the request arrived. In addition to the base information, it contains the unique session identifier for the CCM 206-NCM 236 association (see e.g., Appendix C.2.2 of [RFC8743]).

MX Measurement Configuration (mx_measurement_conf): This message is sent from the NCM 236 to the CCM 206 to configure the period measurement reporting at the CCM 206. The message contains a list of measurement configurations, with each element containing the following information:

(a) Connection ID: Connection ID of the delivery connection for which the reporting is being configured.
(b) Connection Type: Connection type for which the reporting is being configured (e.g., "LTE", "WiFi", "5G_NR", etc.).
(c) Measurement Report Configuration: Actual report configuration based on the Connection Type (see e.g., Appendix C.2.17 of [RFC8743]).

MX Measurement Report (mx_measurement_report): This message is periodically sent by the CCM 206 to the NCM 236 after measurement configuration. In addition to the base information, it contains the following information:

(a) Unique Session ID: Same identifier as the identifier provided in the MX Capability Response (see e.g., Appendix C.2.2 of [RFC8743]).
(b) Measurement report for each delivery connection is measured by the client (see e.g., Appendix C.2.18 of [RFC8743]).

MX Session Termination Request (mx_session_termination_req): In the event where the NCM 236 or CCM 206 can no longer handle MAMS for any reason, it can send an MX Session Termination Request to the peer. In addition to the base information (MXBase), it contains a Unique Session ID and the reason for the termination such as, for example, "MX_NORMAL_RELEASE", "MX_NO_RESPONSE", or "INTERNAL_ERROR".

MX Session Termination Response (mx_session_termination_rsp): On receipt of an MX Session Termination Request from a peer, the NCM 236/CCM 206 shall respond with MX Session Termination Response on the same delivery path where the request arrived and clean up the MAMS-related resources and settings. The CCM 206 shall reinitiate a new session with MX Discover messages.

MX Application MADP Association Request (mx_app_madp_assoc_req): This message is sent by the CCM 206 to the NCM 236 to select MADP instances provided earlier in the MX UP Setup Configuration Request, based on requirements for the applications. In addition to the base information described in Appendix C.2.1 of [RFC8743], it contains the following information:

(a) Unique Session ID: This uniquely identifies the session between the CCM 206 and the NCM 236 in a network (see e.g., Appendix C.2.2 of [RFC8743]).
(b) A list of MX Application MADP Associations, with each entry as follows:
  (1) Connection ID: Represents the anchor connection number of the MADP instance.
  (2) MX Configuration ID: Identifies the MX configuration of the MADP instance.
  (3) Traffic Flow Template Uplink: Traffic Flow Template to be used in the UL direction (see e.g., Appendix C.2.16 of [RFC8743]).
  (4) Traffic Flow Template Downlink: Traffic Flow Template to be used in the DL direction (see e.g., Appendix C.2.16 of [RFC8743]).

MX Application MADP Association Response (mx_app_madp_assoc_rsp): This message is sent by the NCM 236 to the CCM 206 to confirm the selected MADP instances provided in the MX Application MADP Association Request by the CCM 206. In addition to the base information described in Appendix C.2.1 of [RFC8743], it contains information if the request has been successful.

MX Network Analytics Request (mx_network_analytics_req): This message is sent by the CCM 206 to the NCM 236 to request parameters like bandwidth, jitter, latency, and signal quality predicted by the network analytics function. In addition to the base information, it contains the following parameter:

(a) Unique Session ID: Same identifier as the identifier provided in the MX Capability Response (see e.g., Appendix C.2.2 of [RFC8743]).
(b) Parameter List: List of parameters in which the CCM 206 is interested: one or more of "bandwidth", "jitter", "latency", and "signal_quality".

MX Network Analytics Response (mx_network_analytics_rsp): This message is sent by the NCM 236 to the CCM 206 in response to the MX Network Analytics Request. For each delivery connection that the client has, the NCM 236 reports the requested parameter predictions and their respective likelihoods (between 1 and 100 percent). In addition to the base information described in Appendix C.2.1 of [RFC8743], it contains the following information:

(a) Number of Delivery Connections: The number of delivery connections that are currently configured for the client.
(b) The following information is provided for each delivery connection:
  (1) Connection ID: Connection ID of the delivery connection for which the parameters are being predicted.
  (2) Connection Type: Type of connection. Can be "WiFi", "5G_NR", "MulteFire", or "LTE".
  (3) List of Parameters for which Prediction is requested, where each of the predicted parameters consists of the following:
    (a) Parameter Name: Name of the parameter being predicted (e.g., "bandwidth", "jitter", "latency", "signal_quality", and/or the like).
    (b) Additional Parameter: If Parameter name is "signal_quality", then this qualifies the quality parameter (e.g., "lte_rsrp", "lte_rsrq", "nr_rsrp", "nr_rsrq", "wifi_rssi", and/or the like).
    (c) Predicted Value: Provides the predicted value of the parameter and, if applicable, the additional parameter.
    (d) Likelihood: Provides a stochastic likelihood of the predicted value.
    (e) Validity Time: The time duration for which the predictions are valid.

In addition to the above, where the MAMS system implements the GMA protocol (see e.g., FIGS. 16 and 18) the following new messages are introduced:

MX Session Suspend Request (mx_session_suspend_req): used to notify the server 140 that the client 101 has suspended MAMS/GMA (session) operation, and may be used for time synchronization as discussed herein. The mx_session_suspend_req shares the same format as the mx_session_termination_req, and carries a unique session id.

MX Session Suspend Response (mx_session_suspend_rsp): used to notify the client 101 that the server 140 has suspended MAMS/GMA (session) operation, and may be used for time synchronization. The mx_session_suspend_rsp shares the same format as the mx_session_termination_rsp, and carries a unique session id.

MX Session Resume Request (mx_session_resume_req): used to notify the server 140 that the client 101 has resumed MAMS/GMA (session) operation and/or may be used for time synchronization. The mx_session_resume_req shares the same format as the mx_session_termination_req and/or mx_session_termination_rsp, and carries the unique session_id. The reason for resuming the session (e.g., MAMS and/or GMA operation) may be different than those listed for the mx_session_termination_req. The reason for the resuming a session may be, for example, application or device waking up from idle or sleep state (e.g., "APP_ACTIVE", "GC_ACTIVE", "GS_ACTIVE", etc.), delivery connection being (re)established (e.g., "MX_RESPONSE"), a screen being turned on, one or more packets being sent over a delivery connection, a total throughput being at or above a threshold amount of throughput, link quality being at or above a threshold quality measurement, and/or other reasons.

MX Session Resume Response (mx_session_resume_rsp): used to notify the client 101 that the server 140 has resumed MAMS/GMA (session) operation and/or may be used for time synchronization. The mx_session_resume_rsp shares the same format as the mx_session_termination_req and/or mx_session_termination_rsp, and carries a unique_session_id.

The above messages may be used during a suspend/resume procedure, which allows the MAMS client 101 to notify the MAMS server 140 about temporarily suspending all MAMS operations to conserve resources and/or save power. In response, the MAMS server 140 keeps all the MAMS context information of the client 101 and stops performing any MAMS-specific operations (e.g., GMA convergence on the data plane). This procedure enhances the MAMS framework to improve client power efficiency and reduce resource consumption, for example, when the client device 101 is unattended or/and has very little active traffic.

The previously described MAMS control/management messages may include the following data types.

Base information (MXBase): This data type is the base information that every message between the CCM 206 and NCM 236 exchanges has including the following information:

(a) Version: Version of MAMS used.
(b) Message Type: Message type being sent, where the following are considered valid values: "mx_discover", "mx_system_info", "mx_capability_req", "mx_capability_rsp", "mx_capability_ack", "mx_up_setup_conf_req", "mx_up_setup_cnf", "mx_reconf_req", "mx_reconf_rsp", "mx_path_est_req", "mx_path_est_results", "mx_traffic_steering_req", "mx_traffic_steering_rsp", "mx_ssid_indication", "mx_keep_alive_req", "mx_keep_alive_rsp", "mx_measurement_conf", "mx_measurement_report", "mx_session_termination_req", "mx_session_termination_rsp", "mx_session_resume_req", "mx_session_resume_rsp", "mx_app_madp_assoc_req", "mx_app_madp_assoc_rsp", "mx_network_analytics req", "mx_network_analytics_rsp"
(c) Sequence Number: Sequence number to uniquely identify a particular message exchange (e.g., MX Capability Request/Response/Acknowledge).

Unique Session ID: This data type represents the unique session ID between a CCM 206 and NCM 236 entity. It contains an NCM ID that is unique in the network and a session ID that is allocated by the NCM for that session. On receipt of the MX Discover message, if the session exists, then the old session ID is returned in the MX System Info message; otherwise, the NCM 236 allocates a new session ID for the CCM 206 and sends the new ID in the MX System Info message.

NCM Connections: This data type represents the connection available at the NCM 236 for MAMS connectivity toward the client. It contains a list of NCM 236 connections available, where each connection has the following information:

(a) Connection Information, see Appendix C.2.4 of [RFC8743].
(b) NCM Endpoint Information: Contains the network address (e.g., IP address or the like) and port exposed by the NCM 236 endpoint for the CCM 206.

Connection Information: This data type provides the mapping of connection ID and connection type. This data type contains the following information:

(a) Connection ID: Unique number or string identifying the connection.
(b) Connection Type: Type of RAT connection associated with the connection ID. Examples of the type of connection include "Wi-Fi", "5G_NR", "MulteFire", "LTE", "DSL", etc.

Features and Their Activation Status: This data type provides the list of all features with their activation status. Each feature status contains the following:

(a) Feature Name: the name of the feature can be one of the following: "lossless_switching", "fragmentation", "concatenation", "uplink_aggregation", "downlink_aggregation", and "measurement".
(b) Active status: Activation status of the feature: "true" means that the feature is active, and "false" means that the feature is inactive.

Anchor Connections: This data type contains the list of Connection Information items (see e.g., Appendix C.2.4 of [RFC8743]) that are supported on the anchor (core) side.

Delivery Connections: This data type contains the list of Connection Information items (see e.g., Appendix C.2.4 of [RFC8743]) that are supported on the delivery (access) side.

Method Support: This data type provides the support for a particular convergence or adaptation method. It consists of the following:

(a) Method: Name of the method.
(b) Supported: Whether the method listed above is supported or not. Possible values are "true" and "false".

Convergence Methods: This data type contains the list of all convergence methods and their support status. Examples of the possible convergence methods include: "GMA", "MPTCP_Proxy", "GRE Aggregation_Proxy", and "MPQUIC".

Adaptation Methods: This data type contains the list of all adaptation methods and their support status. Examples of the possible adaptation methods include: "UDP_without_DTLS", "UDP_with_DTLS", "IPsec", and "Client_NAT".

Setup of Anchor Connections: This data type represents the setup configuration for each anchor connection that is required on the client's side. It contains the following information, in addition to the connection ID and type of the anchor connection:

(a) Number of Active MX Configurations: If more than one active configuration is present for this anchor, then this identifies the number of such connections.
(b) The following convergence parameters are provided for each active configuration:

(1) MX Configuration ID: Present if there are multiple active configurations. Identifies the configuration for this MADP instance ID.

(2) Convergence Method: Convergence method selected (see convergence methods discussed previously and/or described in Appendix C.2.9 of [RFC8743]).

(3) Convergence Method Parameters described in Appendix C.2.11.1 of [RFC8743].

(4) Number of Delivery Connections: The number of delivery connections (access side) that are supported for this anchor connection.

(5) Setup of delivery connections described in Appendix C.2.11.2 of [RFC8743].

Convergence Method Parameters: This data type represents the parameters used for the convergence method and contains the following:

(a) Proxy IP: IP address of the proxy that is provided by the selected convergence method.

(b) Proxy Port: Port of the proxy that is provided by the selected convergence method.

Setup Delivery Connections: This is the list of delivery connections and their parameters to be configured on the client. Each delivery connection defined by its connection information (see e.g., Appendix C.2.4 of [RFC8743]) optionally contains the following:

(a) Adaptation Method: Selected adaptation method name. This shall be one of the methods listed in Appendix C.2.10 of [RFC8743].

(b) Adaptation Method Parameters: Depending on the adaptation method, one or more of the following parameters shall be provided:

(1) Tunnel Network Address (e.g., IP address or the like).

(2) Tunnel Port address.

(3) Shared Secret.

(4) MX header optimization: If the adaptation method is UDP_without_DTLS or UDP_with_DTLS, and convergence is GMA, then this flag represents whether or not the checksum field and the length field in the IP header of an MX PDU should be recalculated by the MX Convergence Layer. The possible values are "true" and "false". If it is "true", both fields remain unchanged; otherwise, both fields should be recalculated. If this field is not present, then the default of "false" should be considered.

Init Probe Results: This data type provides the results of the init probe request made by the NCM. It consists of the following information:

(a) Lost Probes: Percentage of probes lost.

(b) Probe Delay: Average delay of probe message, in microseconds.

(c) Probe Rate: Probe rate achieved, in megabits per second.

Active Probe Results: This data type provides the results of the active probe request made by the NCM. It consists of the following information:

(a) Average Probe Throughput: Average active probe throughput achieved, in megabits per second.

Downlink Delivery: This data type represents the list of connections that are enabled on the delivery side to be used in the downlink direction.

Uplink Delivery: This data type represents the list of connections and parameters enabled for the delivery side to be used in the uplink direction. The uplink delivery consists of multiple uplink delivery entities, where each entity consists of a TFT (see e.g., Appendix C.2.16 of [RFC8743]) and a list of connection IDs in the uplink, where traffic qualifying for such a TFT can be redirected.

Traffic Flow Template: The TFT generally follows the guidelines specified in 3GPP TS 23.060 v16.0.0 (2019 Mar. 25). The TFT in MAMS consists of one or more of the following:

(a) Remote Address and Mask: IP address and subnet for remote addresses represented in Classless Inter-Domain Routing (CIDR) notation. Default: "0.0.0.0/0".

(b) Local Address and Mask: IP address and subnet for local addresses represented in CIDR notation. Default: "0.0.0.0/0"

(c) Protocol Type: IP protocol number of the payload being carried by an IP packet (e.g., UDP, TCP). Default: 255.

(d) Local Port Range: Range of ports for local ports for which the TFT is applicable. Default: Start=0, End=65535.

(e) Remote Port Range: Range of ports for remote ports for which the TFT is applicable. Default: Start=0, End=65535.

(f) Traffic Class: Represented by Type of Service in IPv4 and Traffic Class in IPv6. Default: 255

(g) Flow Label: Flow label for IPv6, applicable only for IPv6 protocol type. Default: 0 (see e.g., Amante et al., "IPv6 Flow Label Specification", IETF RFC 6437 (November 2011).

Measurement Report Configuration: This data type represents the configuration done by the NCM 236 toward the CCM 206 for reporting measurement events:

(a) Measurement Report Parameter: Parameter that shall be measured and reported. This is dependent on the connection type:

(1) For the connection type of "Wi-Fi", the allowed measurement type parameters are "WLAN_RSSI", "WLAN_LOAD", "UL_TPUT", "DL_TPUT", "EST_UL_TPUT", and "EST_DL_TPUT".

(2) For the connection type of "LTE", the allowed measurement type parameters are "LTE_RSRP", "LTE_RSRQ", "UL_TPUT", and "DL_TPUT".

(3) For the connection type of "5G_NR", the allowed measurement type parameters are "NR_RSRP", "NR_RSRQ", "UL_TPUT", and "DL TPUT".

(b) Threshold: High and low threshold for reporting.

(c) Period: Period for reporting, in milliseconds.

Measurement Report: This data type represents the measurements reported by the CCM for each access network measured. This type contains the connection information, the Delivery Node ID that identifies either the cell (ECGI) or the WiFi Access Point ID or MAC address (or equivalent identifier in other technologies), and the actual measurement performed by the CCM in the last measurement period.

1.4. Genericmulti-Access (GMA) Encapsulationprotocol

As alluded to previously, for MX devices, it is desirable to combine the multiple access network connections seamlessly to improve quality of experience. Such optimization may require additional control information, for example, Sequence Number (SN), in each data packet (e.g., IP packet). The Generic Multi-Access (GMA) Encapsulation Protocol [RFC9188] is a new light-weight and flexible encapsulation protocol for this need.

Referring back to FIG. 1, the convergence (sub)layer in the MAMS DPPS is responsible for multi-access operations, including multi-link (path) aggregation, splitting/reordering, lossless switching/retransmission, fragmentation, concatenation, etc. It operates on top of the adaptation (sub)layer in the protocol stack 102, 142. From the Tx perspective, a User Payload (e.g., IP packet) is processed by the convergence layer first, and then by the adaptation layer before being transported over a delivery connection; from the Receiver perspective, an IP packet received over a delivery connection is processed by the adaptation layer first, and then by the convergence layer.

Today, Generic Routing Encapsulation (GRE) is used as the encapsulation protocol at the convergence layer to encode additional control information (e.g., Key, Sequence Number) (see e.g., 3GPP TS 36.361 v15.0.0 (2018 Jul. 9) ("[LWIPEP]"), Dommety, G., "Key and Sequence Number Extensions to GRE", IETF RFC 2890, (September 2000) ("[GRE1]"), and Leymann et al., "Huawei's GRE Tunnel Bonding Protocol", IETF RFC 8157 (May 2017) ("[GRE2]"). However, there are two main drawbacks with this approach including, for example, IP-over-IP tunneling (required for GRE) leads to higher overhead especially for small packets; and it is difficult to introduce new control fields. For example, the overhead of IP-over-IP/GRE tunneling with both Key and Sequence Number is 32 Bytes (20 Bytes IP header+12 Bytes GRE header), which is 80% of a 40 Bytes TCP ACK packet.

The GMA encapsulation protocol is implemented at the convergence layer. GMA supports three encapsulation methods/formats: trailer-based IP encapsulation, header-based IP encapsulation, and non-IP encapsulation. Particularly, the IP Encapsulation methods avoid IP-over-IP tunneling overhead (e.g., 20 Bytes), which is 50% of a 40 Bytes TCP ACK packet. Moreover, GMA introduces new control fields to support fragmentation and concatenation, which are not available in conventional GRE-based solutions such as in [LWIPEP], [GRE1], and [GRE2].

GMA operates between endpoints that have been configured to operate with GMA through additional control messages and procedures (see e.g., [RFC8743]). Moreover, UDP or IPSec tunneling may be used at the adaptation sublayer to protect GMA operation from intermediary nodes (e.g., access nodes, edge nodes, etc.).

As shown by FIG. 1, a client device 101 (e.g., a smartphone, laptop, IoT device, etc.) may connect to the Internet via multiple access network connections 105. One of these connections (e.g., connection 105A) may operate as an anchor connection, and the other connection (e.g., connection 105B) may operate as the delivery connection. The anchor connection provides the network address (e.g., IP address or the like) and connectivity for end-to-end (e2e) Internet access, and the delivery connection provides additional path between the client 101 and the MX gateway (e.g., MX server 140) for multi-access optimizations. In some implementations, the anchor connection when GMA is used may be a virtual IP connection similar to what is used in a VPN, and there may be up to two simultaneous delivery connections (e.g., 5G/NR, LTE, WiFi, etc.), each of which has a dedicated UDP tunnel established over for data transfer.

For example, per-packet aggregation allows a single IP flow to use the combined bandwidth of the two connections. In another example, packets lost due to temporarily link outage may be retransmitted. Moreover, packets may be duplicated over multiple connections to achieve high reliability and low latency, and duplicated packets should be eliminated by the receiving side. Such multi-access optimization requires additional control information (e.g., SN) in each IP data packet, which can be supported by the GMA encapsulation protocol described herein and/or in [RFC9188].

GMA is usually used when multiple access network connections are used, but may also be used when only a single access network connection is used. In these scenarios, GMA may be used for loss detection and recovery purposes, or used to concatenate multiple small packets to reduce per packet overhead/resource consumption.

FIG. 13 shows an OTT GMA E2E Network Reference Architecture 1300. In FIG. 13, the MA client 101 includes the CCM 206, which is a control-plane functional entity in the client 101 that exchanges MAMS control messages with the NCM 236 and configures multiple network paths at the client for transport of user data. The CCM 206 is communicatively coupled with a GMA client (Gc) 1301 in the MA client 101.

The Gc 1301 is a data plane functional entity in the client 101 that handles user data forwarding across multiple network paths 105 and MA convergence operations (e.g., splitting, steering, duplication, measurement, etc.). The Gc 1301 operates its own GMA protocol stack, which include the GMA data plane layer, which is on top of respective transport layers Tms-1 and Tms-2 (e.g., TCP, UDP, etc.), which are on top of respective network layers Net-1 and Net-2 (e.g., IP or the like). The respective network layers interact with respective access layer entities RAT-1 and RAT-2. In this example RAT-A is a WiFi station (STA) and RAT-B is an LTE UE.

The MA server 140 includes the NCM 236, which is control-plane functional entity in the network that handles MAMS control messages from the client 101, 1 and configures distribution of data packets over multiple network paths, and user plane treatment of the traffic flows. The NCM 236 is communicatively coupled with a GMA server (Gs) 1340 in the MA server 140. The Gs 1340 is a data plane functional entity in the network that handles user data forwarding across multiple network paths 107 and MA convergence operations (e.g., splitting, steering, duplication, measurement, etc.). The Gs 1340 includes a GMA protocol stack that is the same or similar to the GMA protocol stack in the Gc 1301. Furthermore, the MA server 140, and in particular the Gs 1340, may be communicatively coupled with a NAT/Firewall gateway 1350. The NAT/Firewall gateway 1350 may be disposed between the MA server 140 and a DN 170, 175 (e.g., the Internet, an enterprise network, a local area DN, and/or the like).

A websocket-based (e.g., TCP, UDP, etc.) secure connection is established between the CCM 206 and NCM 236 to exchange MAMS management messages 1330, which are used for configuring the data plane functions (e.g., Gc 1301 and Gs 1340). The MAMS management messages 1330 are discussed in more detail infra.

There are two types of connections in a GMA system 1300: anchor connections and delivery connections. An anchor connection is an IP connection that is used by applications for e2edata transfer. A delivery connection is a network connection (e.g., IP connection) that is used to deliver user data between the Gc 1301 and the Gs 1340. The anchor connection in the OTA GMA system 1300 is virtual network (e.g., IP) connection, which is similar to what is used in virtual private networks (VPNs). In some implementations, there may be up to two simultaneous delivery connections (e.g., 5G/NR, LTE, WiFi, etc.) each of which has a dedicated tunnel (e.g., UDP tunnel or the like) established for data transfer.

The Gc 1301 and/or the Gs 1340 select the delivery connection for MAMS messages based on a current state of the Gc 1301 and/or the Gs 1340, which may include one or more of the following: send all MAMS messages over a first (preferred) delivery connection (e.g., WiFi) in state 1 or 3 (see e.g., FIG. 15); and send all MAMS message over the second delivery connection (e.g., Cellular) in state 2 or 4 (see e.g., FIG. 15).

In one example implementation, the NAN 111A is a cellular base station such as a 5G/NR gNB, an LTE eNB, and/or the like, and the GW 1320A comprises one or more servers operating as an Evolved Packet Core (EPC) for LTE implementations or a 5G system (5GS)/5G core network (5GC) for 5G/NR implementations. In this example implementation, the one or more servers operate one or more network functions (NFs) such as a UPF in 5G/NR implementations, a Serving Gateway (S-GW) and/or Packet Data Network Gateway (P-GW) in LTE implementations, or the like. In this example implementation, connection 106A is an N3 reference point/interface for 5G/NR implementations or an S1 reference point/interface for LTE implementations, and connection 107A is an N6 reference point/interface for 5G/NR implementations or an SGi reference point/interface for LTE implementations.

In another example implementation (with may be combined with the previously described example implementation), the NAN 111B is a WLAN access point (AP) such as a WiFi AP, and the GW 1320B comprises one or more servers and/or network elements operating as a WLAN (WiFi) access gateway (WAG), a broadband network gateway (BNG), and/or the like. In this example implementation, each of connection 106B and connection 107B may be a suitable tunneling interface/link such as a GRE tunnel, general packet radio service (GPRS) Tunneling Protocol (GTP) tunnel, Mobile IP (MIP), a Proxy MIP (PMIP) tunnel, VPN tunnel, and/or the like. The connection 106B and connection 107B may utilize the same or different tunneling protocols and/or communication technologies.

Figure 14:
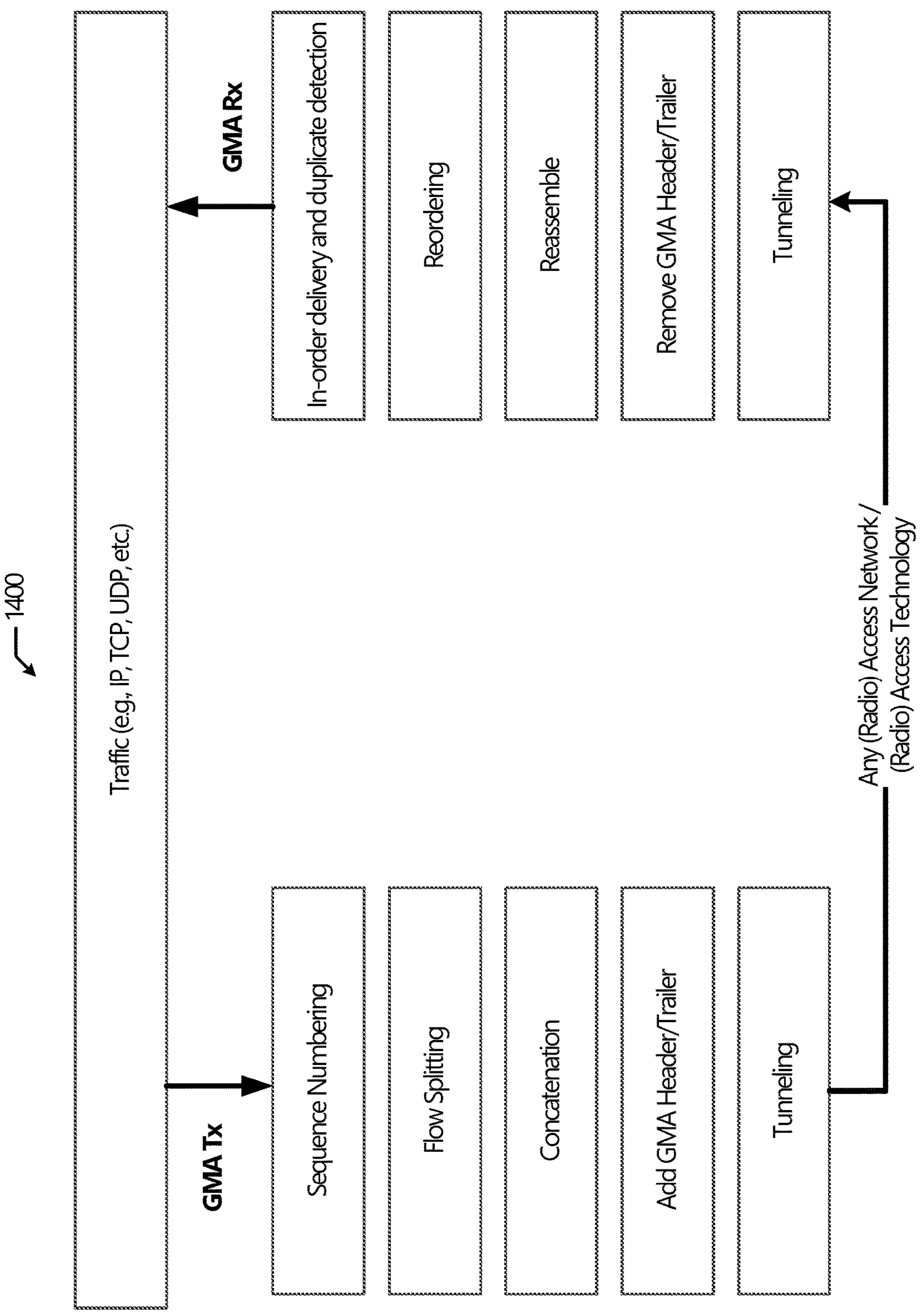
FIG. 14 depicts an example of GMA data plane functionalities.

FIG. 14 shows functionalities of a GMA data plane entity 1400. The GMA data plane entity 1400 corresponds to the Gs 1340 and/or the Gc 1301 discussed previously with respect to FIG. 13 (or corresponds to the GMA data-plane layer within the Gs 1340 and/or the Gc 1301). Here, the GMA data plane acts as a generic convergence layer for any (radio) access network and/or (radio) access technology. The GMA data plane entity 1400 performs various functions such as path quality measurements (QoS, packet loss, latency, etc.), multi-link traffic steering (e.g., traffic splitting/steering, reordering, retransmission, duplication, coding, fragmentation, concatenation, etc.), and QoS-aware traffic shaping and queuing (e.g., priority queuing (PQ), Strict Priority (SP), Weighted Round Robin (WRR), etc.).

The GMA data plane entity 1400 at a GMA Tx prepares traffic (e.g., IP, TCP, UDP, etc.) for transmission to a GMA Rx. The GMA Tx provides sequence number to packets, performs flow (traffic) splitting wherein packets are split or distributed to different multiple access networks (or RATs), simultaneously for delivery to the GMA Rx. The GMA Tx also performs concatenation, which involves putting multiple SDUs into one PDU to reduce packet processing and tunneling overhead, thereby improving signaling and processing efficiency. The GMA Tx also adds a GMA header or trailer to the packet(s) and performs tunneling by, for example, repackaging the packet according to a suitable GMA tunneling protocol. The packet(s) is/are then transmitted over a suitable access network (e.g., one of the different (R)ANs/(R)ATs discussed herein).

The GMA Rx receives the packet(s) and unpackages the packet(s) according to the tunneling protocol being used, and removes the GMA header/trailer. The GMA Rx also reassembles and reorders the packet(s) that are delivered over multiple access networks based on the sequence numbers provided by the GMA Tx. The GMA Rx then performs duplicate detection to identify (and discard) and duplicate packets, and then delivers, in-order, the reassembled and reordered packet(s) to higher layers Additionally or alternatively, the GMA data plane entity 1400 provides lossless switching, which involves the retransmission and/or recovery of packets that may be lost when switching from one network access path to another network access path. Additionally or alternatively, the GMA data plane entity 1400 performs or provides path quality measurements, which includes passive and active measurements of QoS parameters such as, for example, packet loss rate, round trip time, among many others (such as the various measurements discussed herein). Additionally or alternatively, the GMA data plane entity 1400 performs other functions such as automatic repeat request (ARQ)-like retransmission, duplication, network coding, traffic shaping/queuing, and/or the like.

FIG. 15 illustrates a client-based GMA data traffic control state machine 1500. The data traffic control state machine 1500 includes the following states:

State 0 (Idle): the (anchor) virtual connection is down.

State 1 (RAT1 only): all data traffic (DL and UL) are delivered over the first (preferred) RAT connection (RAT1).

State 2 (RAT2 only): all data traffic are delivered over the second connection (RAT2).

State 3 (DL over RAT1 & RAT2, UL over RAT2): DL traffic are delivered over both connections, and UL traffic are delivered over the second connection (RAT2).

The data traffic control state machine 1500 includes the following state-transition triggers:

(1) The (anchor) virtual connection is established successfully. This trigger causes a transition from state 0 to state 1.

(2) Congestion is detected over the RAT1 DL and RAT2 Link Success has been declared/detected wherein the last control message over RAT2 was successful. This trigger causes a transition from state 1 to state 3. In some implementations, congestion detection (based on packet loss) is applicable only if the RAT1 Congestion Detection flag is disabled.

(3) Congestion is no longer present over the RAT1 DL (applicable only if the RAT1 Congestion Detection flag is disabled). This trigger causes a transition from state 3 to state 1.

(4) RAT1 received signal quality (or received signal strength) is relatively poor (e.g. <−75 decibel-milliwatts (dBm)) and/or RAT1 has declared or detected a link failure (or Radio Link Failure (RLF)). The particular mechanism for detecting and/or declaring a link failure (or RLF) is defined by the standards/specifications of RAT1. This trigger causes a transition from state 1 to state 2 or a transition from state 3 to state 2.

(5) The GMA/MAMS operation is terminated or suspended. Termination of the GMA/MAMS operation may include a delivery connection (RAT2 or RAT1) being lost for a predefined period (e.g., 10 minutes or some other amount of time) and/or total throughput is relatively low (e.g., <10 kilobits per second (Kbps)). Suspended GMA/MAMS operation may include a screen being off and/or total throughput is low (e.g., <10 Kbps). This trigger causes a transition from state 1 to state 0 or a transition from state 2 to state 1.

(6) RAT1 received signal quality is relatively good (e.g., >−70 dBm) and RAT1 has detected/declared a Link Success. This trigger causes a transition from state 2 to state 3.

(7) RAT2 has detected/declared a link failure (or RLF). The particular mechanism for detecting and/or declaring a link failure (or RLF) is defined by the standards/specifications of RAT2. This trigger causes a transition from state 3 to state 1 or a transition from state 2 to state 0.

If a link is declared "Link Failure", it should not be used to send any data or control packets, except "Probe/ACK", and the "Link Failure" status can only be turned off after successfully transmitting a probe message over the link.

The following three flows are defined for data traffic:

High Reliability (Flow ID=1): High Reliability traffic will be delivered by duplication over both RAT1 and RAT2 in state 1, 2 and 3. Notice that the receiver will be responsible for detecting and removing duplicated packet based on their sequence number (using the algorithm defined in 6.6.1). Notice that high reliability flow should have low data rate (e.g., <1 Mbps).

Delay Sensitive (Flow ID=2): Delay Sensitive traffic will be delivered over RAT2 only in State 1, 2 and 3.

High Throughput (Flow ID=3): High Throughput (e.g., DL) traffic will be delivered by aggregation over both RAT1 and RAT2 in State 3, and the receiver (Gc) will be responsible for reordering packets using algorithm defined in 6.6.1 or 6.6.2. UL traffic will be delivered by RAT1 in state 1 and by RAT2 in state 2. In state 3, UL traffic will be delivered by RAT2 if the "UL-over-RAT2 flag" is set to "1", and by RAT1 otherwise. The default value of "UL-over-RAT2 flag" is 0 (disabled).

In the example of FIG. 15, RAT1 may be a WLAN RAT (e.g., WiFi) and RAT2 may be a cellular RAT (e.g., 5G/NR, LTE, GSM, GPRS, WiMAX, etc.). The specific RAT protocols may define the mechanisms and/or parameters for determining Link Failures and/or Link Successes.

FIG. 16 depicts an example GMA convergence control protocol stack 1600*c*. The GMA convergence control protocol stack 1600*c* includes a GMA convergence control layer which includes GMA/MAMS control messages. Additionally, a third transport layer (e.g., UDP or IP Security Protocol (IPSec)) tunnel is established over a virtual (anchor) IP connection (IP-3) for sending time-sensitive control messages (e.g., probes, traffic splitting updates, etc.).

The virtual (anchor) IP connection is on top of a GMA convergence layer (also referred to as a "GMA encapsulation layer"). This allows the (virtual) IP packets carrying a GMA control message(s) to be encapsulated with a GMA header, which only includes a 2B Flag field (discussed infra) where the Flag field is set to all "0"s. The GMA encapsulation layer resides on top of respective transport (e.g., UDP or IPSec) tunneling layers for respective access networks (ANs) 1 and 2, which is on top of respective IP layers, which are on top of layer 2 (L2) and Layer 1 (L1) of the respective ANs 1 and 2. The anchor connection is now virtual and no longer tied to any specific access network (e.g., AN1 and AN2 in the example of FIG. 16).

FIG. 16 also shows an example GMA convergence data protocol stack 1600*d*. The GMA convergence data protocol stack 1600*d* is similar to the GMA convergence control protocol stack 1600*c* except that the GMA convergence control layer in the stack 1600*c* is replaced with an applications layer.

Figure 17:
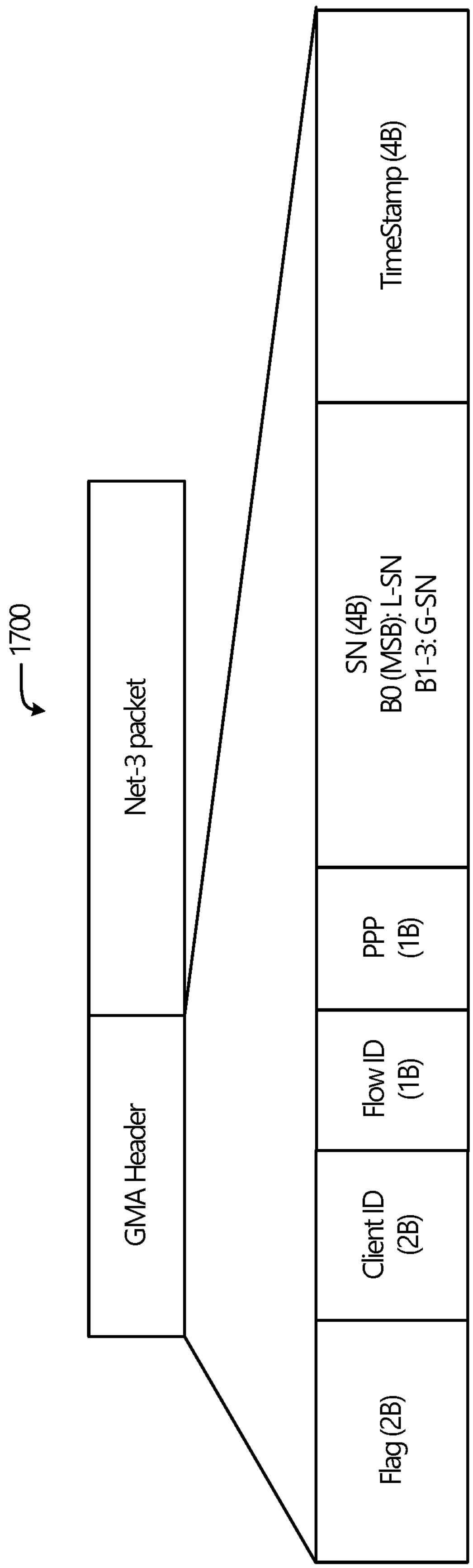
FIG. 17 depicts GMA convergence protocol data unit (PDU) format.

In both stacks stack 1600*c*, stack 1600*d*, anew protocol layer, the GMA convergence (also referred to as trailer-based MAMS convergence [UPMAMS]) layer, is introduced to handle all multi-path (management) related operations (e.g., concatenation, splitting, reordering, duplication, elimination, measurements, etc.). In some implementations, the GMA convergence layer encapsulates the data and/or control messages using a GMA header-based encapsulation format is used as shown in FIG. 17. The GMA convergence encapsulation protocol is discussed in [RFC9188]. When an access network 110 does not support any MAMS network functions, the virtual connection is established between an end-device (e.g., client device 101) and cloud server or Edge server. This virtual connection may then be used as the anchor connection for cloud applications or Edge applications. The virtual anchor connections may be an IP connection that is used by applications for e2e data transfer. The other connections (e.g., delivery connections) of AN1 and AN2 may be IP connections to deliver user data between the client and server. Additionally, the existing MAMS convergence sublayer functionalities [UPMAMS] can be reused as-is. Additionally or alternatively, the virtual (anchor) connection is established for sending time-sensitive MAMS control/management messages (e.g., probes, traffic splitting updates, etc.) The (virtual) packets carrying a GMA control/management messages are also encapsulated with the GMA header, which is also discussed in more detail infra FIG. 17 depicts GMA convergence protocol data unit (PDU) format 1700. The PDU 1700 includes a GMA header and an IP packet. The GMA header is discussed in more detail infra. In this example, the PDU 1700 includes a flag field (2 bits (B), a client ID field (2B), a flow ID field (1B), a Per-Packet Priority (PPP) field 1B), a sequence number (SN) field (4B), and a timestamp field (4B) as follows where Bit 0 is the most significant bit (MSB) and Bit 15 is the least significant bit (LSB):

Bit #0 (MSB): Client ID

Bit #1: Flow ID

Bit #2: PPP (Per-Packet Priority)

Bit #3: Sequence Number (B0: L-SN, B1-B3: G-SN).

Bit #4: Timestamp

Bit #13~15: GMA protocol (e.g., "0x07")

The B0 of the SN field includes is an L-SN (sub)field and B1-B3 of the SN field is a G-SN (sub)field. The G-SN is for reordering and the L-SN is for packet loss measurement.

The (2B) flag field indicates what additional fields are included in the GMA header. The following bits in the flag field may include a first value if the packet 1700 carries downlink data (e.g., "0xF807"), a second value if the packet carries uplink data (e.g., "0x7807"), a third value if the packet 1700 carries an encrypted control message (e.g., "0x800F"), or a fourth value if the packet 1700 carries an un encrypted control message (e.g., "0x0000"). Additionally or alternatively, if the packet 1700 carries uplink data, the "Client ID" field is not be included in the GMA header. Additionally or alternatively, if the packet 1700 carries an encrypted control message, it may include the following fields:

Bit #0 (MSB): Client ID

Bit #12: Encryption Enabled

Bit #13~15: GMA protocol (e.g., "0x07").

As shown in FIGS. 3, 16, and 17, there are three different network addresses (e.g., IP addresses) and three transport connections (e.g., UDP, TCP, etc.) for each client in a GMA system. The network address (e.g., IP address) of each delivery connection on the client is configured by a respective access network. All other network addresses (e.g., IP address) and transport ports (e.g., UDP, TCP ports, or the like) are configured in the GMA system through either client configuration or MAMS messages.

1.1.1. Gma Encapsulation Methods and Formats

The GMA encapsulation protocol supports the following three methods: trailer-based IP encapsulation; header-based IP encapsulation; and (header-based) non-IP encapsulation. Trailer-based IP encapsulation should be used as long as implementation allows. Header-based encapsulation should be used if trailered-based encapsulation is not feasible due to any reason (e.g., implementation constraints). In this case, if the adaptation layer (e.g., UDP tunneling) supports non-IP packet format, header-based non-IP encapsulation should be used; otherwise, header-based IP encapsulation should be used.

If non-IP encapsulation is configured, GMA header should always be present in every packet. In comparison, if IP encapsulation is configured, GMA header or trailer may be added dynamically on per-packet basis, and it indicates the presence of GMA header (or trailer) to set the protocol type of the GMA PDU to "114".

Figure 18:
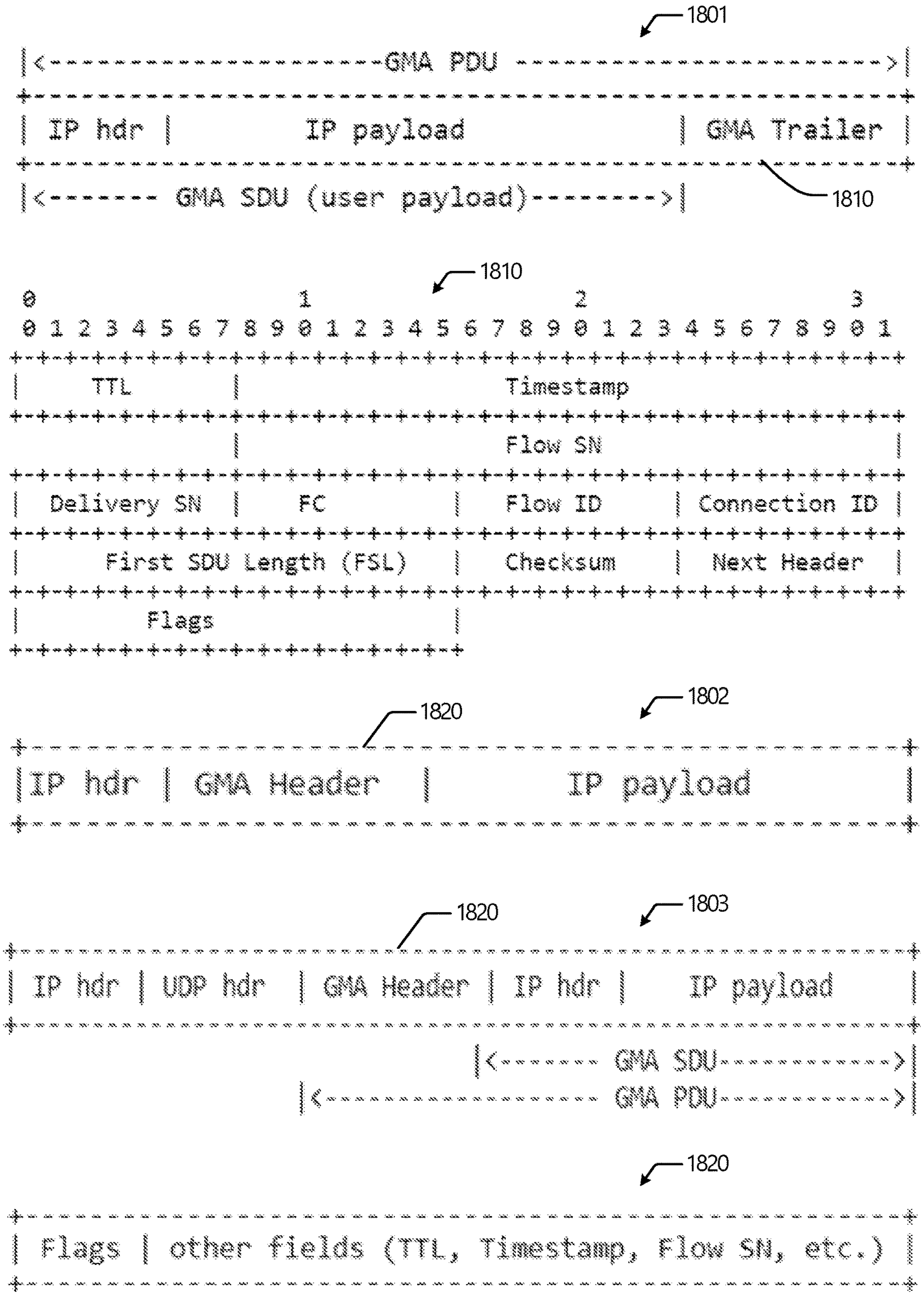
FIG. 18 illustrates various GMA packet formats.

The GMA endpoints may configure the encapsulation method through control signaling (see e.g., FIG. 2) or pre-configuration. For example, an "MX UP Setup Configuration Request" message as discussed in [RFC8743] includes the "MX Convergence Method Parameters," which provides the list of parameters to configure the convergence layer, and can be extended to indicate the GMA encapsulation method. A "GMA encapsulation format" parameter may be included to indicate one of the three GMA encapsulation methods FIG. 18 shows various GMA Protocol Data Unit (PDU) formats including a GMA PDU Format with Trailer-based IP Encapsulation 1801, a GMA PDU Format with Header-based IP Encapsulation 1802, and a GMA PDU Format with Non-IP Encapsulation 1803. Each GMA PDU (regardless of the particular format used) may carry one or more IP packets (also referred to as (GMA) service data units (SDUs)), or a fragment of an IP packet (or (GMA) SDU fragment), in the payload section of the PDU.

The GMA PDU 1801 includes an IP header, IP payload, and a GMA trailer 1810. The other GMA PDUs 1802 and 1803 include a GMA header 420 instead of the GMA trailer 1810. The GMA trailer 1810 and GMA header 1820 include various GMA control fields. Usually, the trailer-based IP encapsulation GMA PDU 1801 is used as long as implementation allows/permits.

However, the header-based encapsulation PDUs 1802 and 1803 may be used if the GMA control fields cannot be added at the end of the packets.

1.1.1.1. Trailer-Based Ip Encapsulation

For the trailer-based GMA PDU 1801, the Protocol Type field in the IP header is changed to "114" (any 0-hop protocol) to indicate the presence of the GMA trailer 1810.

If the original IP packet is IPv4, the following three IP header fields may be changed:

IP length field—add the length of the "GMA Trailer" to the length of the original IP packet;

Time to Live (TTL)—set the TTL field to "1";

IP checksum field—recalculate IP checksum after changing the "Protocol Type" field, "TTL", and "IP Length".

If the original IP packet is Ipv6, the following two IP header fields may be changed:

IP length field—add the length of the "GMA Trailer" to the length of the original IP packet;

Hop Limit (HL) field—set the HL field to "0".

If UDP tunneling is used at the adaptation layer to carry the GMA PDU 1801, 1802 or 1803, these three IP header fields may remain unchanged, and the Rx will determine the GMA PDU length based on the UDP packet length.

FIG. 18 also shows an example format of the GMA trailer 1810, which shows various control fields present. The GMA trailer 1810 includes one or more mandatory fields and zero or more optional fields. The mandatory fields include the "flags" field and "next header" field, which are the last 3 bytes of the GMA trailer 1810. The Next Header field (1 Byte) indicates the IP protocol type of the (first) SDU in a PDU, and it stores the value before it was overwritten to '114.' For the Flags field (2 Bytes), Bit 0 is the most significant bit (MSB), and Bit 15 is the least significant bit (LSB). The Flags field includes the following fields: Checksum Present (bit 0): If the Checksum Present bit is set to 1, then the Checksum field is present; Concatenation Present (bit 1): If the Concatenation Present bit is set to 1, then the PDU carries multiple SDUs, and the First SDU Length field is present; Connection ID Present (bit 2): If the Connection ID Present bit is set to 1, then the Connection ID field is present; Flow ID Present (bit 3): If the Flow ID Present bit is set to 1, then the Flow ID field is present; Fragmentation Present (bit 4): If the Fragmentation Present bit is set to 1, then the PDU carry a fragment of the SDU and the Fragmentation Control field is present; Delivery SN Present (bit 5): If the Delivery Sequence Number (SN) Present bit is set to 1, then the Delivery SN field is present and contains the valid information; Flow SN Present (bit 6): If the Flow SN Present bit is set to 1, then the Sequence Number field is present; Timestamp Present (bit 7): If the Timestamp Present bit is set to 1, then the Timestamp field is present; TTL Present (bit 8): If the TTL Present bit is set to 1, then the TTL field is present; Reserved (bit 9-12): set to "0" and ignored on receipt; Version (bit 13~15): GMA version number, set to 0 for the GMA encapsulation protocol specified in [RFC9188]. The Flags field is at the end of the PDU and the Next Header field is the second to last field. The GMA Rx may decode the Flags field first to determine the length of the GMA trailer, and then decodes the one or more optional fields included in the GMA PDU (discussed infra).

The GMA trailer 1810 may also include zero or more of the following optional fields: Checksum (1 Byte) to contain the (one's complement) checksum sum of all the 8 bits in the trailer 1810 (for purposes of computing the checksum, the value of the checksum field is Zero; this field is present only if the Checksum Present bit is set to one); First SDU Length (2 Bytes) indicates the length of the first IP packet in the PDU, only included if a PDU contains multiple IP packets (e.g., this field is present only if the Concatenation Present bit is set to one); Connection ID (1 Byte) includes an unsigned integer to identify the anchor and/or delivery connection of the GMA PDU (e.g., this field is present only if the Connection ID Present bit is set to one): the Anchor Connection ID data element/field (MSB 4 Bits of the Connection ID field) is an unsigned integer to identify the anchor connection, and the Delivery Connection ID data element/field (LSB 4 Bits of the Connection ID field) is an unsigned integer to identify the delivery connection; Flow ID (1 Byte) includes an unsigned integer to identify the IP flow that a PDU belongs to, for example, Data Radio Bearer (DRB) ID [LWIPEP] for a cellular (e.g. LTE, 5G/NR, etc.) connection (e.g., this field is present only if the Flow ID Present bit is set to one); Fragmentation Control (FC) (e.g. 1 Byte) to provide necessary information for re-assembly, only needed if a PDU carries fragments (e.g., this field is present only if the Fragmentation Present bit is set to one; see e.g., section 5 in [RFC9188]); Delivery SN (1 Byte) includes an auto-incremented integer to indicate the GMA PDU transmission order on a delivery connection (e.g., the Delivery SN may be needed to measure packet loss of each delivery connection and therefore generated per delivery connection per flow; e.g., this field is present only if the Delivery SN Present bit is set to one); Flow SN (3 Bytes) includes an auto-incremented integer to indicate the GMA SDU (e.g., IP packet) order of a flow (e.g., the flow SN may be needed for retransmission, reordering, and fragmentation; the flow SN may be generated per flow; e.g., this field is present only if the Flow SN Present bit is set to one; Timestamp (4 Bytes) to contain the current value of the timestamp clock of the Tx in the unit of 1 millisecond. This field is present only if the Timestamp Present bit is set to one; and TTL (1 Byte) to contain the TTL value of the original IP header if the GMA SDU is IPv4, or the Hop-Limit value of the IP header if the GMA SDU is IPv6 (e.g., field is present only if the TTL Present bit is set to one). The GMA control fields follow the bit order in the flags field (e.g., Bit 0 (MSB) of the flags field is the checksum present bit, and the checksum field is the last in the trailer 1810 except for the two mandatory fields; Bit 1 is the concatenation present bit and the FSL field is the second to last, and so forth).

1.1.1.2. Header-Based Ip Encapsulation

FIG. 18 also shows the header-based IP encapsulation format 1802. Here, the GMA header 1820 is inserted right after the IP header of the GMA SDU.

FIG. 18 also shows an example GMA header (hdr) format 1820, which includes the Flags field and the GMA control fields. In comparison to GMA trailer 1810, the only difference is that the Flags field is now in the front so that the Rx can first decode the Flags field to determine the GMA header length. Moreover, the IP header fields of the GMA PDU should be changed in the same way as trailered-based IP encapsulation (as discussed previously). Additionally or alternatively, the TTL, FSL, and Next Header fields are removed from the GMA control fields since the IP header fields of the GMA SDU remain unchanged during encapsulation. The order of the other GMA control fields is/are the same as discussed previously.

In some implementations, if the adaptation layer (e.g., UDP tunneling or the like) supports a non-IP packet format, the GMA PDU 1802 may be used without modification. If the adaptation layer (see e.g., FIG. 1B) only supports the IP packet format, the header-based IP encapsulation GMA PDU 1803 may be used. In the header-based IP encapsulation PDU 1803, the IP header of the GMA SDU (e.g., IP payload) is moved to the front of the packet so that the GMA PDU 1803 becomes an IP packet, and the IP header fields of the GMA PDU 1803 may be changed in the same manner as the trailer-based IP encapsulation PDU 1801.

The header or trailer based IP encapsulation PDUs 1802, 1801 may be used dynamically on a per-packet basis, and setting the protocol type of the GMA PDU to "114" indicates the presence of the GMA header 1820 in an IP packet.

1.1.1.3. (Header-Based) Non-Ip Encapsulaton

FIG. 18 also shows the header-based non-IP encapsulation format 1803. Here, "UDP Tunnelling" is configured at the MX adaptation layer. Additionally, the "TTL", "FSL", and "Next Header" are no longer needed. Moreover, the IP header fields of the GMA SDU remain unchanged.

If non-IP encapsulation is configured, the GMA header 1820 is also present.

1.1.2. Fragmentation

The convergence layer MAY support fragmentation if a delivery connection has a smaller maximum transmission unit (MTU) than the original IP packet (SDU). The fragmentation procedure at the convergence sublayer is similar to IP fragmentation (see e.g., "DARPA Internet Program Protocol Specification" IETF RFC 791 (September 1981)) in principle, but with the following two differences for less overhead: the fragment offset field is expressed in number of fragments; and the maximum number of fragments per SDU is 2^7(=128).

The Fragmentation Control (FC) field in the GMA trailer (or header) contains the following bits: Bit #7: a More Fragment (MF) flag to indicate if the fragment is the last one (0) or not (1); and Bit #0~#6: Fragment Offset (in units of fragments) to specify the offset of a particular fragment relative to the beginning of the SDU.

A PDU carries a whole SDU without fragmentation if the FC field is set to all "0"s or the FC field is not present in the trailer. Otherwise, the PDU contains a fragment of the SDU.

The Flow SN field in the trailer is used to distinguish the fragments of one SDU from those of another. The Fragment Offset (FO) field tells the receiver the position of a fragment in the original SDU. The More Fragment (MF) flag indicates the last fragment.

To fragment a long SDU, the Tx creates n PDUs and copies the content of the IP header fields from the long PDU into the IP header of all the PDUs. The length field in the IP header of PDU should be changed to the length of the PDU, and the protocol type should be changed to 114.

The data of the long SDU is divided into n portions based on the MTU size of the delivery connection. The first portion of the data is placed in the first PDU. The MF flag is set to "1", and the FO field is set to "0". The i-th portion of the data is placed in the i-th PDU. The MF flag is set to "0" if it is the last fragment and set to "1" otherwise. The FO field is set to i−1.

To assemble the fragments of a SDU, the receiver combines PDUs that all have the same Flow SN. The combination is done by placing the data portion of each fragment in the relative order indicated by the Fragment Offset in that fragment's GMA trailer (or header). The first fragment will have the Fragment Offset set to "0", and the last fragment will have the More-Fragments flag set to "0".

GMA fragmentation operates above the IP layer of individual access connection (e.g., RAT1, RAT2, etc.) and between the two end points of convergence layer. The convergence layer end points (client, multi-access gateway) should obtain the MTU of individual connection through either manual configuration or implementing Path MTU Discovery (PMTUD) as suggested in Bonica et al., "IP Fragmentation Considered Fragile", IETF RFC 8900 (September 2020).

1.1.3. Concatenation

The convergence sublayer may support concatenation if a delivery connection has a larger maximum transmission unit (MTU) than the original IP packet (SDU). Only the SDUs with the same client network address (e.g., IP address or the like), and the same Flow ID may be concatenated. If the (trailer or header based) IP encapsulation method is used, the First SDU Length (FSL) field should be included in the GMA trailer (or header) to indicate the length of the first SDU. Otherwise, the FSL field should not be included.

To concatenate two or more SDUs, the Tx creates one PDU and copies the content of the IP header field from the first SDU into the IP header of the PDU. The data of the first SDU is placed in the first portion of the data of the PDU. The whole second SDU is then placed in the second portion of the data of the PDU. The procedure continues till the PDU size reaches the MTU of the delivery connection. If the FSL field is present, the IP length field of the PDU should be updated to include all concatenated SDUs and the trailer (or header), and the IP checksum field should be recalculated if the packet is IPv4.

To disaggregate a PDU, if the (header or trailer based) IP encapsulation method is used, the receiver first obtains the length of the first SDU from the FSL field and decodes the first SDU. The receiver then obtains the length of the second SDU based on the length field in the second SDU IP header and decodes the second SDU. The procedure continues till no byte is left in the PDU. If the non-IP encapsulation method is used, the IP header of the first SDU will not change during the encapsulation process, and the receiver SHOULD obtain the length of the first SDU directly from its IP header.

If a PDU contains multiple SDUs, the Flow SN field is for the last SDU, and the Flow SN of other SDU carried by the same PDU can be obtained according to its order in the PDU. For example, if the SN field is 6 and a PDU contains 3 SDUs (IP packets), the SN is 4, 5, and 6 for the first, second, and last SDU respectively. GMA concatenation can be used for packing small packets of a single application, e.g. TCP ACKs, or from multiple applications. Notice that a single GMA flow may carry multiple application flows (TCP, UDP, etc.).

1.1.4. GMA Protocol Stack

FIG. 16 also shows an (anchored) integrated GMA convergence protocol stack 1600*e*. As alluded to previously, GMA data plane functions (e.g., Gc and Gs) may be integrated into one or more existing network functions (e.g., a Gateway (GW), MEC, etc.) to avoid using virtual network interface (e.g., IP #3). The integrated GMA data plane protocol stack 1600*e* uses the RAT1 connection as the anchor connection. As a result, only one UDP tunnel is needed for delivering traffic over the non-anchor connection, which is the RAT2 connection.

In one example, the RAT1 anchor connection is a cellular connection (e.g., 5G/NR, LTE, etc.) and the RAT2 non-anchor connection is a WiFi connection. If using the 5G/LTE connection as the anchor for applications, and the WiFi connection as the delivery connection, UDP tunneling (or IPSec) may be used for delivering 5G/LTE IP traffic over a WiFi network. The GMA convergence sublayer (see also e.g., FIG. 1) is responsible for multi-path management operations (e.g., lossless switching, aggregation/splitting, etc.). In another example, a virtual IP connection may be used as the anchor, and the server 140 will provide all necessary information through MAMS signaling to configure the virtual IP connection on the client side 101. In the example GMA-MAMS DPPS 1600*e*, the GMA data plane functions (Gc 1301 and Gs 1340) may be integrated into an existing network function (e.g., Gateway, Edge server/host such as a MEC server/host, etc.) to avoid using a virtual network interface.

1.1.5. GMA Configuration Parameters

Some example GMA configuration parameters are as follows:

RAT1 probing interval: 30 seconds
RAT2 probing interval in state 1 and 2: 30 seconds
RAT2 probing interval in state 3: 10 second
RAT2 reconnecting interval: 60 seconds
Low throughput threshold: 10 kBps
Link disconnect timer: 10 minutes
RAT1 signal quality low threshold: −75 dBm
RAT1 signal quality high threshold: −70 dBm
RAT1 packet loss low threshold: 1%
RAT1 packet loss high threshold: 10%
Reordering queue size for High Throughput Flow (Flow ID=3): 1000 packets
Reordering timer for High Throughput Flow (Flow ID=3): 100 ms
Reordering queue size for High Reliability Flow (Flow ID=1): 20 packets
Reordering timer for High Reliability Flow (Flow ID=1): 10 ms
Measurement Interval (MI): 30 seconds
Reporting Interval (RI): 50 (MIs)
Default Flow ID (DFI): 3
Control message retransmission limit: 3
Virtual NIC MTU size: 1400 (bytes)
Idle Timer: 1 minute
Timestamp unit: 1000 (us)
UL-over-LTE flag: 0 (disabled, default)/1 (enabled)
Wi-Fi Congestion Detection flag: 0 (disabled, default)/1 (enabled)
Power Save flag: 0 (disabled, default)/1 (enabled)

Both Gc and Gs maintain the following (per-client) parameter(s):

Start_Time: the duration between now and next "time zero" when Start_Time is reset (in the unit of 1 ms).
tx_timeStamp: a timestamp of when a packet is transmitted.
rx_timeStamp: a timestamp of when a packet is received.
Sync_Guard_Time: configurable parameter that controls how long Gc or Gs should wait before starting measurements (based on timestamp info in received packet (s)).

Gc and Gs reset their respective "Start_Time" immediately after the successful exchange of mx_session_resume_req/rsp, and the (tx) timestamp parameter in a control message indicates the duration between transmitting the message and resetting Start Time.

In the above example, RAT1 is a WLAN connection/RAT (e.g., WiFi or the like) and RAT2 is a cellular connection/RAT (e.g., LTE, 5G/NR, GSM, WiMAX, or the like).

1.1.6. GMA Deployment Scenarios

Some example GMA based deployments may be as follows:

In a first GMA deployment, GMA client modules (e.g., GMA Gc and/or CCM 206) may be implemented as a "multi-home VPN" application and run on a UE (e.g., smartphone, tablet, PC, etc.) without any impact to platform or operation system.

In a second GMA deployment, the GMA server modules (e.g., GMA Gs and/or NCM 236) may be implemented as an "Edge/cloud server" application (e.g., MEC app or the like) and run in the Edge or cloud server without any impact to platform or operation system. If running GMA server on the Edge, the traffic routing policy may be configured on the Edge platform such that the following three flows are routed locally to the Edge platform:

TCP flow (for MAMS management messages): IP #1 (or IP #2)+TCP #1
UDP flow (for tunneling traffic over the 1st delivery connection): IP #1+UDP #1
UDP flow (for tunneling traffic over the second delivery connection): IP #2+UDP #2

Moreover, a DNS configuration may be added to the Edge platform such that "gmaserver.mec.com" is mapped to IP #1 and IP #2 over the two delivery connections, respectively.

2. Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and/or the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, and/or the like). The orchestration functions may be used to deploy the isolated user-space instances, identifying and scheduling use of specific hardware, security related functions (e.g., key management, trust anchor management, and/or the like), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, and/or the like), gaming services (e.g., AR/VR, and/or the like), accelerated browsing, IoT and industry applications (e.g., factory automation), media analytics, live streaming/transcoding, and V2X applications (e.g., driving assistance and/or autonomous driving applications).

The present disclosure provides various examples relevant to various edge computing technologies (ECTs) and edge network configurations provided within and various access/network implementations. Any suitable standards and network implementations are applicable to the edge computing concepts discussed herein. For example, many ECTs and networking technologies may be applicable to the present disclosure in various combinations and layouts of devices located at the edge of a network. Examples of such ECTs include [MEC]; [O-RAN]; [ISEO]; [SA6Edge]; [MAMS]; Content Delivery Networks (CDNs) (also referred to as "Content Distribution Networks" or the like); Mobility Service Provider (MSP) edge computing and/or Mobility as a Service (MAs) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure. The edge computing systems and arrangements discussed herein may be applicable in various solutions, services, and/or use cases involving mobility. Examples of such scenarios are shown and described with respect to FIGS. 19-21.

Figure 19:
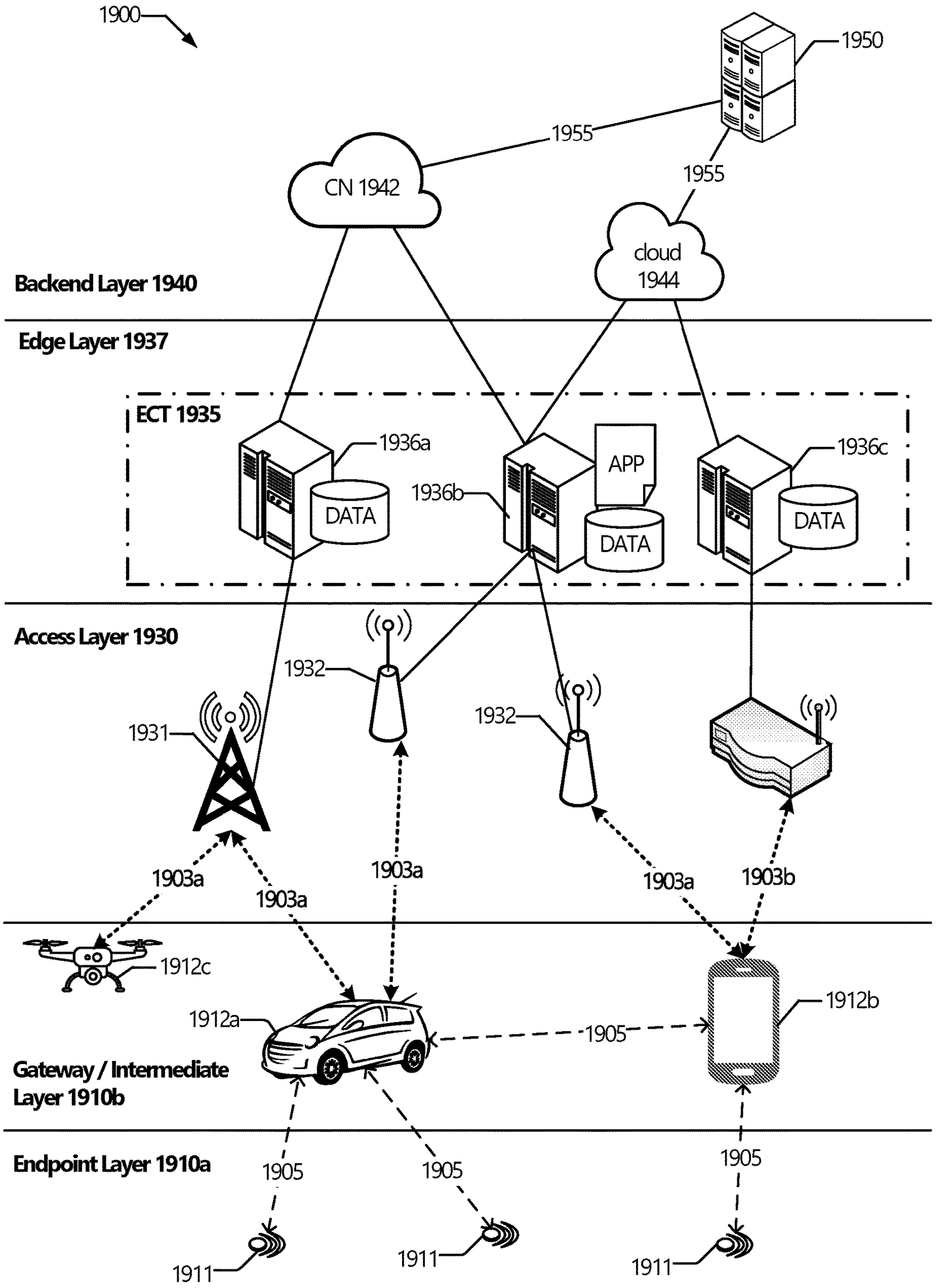
FIG. 19 illustrates an example edge computing environment.

FIG. 19 illustrates an example edge computing environment 1900 including different layers of communication, starting from an endpoint layer 1910*a* (also referred to as "sensor layer 1910*a*", "things layer 1910*a*", or the like) including one or more IoT devices 1911 (also referred to as "endpoints 1910*a*" or the like) (e.g., in an Internet of Things (IoT) network, wireless sensor network (WSN), fog, and/or mesh network topology); increasing in sophistication to intermediate layer 1910*b* (also referred to as "client layer 1910*b*", "gateway layer 1910*b*", or the like) including various user equipment (UEs) 1912*a*, 1912*b*, and 1912*c* (also referred to as "intermediate nodes 1910*b*" or the like), which may facilitate the collection and processing of data from endpoints 1910*a*; increasing in processing and connectivity sophistication to access layer 1930 including a set of network access nodes (NANs) 1931, 1932, and 1933 (collectively referred to as "NANs 1930" or the like); increasing in processing and connectivity sophistication to edge layer 1937 including a set of edge compute nodes 1936*a-c* (collectively referred to as "edge compute nodes 1936" or the like) within an edge computing framework 1935 (also referred to as "ECT 1935" or the like); and increasing in connectivity and processing sophistication to a backend layer 1940 including core network (CN) 1942, cloud 1944, and server(s) 1950. The processing at the backend layer 1940 may be enhanced by network services as performed by one or more remote servers 1950, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 1900 is shown to include end-user devices such as intermediate nodes 1910*b* and endpoint nodes 1910*a* (collectively referred to as "nodes 1910", "UEs 1910", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 1930, which are arranged to provide network connectivity to the UEs 1910 via respective links 1903*a* and/or 1903*b* (collectively referred to as "channels 1903", "links 1903", "connections 1903", and/or the like) between individual NANs 1930 and respective UEs 1910.

As examples, the communication networks and/or access technologies may include cellular technology such as LTE, MuLTEfire, and/or NR/5G (e.g., as provided by Radio Access Network (RAN) node 1931 and/or RAN nodes 1932), WiFi or wireless local area network (WLAN) technologies (e.g., as provided by access point (AP) 1933 and/or RAN nodes 1932), and/or the like. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like).

The intermediate nodes **1910*b* include UE 1912*a*, UE 1912*b*, and UE 1912*c* (collectively referred to as "UE 1912" or "UEs 1912"). In this example, the UE 1912*a* is illustrated as a vehicle system (also referred to as a vehicle UE or vehicle station), UE 1912*b* is illustrated as a smartphone (e.g., handheld touchscreen mobile computing device connectable to one or more cellular networks), and UE 1912*c*** is illustrated as a flying drone or unmanned aerial vehicle (UAV).

However, the UEs 1912 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, and/or the like), plug computers, and/or any type of computing device such as any of those discussed herein.

The endpoints 1910 include UEs 1911, which may be IoT devices (also referred to as "IoT devices 1911"), which are uniquely identifiable embedded computing devices (e.g., within the Internet infrastructure) that comprise a network access layer designed for low-power IoT applications utilizing short-lived UE connections. The IoT devices 1911 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 1911 may be abiotic devices such as autonomous sensors, gauges, meters, image capture devices, microphones, light emitting devices, audio emitting devices, audio and/or video playback devices, electro-mechanical devices (e.g., switch, actuator, and/or the like), EEMS, ECUs, ECMs, embedded systems, microcontrollers, control modules, networked or "smart" appliances, MTC devices, M2M devices, and/or the like. The IoT devices 1911 can utilize technologies such as M2M or MTC for exchanging data with an MTC server (e.g., a server 1950), an edge server 1936 and/or ECT 1935, or device via a PLMN, ProSe or D2D communication, sensor networks, or IoT networks. The M2M or MTC exchange of data may be a machine-initiated exchange of data.

The IoT devices 1911 may execute background applications (e.g., keep-alive messages, status updates, and/or the like) to facilitate the connections of the IoT network. Where the IoT devices 1911 are, or are embedded in, sensor devices, the IoT network may be a WSN. An IoT network describes an interconnecting IoT UEs, such as the IoT devices 1911 being connected to one another over respective direct links 1905. The IoT devices may include any number of different types of devices, grouped in various combinations (referred to as an "IoT group") that may include IoT devices that provide one or more services for a particular user, customer, organizations, and/or the like. A service provider (e.g., an owner/operator of server(s) 1950, CN 1942, and/or cloud 1944) may deploy the IoT devices in the IoT group to a particular area (e.g., a geolocation, building, and/or the like) in order to provide the one or more services. In some implementations, the IoT network may be a mesh network of IoT devices 1911, which may be termed a fog device, fog system, or fog, operating at the edge of the cloud 1944. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1944 to Things (e.g., IoT devices 1911). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1930) and/or a central cloud computing service (e.g., cloud 1944) for performing heavy computations or computationally burdensome tasks. On the other hand, edge cloud computing consolidates human-operated, voluntary resources, as a cloud. These voluntary resource may include, inter-alia, intermediate nodes 1920 and/or endpoints 1910, desktop PCs, tablets, smartphones, nano data centers, and the like. In various implementations, resources in the edge cloud may be in one to two-hop proximity to the IoT devices 1911, which may result in reducing overhead related to processing data and may reduce network delay.

Additionally or alternatively, the fog may be a consolidation of IoT devices 1911 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1944. The fog operating at the edge of the cloud 1944 may overlap or be subsumed into an edge network 1930 of the cloud 1944. The edge network of the cloud 1944 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1936 or edge devices). The Fog layer resides on top of the edge layer and is a consolidation of networking devices such as the intermediate nodes 1920 and/or endpoints 1910 of FIG. 19.

Data may be captured, stored/recorded, and communicated among the IoT devices 1911 or, for example, among the intermediate nodes 1920 and/or endpoints 1910 that have direct links 1905 with one another as shown by FIG. 19. Analysis of the traffic flow and control schemes may be implemented by aggregators that are in communication with the IoT devices 1911 and each other through a mesh network. The aggregators may be a type of IoT device 1911 and/or network appliance. In the example of FIG. 19, the aggregators may be edge nodes 1930, or one or more designated intermediate nodes 1920 and/or endpoints 1910.

Data may be uploaded to the cloud 1944 via the aggregator, and commands can be received from the cloud 1944 through gateway devices that are in communication with the IoT devices 1911 and the aggregators through the mesh network. Unlike the traditional cloud computing model, in some implementations, the cloud 1944 may have little or no computational capabilities and only serves as a repository for archiving data recorded and processed by the fog. In these implementations, the cloud 1944 centralized data storage system and provides reliability and access to data by the computing resources in the fog and/or edge devices. Being at the core of the architecture, the Data Store of the cloud 1944 is accessible by both Edge and Fog layers of the aforementioned edge-fog network.

As mentioned previously, the access networks provide network connectivity to the end-user devices 1920, 1910 via respective NANs 1930. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for [WiMAX] implementations.

Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1931, 1932. This virtualized framework allows the freed-up processor cores of the NANs 1931, 1932 to perform other virtualized applications, such as virtualized applications for various elements discussed herein.

The UEs 1910 may utilize respective connections (or channels) 1903*a*, each of which comprises a physical communications interface or layer. The connections 1903*a* are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1910 and the NANs 1930 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1910 and NANs 1930 may operate using LAA, enhanced LAA (eLAA), and/or further eLAA (feLAA) mechanisms. The UEs 1910 may further directly exchange communication data via respective direct links 1905, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, and/or the like; WiFi-direct; Bluetooth/Bluetooth Low Energy (BLE) protocols).

Additionally or alternatively, individual UEs 1910 provide radio information to one or more NANs 1930 and/or one or more edge compute nodes 1936 (e.g., edge servers/hosts, and/or the like). The radio information may be in the form of one or more measurement reports, and/or may include, for example, signal strength measurements, signal quality measurements, and/or the like. Each measurement report is tagged with a timestamp and the location of the measurement (e.g., the UEs 1910 current location). As examples, the measurements collected by the UEs 1910 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in [TS36214], [TS38215], 3GPP TS 38.314 v17.0.0 (2022 Apr. 13) ("[TS38314]"), [IEEE80211], and/or the like. Additionally or alternatively, any of the aforementioned measurements (or combination of measurements) may be collected by one or more NANs 1930 and provided to the edge compute node(s) 1936.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, and/or the like); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, and/or the like); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, and/or the like); measurements related to Registration Management (RM); measurements related to Session Management (SM) (e.g., number of PDU sessions requested to setup; number of PDU sessions successfully setup; number of PDU sessions failed to setup, and/or the like); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, and/or the like); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1910, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, and/or the like); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (LIM); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021-06-24) ("[TS28552]"), 3GPP TS 32.425 v17.1.0 (2021-06-24) ("[TS32425]"), and/or the like.

The radio information may be reported in response to a trigger event and/or on a periodic basis. Additionally or alternatively, individual UEs 1910 report radio information either at a low periodicity or a high periodicity depending on a data transfer that is to take place, and/or other information about the data transfer. Additionally or alternatively, the edge compute node(s) 1936 may request the measurements from the NANs 1930 at low or high periodicity, or the NANs 1930 may provide the measurements to the edge compute node(s) 1936 at low or high periodicity. Additionally or alternatively, the edge compute node(s) 1936 may obtain other relevant data from other edge compute node(s) 1936, core network functions (NFs), application functions (AFs), and/or other UEs 1910 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, and/or the like) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the examples discussed herein, any suitable data collection and/or measurement mechanism(s) may be used to collect the observation data. For example, data marking (e.g., sequence numbering, and/or the like), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, and/or the like). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., [MAMS]), IEEE/WiFi (e.g., [IEEE80211], [WiMAX], [IEEE16090], and/or the like), and/or any other like standards such as those discussed herein.

The UE 1912*b* is shown as being capable of accessing access point (AP) 1933 via a connection 1903*b*. In this example, the AP 1933 is shown to be connected to the Internet without connecting to the CN 1942 of the wireless system. The connection 1903*b* can comprise a local wireless connection, such as a connection consistent with any [IEEE802] protocol (e.g., [IEEE80211] and variants thereof), wherein the AP 1933 would comprise a WiFi router. Additionally or alternatively, the UEs 1910 can be configured to communicate using suitable communication signals with each other or with any of the AP 1933 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK);

Phase-Shift Keying (PSK) such as Binary PSK (BPSK), Quadrature PSK (QPSK), Differential PSK (DPSK), and/or the like; or Quadrature Amplitude Modulation (QAM) such as M-QAM; and/or the like.

The one or more NANs 1931 and 1932 that enable the connections 1903*a* may be referred to as "RAN nodes" or the like. The RAN nodes 1931, 1932 may comprise ground stations (e.g., terrestrial access points) or satellite stations providing coverage within a geographic area (e.g., a cell). The RAN nodes 1931, 1932 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1931 is embodied as a NodeB, evolved NodeB (eNB), or a next generation NodeB (gNB), and the RAN nodes 1932 are embodied as relay nodes, distributed units, or Road Side Unites (RSUs). Any other type of NANs can be used.

Any of the RAN nodes 1931, 1932 can terminate the air interface protocol and can be the first point of contact for the UEs 1912 and IoT devices 1911. Additionally or alternatively, any of the RAN nodes 1931, 1932 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, and/or the like. Additionally or alternatively, the UEs 1910 can be configured to communicate using OFDM communication signals with each other or with any of the NANs 1931, 1932 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 1931-1932 organize DL transmissions (e.g., from any of the RAN nodes 1931, 1932 to the UEs 1910) and UL transmissions (e.g., from the UEs 1910 to RAN nodes 1931, 1932) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1910 at each transmission time interval (TTI). A TTI is the duration of a transmission on a radio link 1903*a*, 1905, and is related to the size of the data blocks passed to the radio link layer from higher network layers.

The NANs 1931, 1932 may be configured to communicate with one another via respective interfaces or links (not shown), such as an X2 interface for LTE implementations (e.g., when CN 1942 is an Evolved Packet Core (EPC)), an Xn interface for 5G or NR implementations (e.g., when CN 1942 is an Fifth Generation Core (5GC)), or the like. The NANs 1931 and 1932 are also communicatively coupled to CN 1942. Additionally or alternatively, the CN 1942 may be an evolved packet core (EPC), a NextGen Packet Core (NPC), a 5G core (5GC), and/or some other type of CN. The CN 1942 is a network of network elements and/or network functions (NFs) relating to a part of a communications network that is independent of the connection technology used by a terminal or user device. The CN 1942 comprises a plurality of network elements/NFs configured to offer various data and telecommunications services to customers/subscribers (e.g., users of UEs 1912 and IoT devices 1911) who are connected to the CN 1942 via a RAN. The components of the CN 1942 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1942 may be referred to as a network slice, and a logical instantiation of a portion of the CN 1942 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1942 components/functions.

The CN 1942 is shown to be communicatively coupled to an application server 1950 and a network 1950 via an IP communications interface 1955, the one or more server(s) 1950 comprise one or more physical and/or virtualized systems for providing functionality (or services) to one or more clients (e.g., UEs 1912 and IoT devices 1911) over a network. The server(s) 1950 may include various computer devices with rack computing architecture component(s), tower computing architecture component(s), blade computing architecture component(s), and/or the like. The server(s) 1950 may represent a cluster of servers, a server farm, a cloud computing service, or other grouping or pool of servers, which may be located in one or more datacenters. The server(s) 1950 may also be connected to, or otherwise associated with one or more data storage devices (not shown). Moreover, the server(s) 1950 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1950 offer applications or services that use IP/network resources. As examples, the server(s) 1950 may provide traffic management services, cloud analytics, content streaming services, immersive gaming experiences, social networking and/or microblogging services, and/or other like services. In addition, the various services provided by the server(s) 1950 may include initiating and controlling software and/or firmware updates for applications or individual components implemented by the UEs 1912 and IoT devices 1911. The server(s) 1950 can also be configured to support one or more communication services (e.g., Voice-over-Internet Protocol (VoIP) sessions, PTT sessions, group communication sessions, social networking services, and/or the like) for the UEs 1912 and IoT devices 1911 via the CN 1942.

The Radio Access Technologies (RATs) employed by the NANs 1930, the UEs 1910, and the other elements in FIG. 19 may include, for example, any of the communication protocols and/or RATs discussed herein. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like). These RATs may include one or more V2X RATs, which allow these elements to communicate directly with one another, with infrastructure equipment (e.g., NANs 1930), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE Guide for Wireless Access in Vehicular Environments (WAVE) Architecture, IEEE Standards Association, IEEE 1609.0-2019 (10 Apr. 2019) ("[IEEE16090]"), V2X Communications Message Set Dictionary, SAE Int'l (23 Jul. 2020) ("[J2735_202007]"), Intelligent Transport Systems in the 5 GHz frequency band (ITS-G5), the [IEEE80211p] (which is the layer 1 (L1) and layer 2 (L2) part of WAVE, DSRC, and ITS-G5), and/or IEEE Standard for Air Interface for Broadband Wireless Access Systems, IEEE Std802.16-2017, pp. 1-2726 (2 Mar. 2018) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 1944 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1944 include application capabilities type, infrastructure capabilities type, and platform capabilities type. A cloud capabilities type is a classification of the functionality provided by a cloud service to a cloud service customer (e.g., a user of cloud 1944), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1944 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1944 may represent one or more cloud servers, application servers, web servers, and/or some other remote infrastructure. The remote/cloud servers may include any one of a number of services and capabilities such as, for example, any of those discussed herein. Additionally or alternatively, the cloud 1944 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1944 may be a network that comprises computers, network connections among the computers, and software routines to enable communication between the computers over network connections. In this regard, the cloud 1944 comprises one or more network elements that may include one or more processors, communications systems (e.g., including network interface controllers, one or more transmitters/receivers connected to one or more antennas, and/or the like), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1944 may be via a wired or a wireless connection using the various communication protocols discussed infra. More than one network may be involved in a communication session between the illustrated devices. Connection to the cloud 1944 may require that the computers execute software routines which enable, for example, the seven layers of the OSI model of computer networking or equivalent in a wireless (cellular) phone network. Cloud 1944 may be used to enable relatively long-range communication such as, for example, between the one or more server(s) 1950 and one or more UEs 1910. Additionally or alternatively, the cloud 1944 may represent the Internet, one or more cellular networks, local area networks, or wide area networks including proprietary and/or enterprise networks, TCP/Internet Protocol (IP)-based network, or combinations thereof. In these implementations, the cloud 1944 may be associated with network operator who owns or controls equipment and other elements necessary to provide network-related services, such as one or more base stations or access points, one or more servers for routing digital data or telephone calls (e.g., a core network or backbone network), and/or the like. The backbone links 1955 may include any number of wired or wireless technologies, and may be part of a LAN, a WAN, or the Internet. In one example, the backbone links 1955 are fiber backbone links that couple lower levels of service providers to the Internet, such as the CN 1912 and cloud 1944.

As shown by FIG. 19, each of the NANs 1931, 1932, and 1933 are co-located with edge compute nodes (or "edge servers") 1936*a*, 1936*b*, and 1936*c*, respectively. These implementations may be small-cell clouds (SCCs) where an edge compute node 1936 is co-located with a small cell (e.g., pico-cell, femto-cell, and/or the like), or may be mobile micro clouds (MCCs) where an edge compute node 1936 is co-located with a macro-cell (e.g., an eNB, gNB, and/or the like). The edge compute node 1936 may be deployed in a multitude of arrangements other than as shown by FIG. 19. In a first example, multiple NANs 1930 are co-located or otherwise communicatively coupled with one edge compute node 1936. In a second example, the edge servers 1936 may be co-located or operated by RNCs, which may be the case for legacy network deployments, such as 3G networks. In a third example, the edge servers 1936 may be deployed at cell aggregation sites or at multi-RAT aggregation points that can be located either within an enterprise or used in public coverage areas. In a fourth example, the edge servers 1936 may be deployed at the edge of CN 1942. These implementations may be used in follow-me clouds (FMC), where cloud services running at distributed data centers follow the UEs 1910 as they roam throughout the network.

In any of the implementations discussed herein, the edge servers 1936 provide a distributed computing environment for application and service hosting, and also provide storage and processing resources so that data and/or content can be processed in close proximity to subscribers (e.g., users of UEs 1910) for faster response times The edge servers 1936 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1936 from the UEs 1910, CN 1942, cloud 1944, and/or server(s) 1950, or vice versa. For example, a device application or client application operating in a UE 1910 may offload application tasks or workloads to one or more edge servers 1936. In another example, an edge server 1936 may offload application tasks or workloads to one or more UE 1910 (e.g., for distributed ML computation or the like).

The edge compute nodes 1936 may include or be part of an edge system 1935 that employs one or more ECTs 1935. The edge compute nodes 1936 may also be referred to as "edge hosts 1936" or "edge servers 1936." The edge system 1935 includes a collection of edge servers 1936 and edge management systems (not shown by FIG. 19) necessary to run edge computing applications within an operator network or a subset of an operator network. The edge servers 1936 are physical computer systems that may include an edge platform and/or virtualization infrastructure, and provide compute, storage, and network resources to edge computing applications. Each of the edge servers 1936 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 1910. The VI of the edge servers 1936 provide virtualized environments and virtualized resources for the edge hosts, and the edge computing applications may run as VMs and/or application containers on top of the VI.

In one example implementation, the ECT 1935 operates according to the MEC framework, as discussed in ETSI GS MEC 003 V3.1.1 (2022 March), ETSI GS MEC 009 V3.1.1 (2021 June), ETSI GS MEC 010-1 v1.1.1 (2017 October), ETSI GS MEC 010-2 v2.2.1 (2022 February), ETSI GS MEC 011 v2.2.1 (2020 December), ETSI GS MEC 012 V2.2.1 (2022 February), ETSI GS MEC 013 v2.2.1 (2022 January), ETSI GS MEC 014 V1.1.1 (2021 February), ETSI GS MEC 015 v2.1.1 (2020 June), ETSI GS MEC 016 v2.2.1 (2020 April), ETSI GS MEC 021 v2.2.1 (2022 February), ETSI GS MEC 028 v2.2.1 (2021 July), ETSI GS MEC 029 v2.2.1 (2022 January), ETSI MEC GS 030 v2.2.1 (2022 May), ETSI GS NFV-MAN 001 v1.1.1 (2014 December), U.S. Provisional App. No. 63/003,834 filed Apr. 1, 2020 ("['834]"), and Int'l App. No. PCT/US2020/066969 filed on Dec. 23, 2020 ("['969]") (collectively referred to herein as "[MEC]"), the contents of each of which are hereby incorporated by reference in their entireties.

In another example implementation, the ECT 1935 operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and inter-operability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v06.00, 0-RAN ALLIANCE WG1 (March 2022); *O-RAN Operations and Maintenance Architecture Specification* v04.00, O-RAN ALLIANCE WG1 (February 2021); *O-RAN Operations and Maintenance Interface Specification* v04.00, O-RAN ALLIANCE WG1 (February 2021); *O-RAN Information Model and Data Models Specification* v01.00, O-RAN ALLIANCE WG1 (February 2021); *O-RAN Working Group* 1 *Slicing Architecture* v06.00, O-RAN ALLIANCE WG1 (March 2022); *O-RAN Working Group* 2 (*Non-RT RIC and AI interface WG*) *AI interface: Application Protocol* v03.01, O-RAN ALLIANCE WG2 (June 2021); *O-RAN Working Group* 2 (*Non-RT RIC and AI interface WG*) *AI interface: Type Definitions* v02.03, O-RAN ALLIANCE WG2 (October 2021); *O-RAN Working Group* 2 (*Non-RTRIC an dAI interface WG*) *AI interface: Transport Protocol* v01.01, O-RAN ALLIANCE WG2 (June 2021); *O-RAN Working Group 2AI/ML workflow description and requirements* v01.03 O-RAN ALLIANCE WG2 (October 2021); *O-RAN Working Group 2 Non-RT RIC Architecture* v01.00 O-RAN ALLIANCE WG2 (October 2021); *O-RAN Working Group 2 Non-RT RIC: Functional Architecture* v01.01, O-RAN ALLIANCE WG2 (July 2021); *O-RAN Working Group* 2 (*Non-RT RIC and AI interface WG*): *RI interface: General Aspects and Principles* v01.00, O-RAN ALLIANCE WG2 (March 2022); *O-RAN Working Group* 3 *Near-Real-time Intelligent Controller Architecture & E2 General Aspects and Principles* v02.01, O-RAN ALLIANCE WG3 (March 2022); *O-RAN Working Group* 3 *Near-Real-time Intelligent Controller E2 Service Model* (*E2SM*) *v*02.01, O-RAN ALLIANCE WG3 (March 2022); *O-RAN Working Group* 3 *Near-Real-time Intelligent Controller E2 Service Model* (*E2SM*) *RAN Function Network Interface* (*NI*) v01.00, O-RAN ALLIANCE WG3 (February 2020); *O-RAN Working Group* 3 *Near-Real-time Intelligent Controller E2 Service Model* (*E2SM*) *KPM* v02.01, O-RAN ALLIANCE WG3 (March 2022); *O-RAN Working Group* 3 *Near-Real-time Intelligent Controller E2 Service Model* (*E2SM*) *RAN Control* v01.01, O-RAN ALLIANCE WG3 (March 2022); *O-RAN Working Group* 3, *Near-Real-time Intelligent Controller, E2 Application Protocol* (*E2AP*) *v*02.01, O-RAN ALLIANCE WG3 (March 2022); *O-RAN Working Group* 3 *Near-Real-time Intelligent Controller Near-RT RIC Architecture* v02.01, O-RAN ALLIANCE WG3 (March 2022); *O-RAN Working Group* 4 (*Open Fronthaul Interfaces WG*) *Control, User and Synchronization Plane Specification* v08.01, O-RAN ALLIANCE WG4 (May 2022); and *O-RAN Working Group* 4 (*Open Fronthaul Interfaces WG*) *Control, User and Synchronization Plane Specification* v07.02, O-RAN ALLIANCE WG4 (May 2022); *O-RAN Fronthaul Working Group* 4 *Cooperative Transport Interface Transport Control Plane Specification* v02.00, O-RAN ALLIANCE WG4 (June 2021); *O-RAN Fronthaul Working Group* 4 *Cooperative Transport Interface Transport Management Plane Specification* v02.00, O-RAN ALLIANCE WG4 (June 2021); *O-RAN Fronthaul Working Group* 4 *Management Plane Specification* v08.00, O-RAN ALLIANCE WG4 (March 2022); *O-RAN Fronthaul Working Group* 4 *Management Plane Specification* v07.01, O-RAN ALLIANCE WG4 (April 2022); *O-RAN Alliance Working Group* 5 *O1 Interface specification for O-DU v*03.00, O-RAN ALLIANCE WG5 (March 2022); *O-RAN Open F1/W1/E1/X2/Xn Interfaces Working Group Transport Specification* v01.00, O-RAN ALLIANCE WG5 (April 2020); *Cloud Architecture and Deployment Scenarios for O-RAN Virtualized RAN* v02.02, O-RAN ALLIANCE WG6 (October 2021); *Cloud Platform Reference Designs* v02.00, O-RAN ALLIANCE WG6 (February 2021); *O-RAN O2 Interface General Aspects and Principles* v01.02, O-RAN ALLIANCE WG6 (March 2022); *O-RAN Acceleration Abstraction Layer General Aspects and Principles* v02.00, O-RAN ALLIANCE WG6 (March 2022); *O-RAN White Box Hardware Working Group Hardware Reference Design Specification for Indoor Pico Cell with Fronthaul Split Option* 6 v02.00, O-RAN ALLIANCE WG7 (October 2021); *O-RAN WG7 Hardware Reference Design Specification for Indoor Picocell* (*FR*1) *with Split Option* 7-2 v03.00, O-RAN ALLIANCE WG7 (October 2021); *O-RAN White Box Hardware Working Group Hardware Reference Design Specification for Outdoor Micro Cell with Split Architecture Option* 7.2 v02.00, O-RAN ALLIANCE WG7 (October 2021); *O-RAN WG7 Hardware Reference Design Specification for Indoor Picocell* (*FR*1) *with Split Option* 8 v03.00, O-RAN ALLIANCE WG7 (October 2021); *O-RAN Open X-haul Transport Working Group Management interfaces for Transport Network Elements* v03.00, O-RAN ALLIANCE WG9 (March 2022); *O-RAN Open X-haul Transport Working Group Synchronization Architecture and Solution Specification*, O-RAN ALLIANCE WG9 (March 2022); *O-RAN Open Xhaul Transport WG9 WDM-based Fronthaul Transport*, O-RAN ALLIANCE WG9 (March 2022); *O-RAN Open Transport Working Group* 9 *Xhaul Packet Switched Architectures and Solutions* v02.00, O-RAN ALLIANCE WG9 (October 2021); *O-RAN Operations and Maintenance Architecture* v06.00, O-RAN ALLIANCE WG10 (March 2022); *O-RAN Operations and Maintenance Interface Specification* v06.00, O-RAN ALLIANCE WG10 (March 2022); *O-RAN: Towards an Open and Smart RAN*, O-RAN ALLIANCE, White Paper (October 2018); and U.S. application Ser. No. 17/484,743 filed on 24 Sep. 2021 (collectively referred to as "[O-RAN]") the contents of each of which are hereby incorporated by reference in their entireties.

In another example implementation, the ECT 1935 operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.4.0 (2022-06-13) ("[TS23558]"), 3GPP TS 23.501 v17.5.0 (2022-06-15) ("[TS23501]"), and U.S. application Ser. No. 17/484,719 filed on 24 Sep. 2021 ("['719]") (collectively referred to as "[SA6Edge]"), the contents of each of which is hereby incorporated by reference in their entireties.

In another example implementation, the ECT 1935 operates according to the Intel® Smart Edge Open framework (formerly known as OpenNESS) as discussed in Intel® Smart Edge Open Developer Guide, version 21.09 (30 Sep. 2021), available at: <https://smart-edge-open.github.io/>("[ISEO]"), the contents of which are hereby incorporated by reference in its entirety.

In another example implementation, the ECT 1935 operates according to the Multi-Access Management Services (MAMS) framework as discussed in [RFC8743], Ford et al., *TCP Extensions for Multipath Operation with Multiple Addresses*, IETF RFC 8684, (March 2020), De Coninck et al., *Multipath Extensions for QUIC* (*MP-QUIC*), IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTOCOL-09, IETA, INTAREA (4 Mar. 2020), and Zhu et al., *Generic Multi-Access* (*GMA*) *Convergence Encapsulation Protocols*, IETF RFC 9188 (February 2022) (collectively referred to as "[MAMS]"), the contents of each of which are hereby incorporated by reference in their entireties. In these implementations, an edge compute node 1935 and/or one or more cloud computing nodes/clusters may be one or more MAMS servers that includes or operates a Network Connection Manager (NCM) for downstream/DL traffic, and the individual UEs 1910 include or operate a Client Connection Manager (CCM) for upstream/UL traffic. An NCM is a functional entity that handles MAMS control messages from clients (e.g., individual UEs 1910 configures the distribution of data packets over available access paths and (core) network paths, and manages user-plane treatment (e.g., tunneling, encryption, and/or the like) of the traffic flows (see e.g., [RFC8743], [MAMS]). The CCM is the peer functional element in a client (e.g., individual UEs 1910 that handles MAMS control-plane procedures, exchanges MAMS signaling messages with the NCM, and configures the network paths at the client for the transport of user data (e.g., network packets, and/or the like) (see e.g., [RFC8743], [MAMS]).

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

An example edge computing configuration includes a layer of processing referred to as an "edge cloud". The edge cloud is co-located at an edge location, such as a NAN 1931-1933, a local processing hub, or a central office, and thus may include multiple entities, devices, and equipment instances. The edge cloud is located much closer to the endpoint (consumer and producer) data sources (e.g., node 1910, 1920 including autonomous vehicles, business and industrial equipment, video capture devices, drones, smart cities and building devices, sensors and IoT devices, and/or the like) than a cloud data center (e.g., cloud 1944, server(s) 1950, and/or the like). Compute, memory, and storage resources which are offered at the edges in the edge cloud are critical to providing ultra-low latency response times for services and functions used by the endpoint data sources as well as reduce network backhaul traffic from the edge cloud toward cloud data center, thus, improving energy consumption and overall network usages among other benefits. In some examples, any of the data sources, edge cloud entities/elements, central office, and/or cloud/data center elements may be individual nodes in an multi-access (e.g., MAMS) network.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources. Aspects of an edge cloud architecture covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

As such, the edge cloud is formed from network components and functional features operated by and within edge gateway nodes, edge aggregation nodes, or other edge compute nodes among various network layers. The edge cloud, thus, may be embodied as any type of network that provides edge computing and/or storage resources which are proximately located to radio access network (RAN) capable endpoint devices (e.g., mobile computing devices, IoT devices, smart devices, and/or the like), which are discussed herein. In other words, the edge cloud may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, and/or the like), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud may be servers, multi-tenant servers, appliance computing devices, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, and/or the like) and/or racks (e.g., server racks, blade mounts, and/or the like). Example housings and/or surfaces thereof may support one or more sensors (e.g., temperature sensors, vibration sensors, light sensors, acoustic sensors, capacitive sensors, proximity sensors, and/or the like). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, and/or the like) and/or articulating hardware (e.g., robot arms, pivotable appendages, and/or the like). In some circumstances, the sensors may include any type of input devices such as user interface hardware (e.g., buttons, switches, dials, sliders, and/or the like). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 21. The edge cloud may also include one or more servers and/or one or more multi-tenant servers. Such a server may include an operating system and implement a virtual computing environment. A virtual computing environment may include a hypervisor managing (e.g., spawning, deploying, destroying, and/or the like) one or more virtual machines, one or more containers, etc. Such virtual computing environments provide an execution environment in which one or more applications and/or other software, code or scripts may execute while being isolated from one or more other applications, software, code or scripts.

Figure 20:
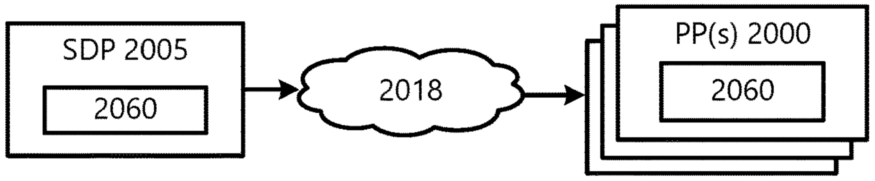
FIG. 20 illustrates an example software distribution platform.
Figure 21:
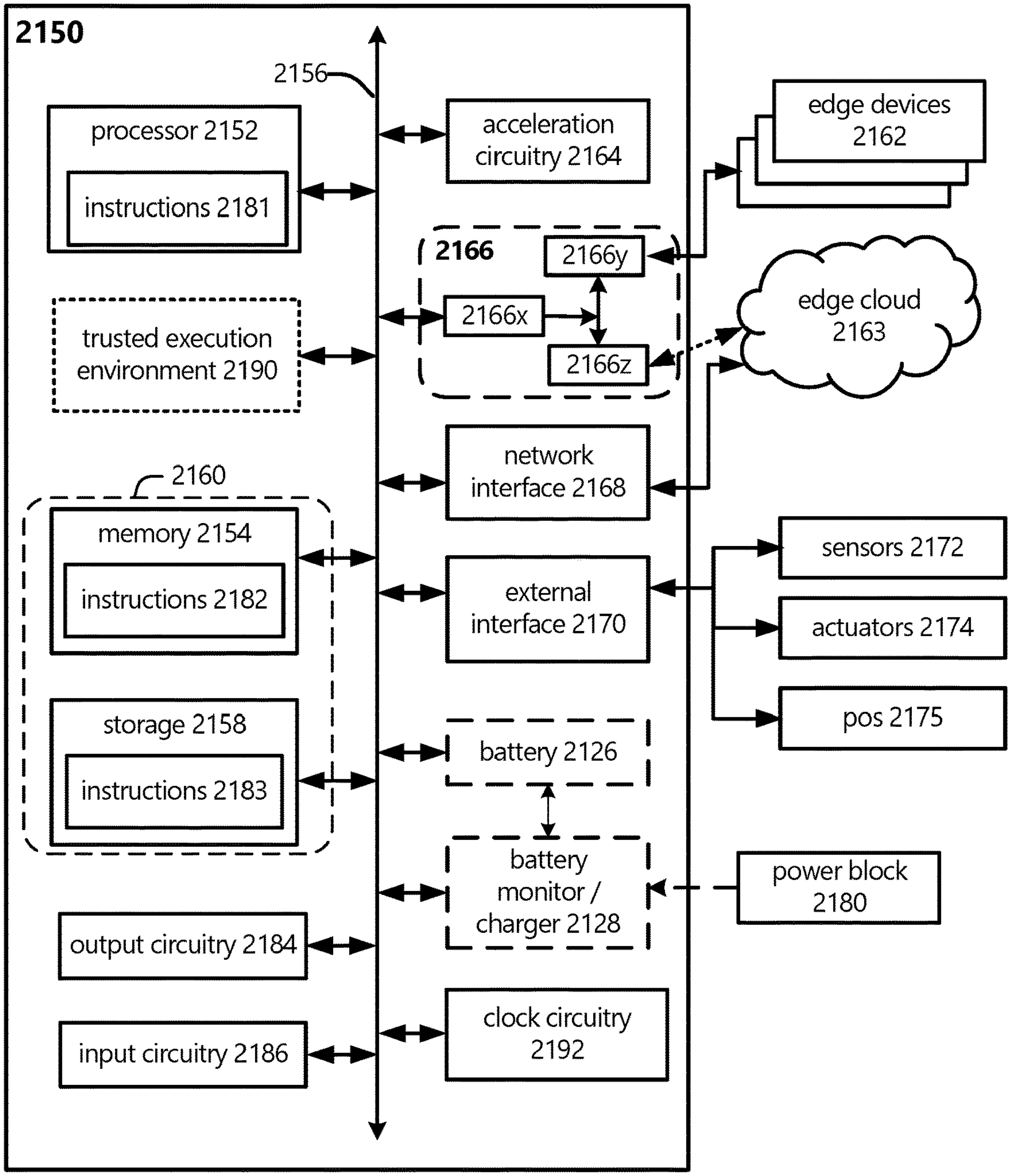
FIG. 21 depicts example components a compute node.

FIG. 20 illustrates an example software distribution platform 2005 to distribute software 2060, such as the example computer readable instructions 2160 of FIG. 21, to one or more devices, such as example processor platform(s) 2000 and/or example connected edge devices 2162 (see e.g., FIG. 21) and/or any of the other computing systems/devices discussed herein. The example software distribution platform 2005 may be implemented by any computer server, data facility, cloud service, and/or the like, capable of storing and transmitting software to other computing devices (e.g., third parties, the example connected edge devices 2162 of FIG. 21). Example connected edge devices may be customers, clients, managing devices (e.g., servers), third parties (e.g., customers of an entity owning and/or operating the software distribution platform 2005). Example connected edge devices may operate in commercial and/or home automation environments. In some examples, a third party is a developer, a seller, and/or a licensor of software such as the example computer readable instructions 2160 of FIG. 21. The third parties may be consumers, users, retailers, OEMs, and/or the like that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), and/or the like).

In the example of FIG. 20, the software distribution platform 2005 includes one or more servers and one or more storage devices. The storage devices store the computer readable instructions 2060, which may correspond to the example computer readable instructions 2160 of FIG. 21, as described above. The one or more servers of the example software distribution platform 2005 are in communication with a network 2010, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2060 from the software distribution platform 2005. For example, the software 2060, which may correspond to the example computer readable instructions 2160 of FIG. 21, may be downloaded to the example processor platform(s) 2000, which is/are to execute the computer readable instructions 2060 to implement the various implementations discussed herein. In some examples, one or more servers of the software distribution platform 2005 are communicatively connected to one or more security domains and/or security devices through which requests and transmissions of the example computer readable instructions 2060 must pass. In some examples, one or more servers of the software distribution platform 2005 periodically offer, transmit, and/or force updates to the software (e.g., the example computer readable instructions 2160 of FIG. 21) to ensure improvements, patches, updates, and/or the like are distributed and applied to the software at the end user devices.

The computer readable instructions 2060 are stored on storage devices of the software distribution platform 2005 in a particular format. A format of computer readable instructions includes, but is not limited to a particular code language (e.g., Java, JavaScript, Python, C, C #, SQL, HTML, and/or the like), and/or a particular code state (e.g., uncompiled code (e.g., ASCII), interpreted code, linked code, executable code (e.g., a binary), and/or the like). In some examples, the computer readable instructions 2181, 2182, 2183 stored in the software distribution platform 2005 are in a first format when transmitted to the example processor platform(s) 2000. In some examples, the first format is an executable binary in which particular types of the processor platform(s) 2000 can execute. However, in some examples, the first format is uncompiled code that requires one or more preparation tasks to transform the first format to a second format to enable execution on the example processor platform(s) 2000. For instance, the receiving processor platform(s) 2000 may need to compile the computer readable instructions 2060 in the first format to generate executable code in a second format that is capable of being executed on the processor platform(s) 2000. In still other examples, the first format is interpreted code that, upon reaching the processor platform(s) 2000, is interpreted by an interpreter to facilitate execution of instructions.

FIG. 21 illustrates an example of components that may be present in an compute node 2150 for implementing the techniques (e.g., operations, processes, methods, and methodologies) described herein. This compute node 2150 provides a closer view of the respective components of node 2150 when implemented as or as part of a computing device (e.g., as a mobile device, a base station, server, gateway, and/or the like). The compute node 2150 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 2150, or as components otherwise incorporated within a chassis of a larger system. In some examples, the compute node 2150 may correspond to an MX peer device (e.g., MX client 101 and/or MX server 140) of FIGS. 1-18; GMA peer devices (e.g., Gc 1301 and Gs 1340 of FIGS. 13-18); any of the devices discussed previously with respect to FIG. 19; software distribution platform 2005 and/or processor platform(s) 2000 of FIG. 20; and/or any other component, device, and/or system discussed herein. The compute node 2150 may be embodied as a type of device, appliance, computer, or other "thing" capable of communicating with other edge, networking, or endpoint components. For example, compute node 2150 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 2150 includes processing circuitry in the form of one or more processors 2152. The processor circuitry 2152 includes circuitry such as, for example, one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2152 may include one or more hardware accelerators (e.g., same or similar to acceleration circuitry 2164), which may be microprocessors, programmable processing devices (e.g., FPGA, ASIC, and/or the like), or the like. The one or more accelerators may include, for example, computer vision and/or deep learning accelerators. In some implementations, the processor circuitry 2152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein. The processor circuitry 2152 includes a microarchitecture that is capable of executing the penclave implementations and techniques discussed herein. The processors (or cores) 2152 may be coupled with or may include memory/storage and may be configured to execute instructions stored in the memory/storage to enable various applications or OSs to run on the platform 2150. The processors (or cores) 2152 is configured to operate application software to provide a specific service to a user of the platform 2150. Additionally or alternatively, the processor(s) 2152 may be a special-purpose processor(s)/controller(s) configured (or configurable) to operate according to the elements, features, and implementations discussed herein.

The processor circuitry 2152 may be or include, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multithreaded processor, ultra-low voltage processor, embedded processor, an XPU, a data processing unit (DPU), an Infrastructure Processing Unit (IPU), a network processing unit (NPU), and/or any other known processing elements, or any suitable combination thereof.

As examples, the processor(s) 2152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, EpycR processor(s), or the like; A5-A12 and/or S1-S4 processor(s) from Apple® Inc., Snapdragon™ or Centriq™ processor(s) from QualcommR Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2152 may be a part of a system on a chip (SoC), System-in-Package (SiP), a multi-chip package (MCP), and/or the like, in which the processor(s) 2152 and other components are formed into a single integrated circuit, or a single package, such as the Edison™ or Galileo™ SoC boards from Intel® Corporation. Other examples of the processor(s) 2152 are mentioned elsewhere in the present disclosure.

The processor(s) 2152 may communicate with system memory 2154 over an interconnect (IX) 2156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Additionally or alternatively, the memory circuitry 2154 is or includes block addressable memory device(s), such as those based on NAND or NOR technologies (e.g., single-level cell ("SLC"), Multi-Level Cell ("MLC"), Quad-Level Cell ("QLC"), Tri-Level Cell ("TLC"), or some other NAND).

To provide for persistent storage of information such as data, applications, OSs and so forth, a storage 2158 may also couple to the processor 2152 via the IX 2156. In an example, the storage 2158 may be implemented via a solid-state disk drive (SSDD) and/or high-speed electrically erasable memory (commonly referred to as "flash memory"). Other devices that may be used for the storage 2158 include flash memory cards, such as SD cards, microSD cards, eXtreme Digital (XD) picture cards, and the like, and USB flash drives. Additionally or alternatively, the memory circuitry 2154 and/or storage circuitry 2158 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 2154 and/or storage circuitry 2158 can include resistor-based and/or transistor-less memory architectures. The memory circuitry 2154 and/or storage circuitry 2158 may also incorporate three-dimensional (3D) cross-point (XPOINT) memory devices (e.g., Intel® 3D XPoint™ memory), and/or other byte addressable write-in-place NVM. The memory circuitry 2154 and/or storage circuitry 2158 may refer to the die itself and/or to a packaged memory product.

In low power implementations, the storage 2158 may be on-die memory or registers associated with the processor 2152. However, in some examples, the storage 2158 may be implemented using a micro hard disk drive (HDD). Further, any number of new technologies may be used for the storage 2158 in addition to, or instead of, the technologies described, such resistance change memories, phase change memories, holographic memories, or chemical memories, among others.

Computer program code for carrying out operations of the present disclosure (e.g., computational logic and/or instructions 2181, 2182, 2183) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 2181, 2182, 2183 for carrying out operations of the present disclosure may also be written in any combination of the programming languages discussed herein. The program code may execute entirely on the system 2150, partly on the system 2150, as a stand-alone software package, partly on the system 2150 and partly on a remote computer or entirely on the remote computer or server. In the latter scenario, the remote computer may be connected to the system 2150 through any type of network, including a LAN or WAN, or the connection may be made to an external computer (e.g., through the Internet using an Internet Service Provider (ISP)).

In an example, the instructions 2181, 2182, 2183 on the processor circuitry 2152 (separately, or in combination with the instructions 2181, 2182, 2183) may configure execution or operation of a trusted execution environment (TEE) 2190. The TEE 2190 operates as a protected area accessible to the processor circuitry 2102 to enable secure access to data and secure execution of instructions. In some examples, the TEE 2190 may be a physical hardware device that is separate from other components of the system 2150 such as a secure-embedded controller, a dedicated SoC, or a tamper-resistant chipset or microcontroller with embedded processing devices and memory devices. Examples include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 2190 may be implemented as secure enclaves (or "enclaves"), which are isolated regions of code and/or data within the processor and/or memory/storage circuitry of the compute node 2150. Only code executed within a secure enclave may access data within the same secure enclave, and the secure enclave may only be accessible using the secure application (which may be implemented by an application processor or a tamper-resistant microcontroller). Various implementations of the TEE 2190, and an accompanying secure area in the processor circuitry 2152 or the memory circuitry 2154 and/or storage circuitry 2158 may be provided, for instance, through use of Intel® Software Guard Extensions (SGX), ARM® TrustZone®, Keystone Enclaves, Open Enclave SDK, and/or the like. Other aspects of security hardening, hardware roots-of-trust, and trusted or protected operations may be implemented in the device 2100 through the TEE 2190 and the processor circuitry 2152. Additionally or alternatively, the memory circuitry 2154 and/or storage circuitry 2158 may be divided into isolated user-space instances such as virtualization/OS containers, partitions, virtual environments (VEs), and/or the like. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some examples, the memory circuitry 2104 and/or storage circuitry 2108 may be divided into one or more trusted memory regions for storing applications or software modules of the TEE 2190.

The OS stored by the memory circuitry 2154 and/or storage circuitry 2158 is software to control the compute node 2150. The OS may include one or more drivers that operate to control particular devices that are embedded in the compute node 2150, attached to the compute node 2150, and/or otherwise communicatively coupled with the compute node 2150. Example OSs include consumer-based operating systems (e.g., Microsoft® Windows® 10, Google® Android®, Apple® macOS®, Apple® iOS®, KaiOS™ provided by KaiOS Technologies Inc., Umx or a Umx-like OS such as Linux, Ubuntu, or the like), industry-focused OSs such as real-time OS (RTOS) (e.g., Apache® Mynewt, Windows® IoT®, Android Things®, Micrium® Micro-Controller OSs ("MicroC/OS" or "pC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 2150 may be the same or different than a second OS on a second compute node 2150. For instance, the first OS may be an RTOS having particular performance expectations of responsivity to dynamic input conditions, and the second OS can include GUI capabilities to facilitate end-user I/O and the like.

The storage 2158 may include instructions 2183 in the form of software, firmware, or hardware commands to implement the techniques described herein. Although such instructions 2183 are shown as code blocks included in the memory 2154 and the storage 2158, any of the code blocks may be replaced with hardwired circuits, for example, built into an application specific integrated circuit (ASIC), FPGA memory blocks, and/or the like. In an example, the instructions 2181, 2182, 2183 provided via the memory 2154, the storage 2158, or the processor 2152 may be embodied as a non-transitory, machine-readable medium 2160 including code to direct the processor 2152 to perform electronic operations in the compute node 2150. The processor 2152 may access the non-transitory, machine-readable medium 2160 (also referred to as "computer readable medium 2160" or "CRM 2160") over the IX 2156. For instance, the non-transitory, CRM 2160 may be embodied by devices described for the storage 2158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, CRM 2160 may include instructions to direct the processor 2152 to perform a specific sequence or flow of actions, for example, as described with respect to the flowchart(s) and/or block diagram(s) of operations and functionality depicted herein.

The compute node 2150 also includes clock circuitry 2192, which is a device (or collection of devices) that tracks the passage of time. In some implementations, the clock circuitry 2192 may be an atomic clock and/or a clock generator (electronic oscillator and/or timing-signal generator). In clock generator implementations, the clock circuitry 2192 may include resonant circuitry (e.g., crystal oscillator or the like) and amplifier circuitry to invert the signal from the resonant circuitry and feed a portion back into the resonant circuitry to maintain oscillation.

The crystal oscillator includes a piezoelectric resonator such as quartz, polycrystalline ceramics, thin-film resonators, and/or the like. Where crystal units are used, the clock circuitry 2192 may also include an oscillation circuit separate from the crystal clock. Where crystal oscillators are used, the crystal unit and oscillation circuit may be integrated into a single package or integrated circuit. Examples of such clock circuitry 2192 include crystal clocks (Y), crystal oscillators (XOs), calibrated dual XO (CDXO), microcomputer-compensated crystal oscillator (MCXO), oven controlled XOs (OCXOs), double OCXOs (DOCXOs), temperature-compensated crystal oscillator crystal oscillators (TCXOs), tactical miniature crystal oscillator (TMXO), temperature-sensing crystal oscillator (TSXO), voltage controlled XOs (VCXOs), and/or other suitable clocks and/or variants and/or combinations thereof. Any of the aforementioned crystal clocks and/or XOs may be formed from a suitable material such as quartz, rubidium (e.g., rubidium crystal oscillators (RbXO)), cesium (e.g., cesium beam atomic clocks), and/or other suitable materials and/or variants and/or combinations thereof.

The clock circuitry 2192 is configured to create a signal with a relatively precise frequency, which may be used by other components such as for example, keeping track of time, providing a clock signal for digital circuits, stabilizing frequencies for transmitters and receivers, and/or the like. In some implementations, the clock circuitry 2192 may be a stand-alone component (e.g., separate from the other components of compute node 2150), or may be part of another component (e.g., processor circuitry 2152 positioning circuitry 2175, and/or the like). Additionally or alternatively, the clock circuitry 2192 can be synchronized with a synchronization source. In one example, a timing indicated by GNSS signals (e.g., as provided by positioning circuitry 2175) can be used as a synchronization source in deployment scenarios where global synchronization is desired. Additionally or alternatively, a network time (or timing) can be used as a synchronization source in deployment scenarios where network-based synchronization is desired. Additionally or alternatively, a longwave radio clock or radio-controlled clock may be used as a synchronization source, where a dedicated terrestrial longwave radio transmitter connected to a time standard (e.g., an atomic clock) transmits a time code that is demodulated and decoded to determine the current time. Additionally or alternatively, a GM instance may be used as a synchronization source as described previously. Any combination of the previous synchronization sources may be used. Additionally or alternatively, any of the aforementioned synchronization sources as a primary synchronization source, and another one or more of the aforementioned synchronization sources can be used as secondary or fallback synchronization sources that is/are used when the primary synchronization source is unavailable. Additionally or alternatively, the clock circuitry 2192 may be configured with priority information for different synchronization sources, where each a highest priority synchronization source is used when available. The synchronization configuration may be signaled to, and provisioned in, the clock circuitry 2192 (via the communication circuitry).

The components of edge computing device 2150 may communicate over an interconnect (IX) 2156. The IX 2156 may represent any suitable type of connection or interface such as, for example, metal or metal alloys (e.g., copper, aluminum, and/or the like), fiber, and/or the like. The IX 2156 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, HyperTransport IXs, NVLink provided by NVIDIA®, a Time-Trigger Protocol (TTP) system, a FlexRay system, PROFIBUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 2156 may be a proprietary bus, for example, used in a SoC based system.

The IX 2156 couples the processor 2152 to communication circuitry 2166 for communications with other devices, such as a remote server (not shown) and/or the connected edge devices 2162. The communication circuitry 2166 is a hardware element, or collection of hardware elements, used to communicate over one or more networks (e.g., cloud 2163) and/or with other devices (e.g., edge devices 2162). Communication circuitry 2166 includes modem circuitry 2166*x* may interface with application circuitry of compute node 2150 (e.g., a combination of processor circuitry 2102 and CRM 2160) for generation and processing of baseband signals and for controlling operations of the transceivers (TRx) 2166*y* and 2166*z*. The modem circuitry 2166*x* may handle various radio control functions that enable communication with one or more (R)ANs via the TRxs 2166*y* and 2166*z* according to one or more wireless communication protocols and/or RATs. The modem circuitry 2166*x* may include circuitry such as, but not limited to, one or more single-core or multi-core processors (e.g., one or more baseband processors) or control logic to process baseband signals received from a receive signal path of the TRxs 2166*y*, 2166*z*, and to generate baseband signals to be provided to the TRxs 2166*y*, 2166*z* via a transmit signal path. The modem circuitry 2166*x* may implement a real-time OS (RTOS) to manage resources of the modem circuitry 2166*x*, schedule tasks, perform the various radio control functions, process the transmit/receive signal paths, and the like. In some implementations, the modem circuitry 2166*x* includes a μarch that is capable of executing the μenclave implementations and techniques discussed herein.

The TRx 2166*y* may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2162. For example, a wireless local area network (WLAN) unit may be used to implement Wi-Fi® communications in accordance with a [IEEE802] standard (e.g., [IEEE80211] and/or the like). In addition, wireless wide area communications, e.g., according to a cellular or other wireless wide area protocol, may occur via a wireless wide area network (WWAN) unit.

The TRx 2166*y* (or multiple transceivers 2166*y*) may communicate using multiple standards or radios for communications at a different range. For example, the compute node 2150 may communicate with relatively close devices (e.g., within about 10 meters) using a local transceiver based on BLE, or another low power radio, to save power. More distant connected edge devices 2162 (e.g., within about 50 meters) may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 2166*z* (e.g., a radio transceiver) may be included to communicate with devices or services in the edge cloud 2163 via local or wide area network protocols. The TRx 2166*z* may be an LPWA transceiver that follows [IEEE802154] or IEEE 802.15.4g standards, among others. The edge computing node 2163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 2166*z*, as described herein. For example, the TRx 2166*z* may include a cellular transceiver that uses spread spectrum (SPA/SAS) communications for implementing high-speed communications. Further, any number of other protocols may be used, such as WiFi® networks for medium speed communications and provision of network communications. The TRx 2166*z* may include radios that are compatible with any number of 3GPP specifications, such as LTE and 5G/NR communication systems.

A network interface controller (NIC) 2168 may be included to provide a wired communication to nodes of the edge cloud 2163 or to other devices, such as the connected edge devices 2162 (e.g., operating in a mesh, fog, and/or the like). The wired communication may provide an Ethernet connection (see e.g., [IEEE8023]) or may be based on other types of networks, such as Controller Area Network (CAN), Local Interconnect Network (LIN), DeviceNet, ControlNet, Data Highway+, or PROFINET, among many others. In some implementations, the NIC d68 may be an Ethernet controller (e.g., a Gigabit Ethernet Controller or the like), a SmartNIC, Intelligent Fabric Processor(s) (IFP(s)). An additional NIC 2168 may be included to enable connecting to a second network, for example, a first NIC 2168 providing communications to the cloud over Ethernet, and a second NIC 2168 providing communications to other devices over another type of network.

Given the variety of types of applicable communications from the device to another component or network, applicable communications circuitry used by the device may include or be embodied by any one or more of components 2164, 2166, 2168, or 2170. Accordingly, in various examples, applicable means for communicating (e.g., receiving, transmitting, and/or the like) may be embodied by such communications circuitry.

The compute node 2150 can include or be coupled to acceleration circuitry 2164, which may be embodied by one or more hardware accelerators, a neural compute stick, neuromorphic hardware, FPGAs, GPUs, SoCs (including programmable SoCs), vision processing units (VPUs), digital signal processors, dedicated ASICs, programmable ASICs, PLDs (e.g., CPLDs and/or HCPLDs), DPUs, IPUs, NPUs, and/or other forms of specialized processors or circuitry designed to accomplish one or more specialized tasks. Additionally or alternatively, the acceleration circuitry 2164 is embodied as one or more XPUs. In some implementations, an XPU is a multi-chip package including multiple chips stacked like tiles into an XPU, where the stack of chips includes any of the processor types discussed herein. Additionally or alternatively, an XPU is implemented by a heterogeneous computing system including multiple types of processor circuitry (e.g., one or more FPGAs, one or more CPUs, one or more GPUs, one or more DSPs, and/or the like, and/or a combination thereof) and application programming interface(s) (API(s)) that may assign computing task(s) to whichever one(s) of the multiple types of the processing circuitry is/are best suited to execute the computing task(s). In any of these implementations, the tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 2164 may comprise logic blocks or logic fabric and other interconnected resources that may be programmed (configured) to perform various functions, such as the procedures, methods, functions, and/or the like discussed herein. In such implementations, the acceleration circuitry 2164 may also include memory cells (e.g., EPROM, EEPROM, flash memory, static memory (e.g., SRAM, anti-fuses, and/or the like) used to store logic blocks, logic fabric, data, and/or the like in LUTs and the like.

In some implementations, the acceleration circuitry 2164 and/or the processor circuitry 2152 can be or include may be a cluster of artificial intelligence (AI) GPUs, tensor processing units (TPUs) developed by Google® Inc., Real AI Processors (RAPs™) provided by AlphaICs®, Intel® Nervana™ Neural Network Processors (NNPs), Intel® Movidius™ Myriad™ X Vision Processing Units (VPUs), NVIDIA® PX™ based GPUs, the NM500 chip provided by General Vision®, Tesla® Hardware 3 processor, an Adapteva® Epiphany™ based processor, and/or the like. Additionally or alternatively, the acceleration circuitry 2164 and/or the processor circuitry 2152 can be implemented as AI accelerating co-processor(s), such as the Hexagon 685 DSP provided by Qualcomm®, the PowerVR 2NX Neural Net Accelerator (NNA) provided by Imagination Technologies Limited®, the Apple® Neural Engine core, a Neural Processing Unit (NPU) within the HiSilicon Kirin 970 provided by Huawei®, and/or the like.

The IX 2156 also couples the processor 2152 to an external interface 2170 that is used to connect additional devices or subsystems. In some implementations, the interface 2170 can include one or more input/output (I/O) controllers. Examples of such I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), eXtensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 2154, storage circuitry 2158, and/or IX 2156 as well. The additional/external devices may include sensors 2172, actuators 2174, and positioning circuitry 2145.

The sensor circuitry 2172 includes devices, modules, or subsystems whose purpose is to detect events or changes in its environment and send the information (sensor data) about the detected events to some other a device, module, subsystem, and/or the like. Examples of such sensors 2172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 2150); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 2174, allow platform 2150 to change its state, position, and/or orientation, or move or control a mechanism or system. The actuators 2174 comprise electrical and/or mechanical devices for moving or controlling a mechanism or system, and converts energy (e.g., electric current or moving air and/or liquid) into some kind of motion. The actuators 2174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2174 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The platform 2150 may be configured to operate one or more actuators 2174 based on one or more captured events and/or instructions or control signals received from a service provider and/or various client systems.

The positioning circuitry 2145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 2145 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 2145 may include a Micro-Technology for Positioning, Navigation, and Timing (Micro-PNT) IC that uses a master timing clock to perform position tracking/estimation without GNSS assistance. The positioning circuitry 2145 may also be part of, or interact with, the communication circuitry 2166 to communicate with the nodes and components of the positioning network. The positioning circuitry 2145 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2145 is, or includes an INS, which is a system or device that uses sensor circuitry 2172 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 2150 without the need for external references.

In some optional examples, various input/output (I/O) devices may be present within or connected to, the compute node 2150, which are referred to as input circuitry 2186 and output circuitry 2184 in FIG. 21. The input circuitry 2186 and output circuitry 2184 include one or more user interfaces designed to enable user interaction with the platform 2150 and/or peripheral component interfaces designed to enable peripheral component interaction with the platform 2150. Input circuitry 2186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2184 may be included to show information or otherwise convey information, such as sensor readings, actuator position(s), or other like information. Data and/or graphics may be displayed on one or more user interface components of the output circuitry 2184. Output circuitry 2184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the platform 2150. The output circuitry 2184 may also include speakers or other audio emitting devices, printer(s), and/or the like. Additionally or alternatively, the sensor circuitry 2172 may be used as the input circuitry 2184 (e.g., an image capture device, motion capture device, or the like) and one or more actuators 2174 may be used as the output device circuitry 2184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2176 may power the compute node 2150, although, in examples in which the compute node 2150 is mounted in a fixed location, it may have a power supply coupled to an electrical grid, or the battery may be used as a backup or for temporary capabilities. The battery 2176 may be a lithium ion battery, or a metal-air battery, such as a zinc-air battery, an aluminum-air battery, a lithium-air battery, and the like.

A battery monitor/charger 2178 may be included in the compute node 2150 to track the state of charge (SoCh) of the battery 2176, if included. The battery monitor/charger 2178 may be used to monitor other parameters of the battery 2176 to provide failure predictions, such as the state of health (SoH) and the state of function (SoF) of the battery 2176. The battery monitor/charger 2178 may include a battery monitoring integrated circuit, such as an LTC4020 or an LTC2990 from Linear Technologies, an ADT7488A from ON Semiconductor of Phoemx Arizona, or an IC from the UCD90xxx family from Texas Instruments of Dallas, TX. The battery monitor/charger 2178 may communicate the information on the battery 2176 to the processor 2152 over the IX 2156. The battery monitor/charger 2178 may also include an analog-to-digital (ADC) converter that enables the processor 2152 to directly monitor the voltage of the battery 2176 or the current flow from the battery 2176. The battery parameters may be used to determine actions that the compute node 2150 may perform, such as transmission frequency, mesh network operation, sensing frequency, and the like.

A power block 2180, or other power supply coupled to a grid, may be coupled with the battery monitor/charger 2178 to charge the battery 2176. In some examples, the power block 2180 may be replaced with a wireless power receiver to obtain the power wirelessly, for example, through a loop antenna in the compute node 2150. A wireless battery charging circuit, such as an LTC4020 chip from Linear Technologies of Milpitas, California, among others, may be included in the battery monitor/charger 2178. The specific charging circuits may be selected based on the size of the battery 2176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The example of FIG. 21 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed below (e.g., a mobile device in industrial compute for smart city or smart factory, among many other examples).

3. Example Implementations

Additional examples of the presently described systems, devices, and methods include the following, non-limiting example implementations. Each of the following non-limiting examples may stand on its own or may be combined in any permutation or combination with any one or more of the other examples provided below or throughout the present disclosure.

Example 1 includes a method of operating a first MX compute node in a multi-access (MX) communication environment, the method comprising, the method comprising: transmitting, over a first transport protocol connection, a keep-alive trigger (KAT) message based on a current time and a previous time a previous packet was received from a second MX compute node; and receiving, over a second transport protocol connection, a probe message from the second MX compute node based on the KAT message.

Example 2 includes the method of Example 1 and/or some other example(s) herein, wherein the transmitting includes: transmitting the KAT message over the first transport protocol connection when the current time minus the previous time is greater than a threshold.

Example 3 includes the method of Examples 1-2 and/or some other example(s) herein, wherein the method includes: updating a network address translation (NAT) mapping based on the probe message.

Example 4 includes the method of Examples 1-3 and/or some other example(s) herein, wherein the method includes: updating a tunnel end-point identifier (ID) of the second transport protocol based on the received probe message.

Example 5 includes the method of Example 4 and/or some other example(s) herein, wherein the method includes: transmitting a probe acknowledgement (ACK) message to the second MX compute node in response to receipt of the probe message.

Example 6 includes the method of Examples 1-5 and/or some other example(s) herein, wherein the method includes: triggering a keep-alive mechanism when the current time minus the previous time is greater than another threshold.

Example 7 includes the method of Example 6 and/or some other example(s) herein, wherein the method includes: transmitting another probe message over another second transport protocol connection based on the triggering of the keep-alive mechanism.

Example 8 includes the method of Examples 6-7 and/or some other example(s) herein, wherein the method includes: determining an average packet inter-arrival time based on a total number of packets received over a predetermined or configured period of time.

Example 9 includes the method of Example 8 and/or some other example(s) herein, wherein the other threshold is based on the measured average packet inter-arrival time and a predetermined or configured constant value.

Example 10 includes the method of Example 9 and/or some other example(s) herein, wherein the method includes: periodically measuring the packet interval arrival time; and updating the previous time based on the measured packet interval arrival time.

Example 11 includes the method of Example 10 and/or some other example(s) herein, wherein the method includes: triggering sending the probe message when no packet is received for the periodic measuring of the packet interval arrival time.

Example 12 includes the method of Example 11 and/or some other example(s) herein, wherein the method includes: switching transmission of data traffic over a second link from a first link when a link failure for the first link is detected based on the probing.

Example 13 includes the method of Examples 1-12 and/or some other example(s) herein, wherein the probe message is a MAMS probe request (Probe-REQ) message.

Example 14 includes the method of Examples 1-13 and/or some other example(s) herein, wherein the first transport protocol connection is a Transmission Control Protocol (TCP) connection or a multi-path TCP (MPTCP) connection, and the second transport protocol connection is a User Datagram Protocol (UDP) connection, a multi-path UDP (UDP) connection, or a QUIC connection.

Example 15 includes the method of Examples 1-13 and/or some other example(s) herein, wherein the second transport protocol connection is a Transmission Control Protocol (TCP) connection or a multi-path TCP (MPTCP) connection, and the first transport protocol connection is a User Datagram Protocol (UDP) connection, a multi-path UDP (UDP) connection, or a QUIC connection.

Example 16 includes a method of operating a first MX compute node in a multi-access (MX) communication environment, the method comprising, the method comprising: transmitting, over a first radio access technology (RAT1) link, a traffic splitting update (TSU) message to notify a second MX compute node of updated traffic splitting configuration parameters; and receiving, over a second radio access technology (RAT2) link, a traffic splitting acknowledgement (TSA) message from the second MX compute node based on the TSU message.

Example 17 includes a method of operating a first MX compute node in a multi-access (MX) communication environment, the method comprising, the method comprising: receiving, over a first radio access technology (RAT1) link, a traffic splitting update (TSU) message from a second MX compute node, the TSU message including updated traffic splitting configuration parameters; and transmitting, over a second radio access technology (RAT2) link, a traffic splitting acknowledgement (TSA) message to the second MX compute node based on the TSU message.

Example 18 includes the method of Examples 16-17 and/or some other example(s) herein, wherein the TSU message includes a connection identifier (CID) field to include a CID, wherein the CID identifies an anchor connection of one or more network protocol packets in an MX protocol data unit (PDU).

Example 19 includes the method of Example 18 and/or some other example(s) herein, wherein the TSU message includes a traffic class identifier (TC ID) field to include a TC ID, wherein the TC ID identifies a traffic class of the one or more network protocol packets in the MX PDU.

Example 20 includes the method of Examples 18-19 and/or some other example(s) herein, wherein the TSU message includes a sequence number (SN) field to include an SN, wherein the SN is a number indicating an order of transmission of the MX PDU.

Example 21 includes the method of Examples 18-20 and/or some other example(s) herein, wherein the TSU message includes a start SN field to include a start SN, wherein the start SN is an SN of a first packet to use the updated traffic splitting configuration parameters.

Example 22 includes the method of Examples 18-21 and/or some other example(s) herein, wherein the TSU message includes a traffic splitting burst size field to include a traffic splitting burst size, wherein the traffic splitting burst size is a number of packets to be transmitted in a burst over the RAT1 link and the RAT2 link.

Example 23 includes the method of Examples 18-22 and/or some other example(s) herein, wherein the TSU message includes a set of traffic splitting threshold fields to include respective traffic splitting thresholds for a corresponding RAT link, wherein the traffic splitting threshold is a number of packets to be transmitted in a burst over the corresponding RAT link.

Example 24 includes the method of Examples 16-23 and/or some other example(s) herein, wherein the TSA message includes a CID field to include a CID, wherein the CID identifies an anchor connection of one or more network protocol packets in an MX PDU.

Example 25 includes the method of Example 24 and/or some other example(s) herein, wherein the TSU message includes a TC ID field to include a TC ID, wherein the TC ID identifies a traffic class of the one or more network protocol packets in the MX PDU.

Example 26 includes the method of Examples 24-25 and/or some other example(s) herein, wherein the TSA message includes a sequence number (SN) field to include an SN, wherein the SN is a number indicating an order of transmission of the MX PDU.

Example 27 includes the method of Examples 24-26 and/or some other example(s) herein, wherein the TSA message includes a start SN field to include a start SN, wherein the start SN is an SN of a first packet to use the updated traffic splitting configuration parameters.

Example 28 includes the method of Examples 24-27 and/or some other example(s) herein, wherein the TSA message includes a traffic splitting burst size field to include a traffic splitting burst size, wherein the traffic splitting burst size is a number of packets to be transmitted in a burst over the RAT1 link and the RAT2 link.

Example 29 includes the method of Examples 24-28 and/or some other example(s) herein, wherein the TSA message includes a set of traffic splitting threshold fields to include respective traffic splitting thresholds for a corresponding RAT link, wherein the traffic splitting threshold is a number of packets to be transmitted in a burst over the corresponding RAT link.

Example 30 includes the method of Examples 16-29 and/or some other example(s) herein, wherein the method includes: receiving, over the RAT1 link or the RAT2 link, an MX data packet from the second MX compute node, wherein the MX data packet includes a traffic splitting status flag, wherein the traffic splitting status flag indicates that the updated traffic splitting configuration parameters are being used by the second MX compute node.

Example 31 includes the method of Examples 16-30 and/or some other example(s) herein, wherein the method includes: transmitting, over the RAT1 link or the RAT2 link, another MX data packet to the second MX compute node, wherein the other MX data packet includes a traffic splitting status flag, wherein the traffic splitting status flag indicates that the updated traffic splitting configuration parameters are being used by the first MX compute node.

Example 32 includes the method of Examples 30-31 and/or some other example(s) herein, wherein the traffic splitting status flag is included in an MX trailer section of the MX data packet or an MX header section of the MX data packet.

Example 33 includes the method of Examples 1-32 and/or some other example(s) herein, wherein the second MX compute node is a Multi-Access Management Services (MAMS) client device and the first MX compute node is a MAMS server.

Example 34 includes the method of Examples 1-32 and/or some other example(s) herein, wherein the first MX compute node is a MAMS client device and the second MX compute node is a MAMS server.

Example 35 includes the method of Examples 1-32 and/or some other example(s) herein, wherein the second MX compute node is a MAMS client device and the first MX compute node is a NAT device.

Example 36 includes the method of Examples 1-32 and/or some other example(s) herein, wherein the second MX compute node is a MAMS server and the first MX compute node is a MAMS client device.

Example 37 includes one or more computer readable media comprising instructions, wherein execution of the instructions by processor circuitry is to cause the processor circuitry to perform the method of Examples 1-36 and/or some other example(s) herein. Example 38 includes a computer program comprising the instructions of Example 37 and/or some other example(s) herein.

Example 39 includes an Application Programming Interface defining functions, methods, variables, data structures, and/or protocols for the computer program of Example 38 and/or some other example(s) herein. Example 40 includes an apparatus comprising circuitry loaded with the instructions of Example 37 and/or some other example(s) herein. Example 41 includes an apparatus comprising circuitry operable to run the instructions of Example 37 and/or some other example(s) herein. Example 42 includes an integrated circuit comprising one or more of the processor circuitry and the one or more computer readable media of Exampe 37 and/or some other example(s) herein. Example 43 includes a computing system comprising the one or more computer readable media and the processor circuitry of Example 37 and/or some other example(s) herein. Example 44 includes an apparatus comprising means for executing the instructions of Example 37 and/or some other example(s) herein. Example 45 includes a signal generated as a result of executing the instructions of Example 37 and/or some other example(s) herein. Example 46 includes a data unit generated as a result of executing the instructions of Example 37 and/or some other example(s) herein. Example 47 includes the data unit of Example 46 and/or some other example(s) herein, the data unit is a datagram, network packet, data frame, data segment, a Protocol Data Unit (PDU), a Service Data Unit (SDU), a message, or a database object. Example 48 includes a signal encoded with the data unit of Examples 46-47 and/or some other example(s) herein. Example 49 includes an electromagnetic signal carrying the instructions of Example 37 and/or some other example(s) herein. Example 50 includes an apparatus comprising means for performing the method of Examples 1-36 and/or some other example(s) herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value.

The term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period.

The term "identification" at least in some examples refers to a process of recognizing an identity as distinct from other identities in a particular scope or context, which may involve processing identifiers to reference an identity in an identity database.

The term "lightweight" or "lite" at least in some examples refers to an application or computer program designed to use a relatively small amount of resources such as having a relatively small memory footprint, low processor usage, and/or overall low usage of system resources. The term "lightweight protocol" at least in some examples refers to a communication protocol that is characterized by a relatively small overhead. Additionally or alternatively, the term "lightweight protocol" at least in some examples refers to a protocol that provides the same or enhanced services as a standard protocol, but performs faster than standard protocols, has lesser overall size in terms of memory footprint, uses data compression techniques for processing and/or transferring data, drops or eliminates data deemed to be nonessential or unnecessary, and/or uses other mechanisms to reduce overall overheard and/or footprint.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "controller" at least in some examples refers to an element or entity that has the capability to affect a physical entity, such as by changing its state or causing the physical entity to move.

The term "terminal" at least in some examples refers to point at which a conductor from a component, device, or network comes to an end. Additionally or alternatively, the term "terminal" at least in some examples refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "server" at least in some examples refers to a computing device or system, including processing hardware and/or process space(s), an associated storage medium such as a memory device or database, and, in some instances, suitable application(s) as is known in the art. The terms "server system" and "server" may be used interchangeably herein, and these terms at least in some examples refers to one or more computing system(s) that provide access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with, one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of compute nodes, a set of distributed compute nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "appliance," "computer appliance," and the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and the like at least in some examples refers to a computer appliance designed to protect computer networks from unwanted traffic and/or malicious attacks. The term "policy appliance" at least in some examples refers to to technical control and logging mechanisms to enforce or reconcile policy rules (information use rules) and to ensure accountability in information systems.

The term "gateway" at least in some examples refers to a network appliance that allows data to flow from one network to another network, or a computing system or application configured to perform such tasks. Examples of gateways include IP gateways, Internet-to-Orbit (120) gateways, IoT gateways, cloud storage gateways, and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmut-mounted display devices, augmented reality (AR) devices, virtual reality (VR) devices, mixed reality (MR) devices, and/or other like systems or devices.

The term "station" or "STA" at least in some examples refers to a logical entity that is a singly addressable instance of a medium access control (MAC) and physical layer (PHY) interface to the wireless medium (WM). The term "wireless medium" or WM" at least in some examples refers to the medium used to implement the transfer of protocol data units (PDUs) between peer physical layer (PHY) entities of a wireless local area network (LAN).

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network applicance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "access point" or "AP" at least in some examples refers to an entity that contains one station (STA) and provides access to the distribution services, via the wireless medium (WM) for associated STAs. An AP comprises a STA and a distribution system access function (DSAF).

The term "E-UTEAN NodeB", "eNodeB", or "eNB" at least in some examples refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some examples refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some examples refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some examples refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v17.0.0 (2022 Apr. 15) ("[TS37340]")). Two or more en-gNBs are interconnected with each other (and/or with one or more eNBs) by means of an X2 interface.

The term "Next Generation RAN node" or "NG-RAN node" at least in some examples refers to either a gNB or an ng-eNB.

The term "Transmission Reception Point" or "TRxP" at least in some examples refers to an antenna array with one or more antenna elements available to a network located at a specific geographical location for a specific area.

The term "Residential Gateway" or "RG" at least in some examples refers to a device providing, for example, voice, data, broadcast video, video on demand, to other devices in customer premises. The term "Wireline 5G Access Network" or "W-5GAN" at least in some examples refers to a wireline AN that connects to a 5GC via N2 and N3 reference points. The W-5GAN can be either a W-5GBAN or W-5GCAN. The term "Wireline 5G Cable Access Network" or "W-5GCAN" at least in some examples refers to an Access Network defined in/by CableLabs. The term "Wireline BBF Access Network" or "W-5GBAN" at least in some examples refers to an Access Network defined in/by the Broadband Forum (BBF). The term "Wireline Access Gateway Function" or "W-AGF" at least in some examples refers to a Network function in W-5GAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" or "CO" at least in some examples refers to an aggregation point for telecommunications infrastructure within an accessible or defined geographical area, often where telecommunication service providers have traditionally located switching equipment for one or multiple types of access networks. In some examples, a CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to to compute, storage, and/or network resources provided by physical hardware element(s). A "virtualized resource" at least in some examples refers to to compute, storage, and/or network resources provided by virtualization infrastructure to an application, device, system, and the like. The term "network resource" or "communication resource" at least in some examples refers to to resources that are accessible by computer devices/systems via a communications network. The term "system resources" at least in some examples refers to to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some examples refers to an amount of work performed by a computing system, device, entity, and the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and the like), and/or the like. Various algorithms may be used to determine a workload and/or workload characteristics, which may be based on any of the aforementioned workload types.

The term "cloud service provider" or "CSP" at least in some examples refers to an organization which operates typically large-scale "cloud" resources comprised of centralized, regional, and Edge data centers (e.g., as used in the context of the public cloud). In other examples, a CSP may also be referred to as a "Cloud Service Operator" or "CSO". References to "cloud computing" generally refer to computing resources and services offered by a CSP or a CSO, at remote locations with at least some increased latency, distance, or constraints relative to edge computing.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function" or "NF" at least in some examples refers to a functional block within a network infrastructure that has one or more external interfaces and a defined functional behavior.

The term "network service" or "NS" at least in some examples refers to a composition of Network Function(s) and/or Network Service(s), defined by its functional and behavioral specification(s).

The term "network function virtualization" or "NFV" at least in some examples refers to the principle of separating network functions from the hardware they run on by using virtualisation techniques and/or virtualization technologies.

The term "virtualized network function" or "VNF" at least in some examples refers to an implementation of an NF that can be deployed on a Network Function Virtualisation Infrastructure (NFVI).

The term "Network Functions Virtualisation Infrastructure Manager" or "NFVI" at least in some examples refers to a totality of all hardware and software components that build up the environment in which VNFs are deployed.

The term "management function" at least in some examples refers to a logical entity playing the roles of a service consumer and/or a service producer. The term "management service" at least in some examples refers to a set of offered management capabilities.

The term "slice" at least in some examples refers to a set of characteristics and behaviors that separate one instance, traffic, data flow, application, application instance, link or connection, RAT, device, system, entity, element, and the like from another instance, traffic, data flow, application, application instance, link or connection, RAT, device, system, entity, element, and the like, or separate one type of instance, and the like, from another instance, and the like.

The term "network slice" at least in some examples refers to a logical network that provides specific network capabilities and network characteristics and/or supports various service properties for network slice service consumers. Additionally or alternatively, the term "network slice" at least in some examples refers to a logical network topology connecting a number of endpoints using a set of shared or dedicated network resources that are used to satisfy specific service level objectives (SLOs) and/or service level agreements (SLAs).

The term "network slicing" at least in some examples refers to methods, processes, techniques, and technologies used to create one or multiple unique logical and virtualized networks over a common multi-domain infrastructure.

The term "access network slice", "radio access network slice", or "RAN slice" at least in some examples refers to a part of a network slice that provides resources in a RAN to fulfill one or more application and/or service requirements (e.g., SLAs, and the like).

The term "network slice instance" at least in some examples refers to a set of Network Function instances and the required resources (e.g. compute, storage and networking resources) which form a deployed network slice. Additionally or alternatively, the term "network slice instance" at least in some examples refers to a representation of a service view of a network slice.

The term "network instance" at least in some examples refers to information identifying a domain.

The term "service consumer" at least in some examples refers to an entity that consumes one or more services.

The term "service producer" at least in some examples refers to an entity that offers, serves, or otherwise provides one or more services.

The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some examples refers to a network hosting data-centric services such as, for example, operator services, the internet, third-party services, or enterprise networks. Additionally or alternatively, a DN at least in some examples refers to service networks that belong to an operator or third party, which are offered as a service to a client or user equipment (UE). DNs are sometimes referred to as "Packet Data Networks" or "PDNs". The term "Local Area Data Network" or "LADN" at least in some examples refers to a DN that is accessible by the UE only in specific locations, that provides connectivity to a specific DNN, and whose availability is provided to the UE.

The term "Internet of Things" or "IoT" at least in some examples refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure. The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements.

The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (μTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signalling Radio Bearers (SRBs) and Data Radio Bearers (DRBs); mobility functions/services; QoS management; and some sidelink specific services and functions over the Uu interface (see e.g., 3GPP TS 36.331 v17.0.0 (2022 Apr. 13) and/or 3GPP TS 38.331 v17.0.0 (2022 Apr. 19) ("[TS38331]")).

The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022 Apr. 13)).

The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.0.0 (2022 Apr. 15) and/or 3GPP TS 38.323 v17.0.0 (2022 Apr. 14)).

The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 38.322 v17.0.0 (2022-04-15) and 3GPP TS 36.322 v17.0.0 (2022 Apr. 15)).

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (2022 Apr. 14) and 3GPP TS 36.321 v17.0.0 (2022 Apr. 19) (collectively referred to as "[TSMAC]")).

The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (2022 Jan. 5) and 3GPP TS 36.201 v17.0.0 (2022 Mar. 31)).

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. The term "RAT type" at least in some examples may identify a transmission technology and/or communication protocol used in an access network, for example, new radio (NR), Long Term Evolution (LTE), narrowband IoT (NB-IoT), untrusted non-3GPP, trusted non-3GPP, trusted Institute of Electrical and Electronics Engineers (IEEE) 802 (e.g., [IEEE80211]; see also IEEE Standardfor Local and Metropolitan Area Networks: Overview and Architecture, IEEE Std 802-2014, pp. 1-74 (30 Jun. 2014) ("[IEEE802]"), the contents of which is hereby incorporated by reference in its entirety), non-3GPP access, MuLTEfire, [WiMAX], wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) (and variants thereof such as HSPA Plus (HSPA+), and the like), Long Term Evolution (LTE) (and variants thereof such as LTE-Advanced (LTE-A), Evolved UTRA (E-UTRA), LTE Extra, LTE-A Pro, LTE LAA, MuLTEfire, and the like), Fifth Generation (5G) or New Radio (NR), and the like; ETSI technologies such as High Performance Radio Metropolitan Area Network (HiperMAN) and the like; IEEE technologies such as [IEEE802] and/or WiFi (e.g., [IEEE80211] and variants thereof), [WiMAX](and variants thereof), Mobile Broadband Wireless Access (MBWA)/iBurst (e.g., IEEE 802.20 and variants thereof), and the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.1 lad, IEEE 802.11ay, and the like); short-range and/or wireless personal area network (WPAN) technologies/standards such as Bluetooth (and variants thereof such as Bluetooth 5.3, Bluetooth Low Energy (BLE), and the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010) ("[IEEE80211p]"), which is now part of [IEEE80211]), IEEE 802.1 bd (e.g., for vehicular ad-hoc environments), Dedicated Short Range Communications (DSRC), Intelligent-Transport-Systems (ITS) (including the European ITS-G5, ITS-G5B, ITS-G5C, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet. The term "backbone network", "backbone", or "core network" at least in some examples refers to a computer network which interconnects networks, providing a path for the exchange of information between different subnetworks such as LANs or WANs. An example protocol used for LANs and WANs is Ethernet (e.g., IEEE Standard for Ethernet, IEEE Std 802.3-2018, pp. 1-5600 (31 Aug. 2018) ("[IEEE8023]").

The term "interworking" at least in some examples refers to the use of interconnected stations in a network for the exchange of data, by means of protocols operating over one or more underlying data transmission paths.

The term "core" at least in some examples refers to a functional element that anchors a client network address (e.g., IP address) used for communication with applications via the network. The term "anchor connection" at least in some examples refers to the network path from a network element (e.g., an N-MADP) to a UP gateway (e.g., IP anchor) that has assigned a network address (e.g., IP address) to a client. The term "delivery connection" as used herein refers a network path from a network element (e.g., an N-MADP) to a client.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, and the like. For purposes of the present disclosure, the terms "traffic flow", "data flow", "dataflow", "packet flow", "network flow", and/or "flow" may be used interchangeably even though these terms at least in some examples refers to to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "distributed computing" at least in some examples refers to computation resources that are geographically distributed within the vicinity of one or more localized networks' terminations. The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like).

Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of Network Function(s) and/or Network Service(s), defined by its functional and behavioural specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems.

The term "Quality of Service" or "QoS" at least in some examples refers to a description or measurement of the overall performance of a service (e.g., telephony and/or cellular service, network service, wireless communication/connectivity service, cloud computing service, and the like). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS" at least in some examples refers to mechanisms that provide traffic-forwarding treatment based on flow-specific traffic classification. In some implementations, the term "Quality of Service" or "QoS" can be used interchangeably with the term "Class of Service" or "CoS". The term "Class of Service" or "CoS" at least in some examples refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some examples refers to the finest granularity for QoS forwarding treatment in a network. The term "5G QoS flow" at least in some examples refers to the finest granularity for QoS forwarding treatment in a 5G System (5GS). Traffic mapped to the same QoS flow (or 5G QoS flow) receive the same forwarding treatment. The term "QoS Identifier" at least in some examples refers to a scalar that is used as a reference to a specific QoS forwarding behavior (e.g., packet loss rate, packet delay budget, and the like) to be provided to a QoS flow. This may be implemented in an access network by referencing node specific parameters that control the QoS forwarding treatment (e.g., scheduling weights, admission thresholds, queue management thresholds, link layer protocol configuration, and the like).

The term "queue" at least in some examples refers to a collection of entities (e.g., data, objects, events, and the like) are stored and held to be processed later, that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "queue management" at least in some examples refers to a system, mechanism, policy, process, algorithm, or technique used to control one or more queues. The term "Active Queue Management" or "AQM" at least in some examples refers to a system, mechanism, policy, process, algorithm, or technique of dropping packets in a queue or buffer before the queue or buffer becomes full. The term "AQM entity" as used herein may refer to a network scheduler, a convergence layer entity, a network appliance, network function, and/or some other like entity that performs/executes AQM tasks.

The term "queue management technique" at least in some examples refers to a particular queue management system, mechanism, policy, process, and/or algorithm, which may include a "drop policy". The term "active queue management technique" or "AQM technique" at least in some examples refers to a particular AQM system, mechanism, policy, process, and/or algorithm.

The term "drop policy" at least in some examples refers to a set of guidelines or rules used by a queue management technique or ARM technique to determine when to discard, remove, delete, or otherwise drop data or packets from a queue or buffer or data or packets arriving for storage in a queue or buffer.

The term "stack" at least in some examples refers to an abstract data type that serves as a collection of elements and may include a push operation or function, a pop operation or function, and sometimes a peek operation or function.

The term "push", in the context of data structures such as stacks, buffers, and queues, at least in some examples refers an operation or function that adds one or more elements to a collection or set of elements.

The term "pop", in the context of data structures such as stacks, buffers, and queues, at least in some examples refers an operation or function that removes or otherwise obtains one or more elements from a collection or set of elements.

The term "peek", in the context of data structures such as stacks, buffers, and queues, at least in some examples refers an operation or function that provides access to one or more elements from a collection or set of elements.

The term "network scheduler" at least in some examples refers to a node, element, or entity that manages network packets in transmit and/or receive queues of one or more protocol stacks of network access circuitry (e.g., a network interface controller (NIC), baseband processor, and the like). The term "network scheduler" at least in some examples can be used interchangeably with the terms "packet scheduler", "queueing discipline" or "qdisc", or "queueing algorithm"

The term "time to live" (or "TTL") or "hop limit" at least in some examples refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "traffic shaping" at least in some examples refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some examples refers to the regulation of flows into or out of a network, or into or out of a specific device or element.

The term "access traffic steering" or "traffic steering" at least in some examples refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some examples refers to a procedure that moves some or all traffic of an ongoing data flow from at least one access network to at least one other access network in a way that maintains the continuity of the data flow.

The term "access traffic splitting" or "traffic splitting" at least in some examples refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of 3GPP TS 38.300 v17.0.0 (2022 Apr. 13) ("[TS38300]")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some examples refers to an identifier that can be mapped to a specific application or application instance; in the context of 3GPP 5G/NR systems, an "application identifier" at least in some examples refers to to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer. The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

The term "physical rate" or "PHY rate" at least in some examples refers to a speed at which one or more bits are actually sent over a transmission medium. Additionally or alternatively, the term "physical rate" or "PHY rate" at least in some examples refers to a speed at which data can move across a wireless link between a transmitter and a receiver.

The term "delay" at least in some examples refers to a time interval between two events. Additionally or alternatively, the term "delay" at least in some examples refers to a time interval between the propagation of a signal and its reception. The term "packet delay" at least in some examples refers to the time it takes to transfer any packet from one point to another. Additionally or alternatively, the term "packet delay" or "per packet delay" at least in some examples refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some examples refers to an amount of time taken to process a packet in a network node. The term "transmission delay" at least in some examples refers to an amount of time needed (or necessary) to push a packet (or all bits of a packet) into a transmission medium. The term "propagation delay" at least in some examples refers to amount of time it takes a signal's header to travel from a sender to a receiver. The term "network delay" at least in some examples refers to the delay of an a data unit within a network (e.g., an IP packet within an IP network). The term "queuing delay" at least in some examples refers to an amount of time a job waits in a queue until that job can be executed. Additionally or alternatively, the term "queuing delay" at least in some examples refers to an amount of time a packet waits in a queue until it can be processed and/or transmitted. The term "delay bound" at least in some examples refers to a predetermined or configured amount of acceptable delay. The term "per-packet delay bound" at least in some examples refers to a predetermined or configured amount of acceptable packet delay where packets that are not processed and/or transmitted within the delay bound are considered to be delivery failures and are discarded or dropped.

The term "packet drop rate" at least in some examples refers to a share of packets that were not sent to the target due to high traffic load or traffic management and should be seen as a part of the packet loss rate. The term "packet loss rate" at least in some examples refers to a share of packets that could not be received by the target, including packets droped, packets lost in transmission and packets received in wrong format. The term "latency" at least in some examples refers to the amount of time it takes to transfer a first/initial data unit in a data burst from one point to another. The term "throughput" or "network throughput" at least in some examples refers to a rate of production or the rate at which something is processed. Additionally or alternatively, the term "throughput" or "network throughput" at least in some examples refers to a rate of successful message (date) delivery over a communication channel. The term "goodput" at least in some examples refers to a number of useful information bits delivered by the network to a certain destination per unit of time.

The term "performance indicator" at least in some examples refers to performance data aggregated over a group of network functions (NFs), which is derived from performance measurements collected at the NFs that belong to the group, according to the aggregation method identified in a Performance Indicator definition.

The term "application" at least in some examples refers to to a computer program designed to carry out a specific task other than one relating to the operation of the computer itself. Additionally or alternatively, term "application" at least in some examples refers to to a complete and deployable package, environment to achieve a certain function in an operational environment.

The term "algorithm" at least in some examples refers to an unambiguous specification of how to solve a problem or a class of problems by performing calculations, input/output operations, data processing, automated reasoning tasks, and/or the like. The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction. The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "filter" at least in some examples refers to computer program, subroutine, or other software element capable of processing a stream, data flow, or other collection of data, and producing another stream. In some implementations, multiple filters can be strung together or otherwise connected to form a pipeline.

The term "instance" at least in some examples refers to a concrete occurrence of an object, which may occur, for example, during execution of program code. Additionally or alternatively, the term "instance" at least in some examples refers to any running process or to an object as an instance of a class. Additionally or alternatively, the term "instance" at least in some examples refers to an object or the creation of an object, where the "object" at least in some examples refers to a location in memory having a value and possibly referenced by an identifier. Additionally or alternatively, the term "instance" at least in some examples refers to an individual virtual machine (VM) or container in a virtualized environment (e.g., cloud computing or edge computing system/service) that provides user-level and/or operating-system-level virtualization. Additionally or alternatively, the term "application instance" at least in some examples refers to a collection of services and/or service groups. The terms "instantiate," "instantiation," and the like at least in some examples refers to the creation of an instance.

The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload.

The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert. The term "user" at least in some examples refers to an abstract representation of any entity issuing commands, requests, and/or data to a compute node or system, and/or otherwise consumes or uses services.

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a [IEEE802] protocol/standard (e.g., [IEEE80211] or the like), and/or other like data structures.

The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content. The term "data frame" or "DF" at least in some examples refers to a data type that contains more than one data element in a predefined order. The term "data element" or "DE" at least in some examples refers to a data type that contains one single data.

The term "reference" at least in some examples refers to data useable to locate other data and may be implemented a variety of ways (e.g., a pointer, an index, a handle, a key, an identifier, a hyperlink, and/or the like).

The term "translation" at least in some examples refers to the process of converting or otherwise changing data from a first form, shape, configuration, structure, arrangement, embodiment, description, or the like into a second form, shape, configuration, structure, arrangement, embodiment, description, or the like; at least in some examples there may be two different types of translation: transcoding and transformation.

The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently.

The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

The term "converge" or "convergence" at least in some examples refers to the stable point found at the end of a sequence of solutions via an iterative optimization algorithm. Additionally or alternatively, the term "converge" or "convergence" at least in some examples refers to the output of a function or algorithm getting closer to a specific value over multiple iterations of the function or algorithm.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g, 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A first multi-access (MX) compute node capable of operating in an MX communication environment, the first MX compute node comprising:

processor circuitry configured to:

transmit, over a first radio access technology (RAT1) link, a traffic splitting update (TSU) message to notify a second MX compute node of updated traffic splitting configuration parameters; and receive, over a second radio access technology (RAT2) link, a traffic splitting acknowledgement (TSA) message from the second MX compute node based on the TSU message;

wherein:

the second MX compute node is to determine, based, at least in part, upon sequence number data and other data comprised in the TSU message, a transmission network via which to transmit packet data.

2. The first MX compute node of claim 1, wherein the processor circuitry is configured to:

receive, over the RAT1 link, another TSU message from the second MX compute node, the TSU message including updated traffic splitting configuration parameters; and transmit, over the RAT2 link, another TSA message to the second MX compute node based on the TSU message.

3. The first MX compute node of claim 1, wherein the TSU message includes:

a connection identifier (CID) field to include a CID, wherein the CID identifies an anchor connection of one or more network protocol packets in an MX protocol data unit (PDU);

a traffic class identifier (TC ID) field to include a TC ID, wherein the TC ID identifies a traffic class of the one or more network protocol packets in the MX PDU;

a sequence number (SN) field to include an SN, wherein the SN is a number indicating an order of transmission of the MX PDU;

a start SN field to include a start SN, wherein the start SN is an SN of a first packet to use the updated traffic splitting configuration parameters;

a traffic splitting burst size field to include a traffic splitting burst size, wherein the traffic splitting burst size is a number of packets to be transmitted in a burst over the RAT1 link and the RAT2 link; and a set of traffic splitting threshold fields to include respective traffic splitting thresholds for a corresponding RAT link, wherein the traffic splitting threshold is a number of packets to be transmitted in a burst over the corresponding RAT link.

4. The first MX compute node of claim 1, wherein the TSA message includes:

a CID field to include a CID, wherein the CID identifies an anchor connection of one or more network protocol packets in an MX PDU;

a TC ID field to include a TC ID, wherein the TC ID identifies a traffic class of the one or more network protocol packets in the MX PDU;

a sequence number (SN) field to include an SN, wherein the SN is a number indicating an order of transmission of the MX PDU;

a start SN field to include a start SN, wherein the start SN is an SN of a first packet to use the updated traffic splitting configuration parameters;

a traffic splitting burst size field to include a traffic splitting burst size, wherein the traffic splitting burst size is a number of packets to be transmitted in a burst over the RAT1 link and the RAT2 link;

a set of traffic splitting threshold fields to include respective traffic splitting thresholds for a corresponding RAT link, wherein the traffic splitting threshold is a number of packets to be transmitted in a burst over the corresponding RAT link.

5. The first MX compute node of claim 1, wherein the processor circuitry is configured to:

receive, over the RAT1 link or the RAT2 link, an MX data packet from the second MX compute node, wherein the MX data packet includes a traffic splitting status flag, wherein the traffic splitting status flag indicates that the updated traffic splitting configuration parameters are being used by the second MX compute node, wherein the traffic splitting status flag is included in an MX trailer section of the MX data packet or an MX header section of the MX data packet.

6. The first MX compute node of claim 1, wherein the method includes:

transmit, over the RAT1 link or the RAT2 link, another MX data packet to the second MX compute node, wherein the other MX data packet includes a traffic splitting status flag, wherein the traffic splitting status flag indicates that the updated traffic splitting configuration parameters are being used by the first MX compute node, wherein the traffic splitting status flag is included in an MX trailer section of the MX data packet or an MX header section of the MX data packet.

7. The first MX compute node of claim 1, wherein:

the first MX compute node is a Multi-Access Management Services (MAMS) client device and the second MX compute node is a MAMS server; or the second MX compute node is a MAMS client device and the first MX compute node is a MAMS server.

8. The first MX compute node of claim 1, wherein:

the first MX compute node is a MAMS client device and the second MX compute node is a NAT device; or the second MX compute node is a MAMS client device and the first MX compute node is a NAT device.

9. The first MX compute node of claim 1, wherein:

the RAT1 link is a Transmission Control Protocol (TCP) connection or a multi-path TCP (MPTCP) connection, and the second transport protocol connection is a User Datagram Protocol (UDP) connection, a multi-path UDP (UDP) connection, or a QUIC connection; and the RAT2 link is a Transmission Control Protocol (TCP) connection or a multi-path TCP (MPTCP) connection, and the first transport protocol connection is a User Datagram Protocol (UDP) connection, a multi-path UDP (UDP) connection, or a QUIC connection.

10. A non-transitory computer readable medium (NTCRM) comprising instructions for operating a first multi-access (MX) compute node in an MX communication environment, wherein execution of the instructions by one or more processors is to result in the first MX compute node being configured to perform operations comprising:

receive, over a first radio access technology (RAT1) link, a traffic splitting update (TSU) message to notify a second MX compute node of updated traffic splitting configuration parameters; and transmit, over a second radio access technology (RAT2) link, a traffic splitting acknowledgement (TSA) message from the second MX compute node based on the TSU message;

wherein:

the second MX compute node is to determine, based, at least in part, upon sequence number data and other data comprised in the TSU message, a transmission network via which to transmit packet data.

11. The NTCRM of claim 10, wherein the execution of the instructions by the one or more processors is to result in the first MX compute node being configured to:

transmit, over the RAT1 link, another TSU message from the second MX compute node, the TSU message including updated traffic splitting configuration parameters; and receive, over the RAT2 link, another TSA message to the second MX compute node based on the TSU message.

12. The NTCRM of claim 10, wherein the TSU message includes:

a connection identifier (CID) field to include a CID, wherein the CID identifies an anchor connection of one or more network protocol packets in an MX protocol data unit (PDU);

a traffic class identifier (TC ID) field to include a TC ID, wherein the TC ID identifies a traffic class of the one or more network protocol packets in the MX PDU;

a sequence number (SN) field to include an SN, wherein the SN is a number indicating an order of transmission of the MX PDU;

a start SN field to include a start SN, wherein the start SN is an SN of a first packet to use the updated traffic splitting configuration parameters;

a traffic splitting burst size field to include a traffic splitting burst size, wherein the traffic splitting burst size is a number of packets to be transmitted in a burst over the RAT1 link and the RAT2 link; and a set of traffic splitting threshold fields to include respective traffic splitting thresholds for a corresponding RAT link, wherein the traffic splitting threshold is a number of packets to be transmitted in a burst over the corresponding RAT link.

13. The NTCRM of claim 10, wherein the TSA message includes:

a CID field to include a CID, wherein the CID identifies an anchor connection of one or more network protocol packets in an MX PDU;

a TC ID field to include a TC ID, wherein the TC ID identifies a traffic class of the one or more network protocol packets in the MX PDU;

a sequence number (SN) field to include an SN, wherein the SN is a number indicating an order of transmission of the MX PDU;

a start SN field to include a start SN, wherein the start SN is an SN of a first packet to use the updated traffic splitting configuration parameters;

a traffic splitting burst size field to include a traffic splitting burst size, wherein the traffic splitting burst size is a number of packets to be transmitted in a burst over the RAT1 link and the RAT2 link;

a set of traffic splitting threshold fields to include respective traffic splitting thresholds for a corresponding RAT link, wherein the traffic splitting threshold is a number of packets to be transmitted in a burst over the corresponding RAT link.

14. The NTCRM of claim 10, wherein the execution of the instructions by the one or more processors is to result in the first MX compute node being configured to:

receive, over the RAT1 link or the RAT2 link, an MX data packet from the second MX compute node, wherein the MX data packet includes a traffic splitting status flag, wherein the traffic splitting status flag indicates that the updated traffic splitting configuration parameters are being used by the second MX compute node, wherein the traffic splitting status flag is included in an MX trailer section of the MX data packet or an MX header section of the MX data packet.

15. The NTCRM of claim 10, wherein the execution of the instructions by the one or more processors is to result in the first MX compute node being configured to:

transmit, over the RAT1 link or the RAT2 link, another MX data packet to the second MX compute node, wherein the other MX data packet includes a traffic splitting status flag, wherein the traffic splitting status flag indicates that the updated traffic splitting configuration parameters are being used by the first MX compute node, wherein the traffic splitting status flag is included in an MX trailer section of the MX data packet or an MX header section of the MX data packet.

16. The NTCRM of claim 10, wherein:

the first MX compute node is a Multi-Access Management Services (MAMS) client device and the second MX compute node is a MAMS server; or the second MX compute node is a MAMS client device and the first MX compute node is a MAMS server.

17. The NTCRM of claim 10, wherein:

the first MX compute node is a MAMS client device and the second MX compute node is a NAT device; or the second MX compute node is a MAMS client device and the first MX compute node is a NAT device.

18. The NTCRM of claim 10, wherein:

the RAT1 link is a Transmission Control Protocol (TCP) connection or a multi-path TCP (MPTCP) connection, and the second transport protocol connection is a User Datagram Protocol (UDP) connection, a multi-path UDP (UDP) connection, or a QUIC connection; and the RAT2 link is a Transmission Control Protocol (TCP) connection or a multi-path TCP (MPTCP) connection, and the first transport protocol connection is a User Datagram Protocol (UDP) connection, a multi-path UDP (UDP) connection, or a QUIC connection.

* * * * *